(12) United States Patent
Tanaka et al.

(10) Patent No.: US 9,482,323 B2
(45) Date of Patent: Nov. 1, 2016

(54) FRICTION ROLLER REDUCER AND DRIVE UNIT FOR ELECTRIC AUTOMOBILE

(75) Inventors: Kazutaka Tanaka, Kanagawa (JP); Yasuyuki Matsuda, Kanagawa (JP); Takashi Imanishi, Kanagawa (JP); Eiji Inoue, Kanagawa (JP); Hiroyasu Yoshioka, Kanagawa (JP); Tsutomu Hibi, Kanagawa (JP)

(73) Assignee: NSK, LTD., Tokyo (JP)

( * ) Notice: Subject to any disclaimer, the term of this patent is extended or adjusted under 35 U.S.C. 154(b) by 334 days.

(21) Appl. No.: 14/005,217

(22) PCT Filed: Mar. 9, 2012

(86) PCT No.: PCT/JP2012/056183
§ 371 (c)(1),
(2), (4) Date: Oct. 7, 2013

(87) PCT Pub. No.: WO2012/124640
PCT Pub. Date: Sep. 20, 2012

(65) Prior Publication Data
US 2014/0024487 A1 Jan. 23, 2014

(30) Foreign Application Priority Data

Mar. 16, 2011 (JP) ................................. 2011-057868
Oct. 31, 2011 (JP) ................................. 2011-238867
Nov. 22, 2011 (JP) ................................. 2011-254776
Nov. 22, 2011 (JP) ................................. 2011-254816

(51) Int. Cl.
*F16H 13/08* (2006.01)
*F16H 13/06* (2006.01)
(Continued)

(52) U.S. Cl.
CPC .............. *F16H 13/08* (2013.01); *F16H 13/06* (2013.01); *F16H 13/10* (2013.01); *H02K 7/116* (2013.01); *F16H 13/14* (2013.01); *F16H 2200/0021* (2013.01); *Y02T 10/641* (2013.01)

(58) Field of Classification Search
CPC ........ F16H 13/06; F16H 13/08; F16H 13/10; F16H 13/14
See application file for complete search history.

(56) References Cited

U.S. PATENT DOCUMENTS 1,770,408 A 7/1930 Jacobsen
3,283,614 A * 11/1966 Hewko ................... F16H 13/06
475/183

(Continued)

FOREIGN PATENT DOCUMENTS

GB 2272955 A 6/1994
JP S53-8473 1/1978

(Continued)

OTHER PUBLICATIONS

International Search Report from the International Bureau of WIPO for International Application No. PCT/JP2012/056183 dated Jun. 5, 2012 (4 pages).

(Continued)

*Primary Examiner* — Ramya Burgess
*Assistant Examiner* — David Morris
(74) *Attorney, Agent, or Firm* — Fitch Even Tabin & Flannery LLP

(57) ABSTRACT

Construction of a friction roller reducer is achieved wherein displacement of intermediate rollers due to the change in thickness in the axial direction of loading cam apparatuses can be performed smoothly, and excellent transmission efficiency can be obtained. Long guide holes that are long in the radial direction of a sun roller and ring-shaped roller are provided in guide blocks that are fastened to a support frame for supporting the end sections of rotation shafts of intermediate rollers. The outer rings of ball bearings, of which the inner rings are fitted around and fastened to the outside of the end sections of the rotation shafts, engage with the long guide holes so as to be able to displace in the radial direction of the sun roller and the ring-shaped roller.

6 Claims, 45 Drawing Sheets

(51) Int. Cl.
*F16H 13/10* (2006.01)
*H02K 7/116* (2006.01)
*F16H 13/14* (2006.01)

(56) References Cited

U.S. PATENT DOCUMENTS

| | | | | |
|---|---|---|---|---|
| 3,475,993 | A * | 11/1969 | Hewko | F16H 13/06 475/183 |
| 3,610,060 | A * | 10/1971 | Hewko | F16H 13/06 184/13.1 |
| 3,641,842 | A * | 2/1972 | Hewko | F16H 15/503 475/184 |
| 3,682,020 | A * | 8/1972 | Scheiter | F16H 13/06 475/114 |
| 6,851,532 | B2 * | 2/2005 | Back | F16H 45/02 192/113.35 |
| 2004/0023754 | A1 * | 2/2004 | Flugrad, Jr. | F16H 13/02 476/50 |

FOREIGN PATENT DOCUMENTS

| | | |
|---|---|---|
| JP | S58-134721 A | 8/1983 |
| JP | S59-187154 A | 10/1984 |
| JP | S61-136053 A | 6/1986 |
| JP | 2004-052729 A | 2/2004 |
| JP | 2004-116357 A | 4/2004 |
| JP | 2004-116670 A | 4/2004 |
| JP | 2006-082748 A | 3/2006 |
| JP | 2008-524522 A | 7/2008 |
| JP | 2009-138931 A | 6/2009 |
| JP | 2010-025237 A | 2/2010 |
| WO | 94/12811 A1 | 6/1994 |

OTHER PUBLICATIONS

Search Report dated Sep. 2, 2015 for European Patent Application No. 12757168.5. (12 pages).

Office Action date of mailing Aug. 18, 2014 for Japanese Patent Application No. JP2011-238867 and English translation of the same. (8 pages).

Office Action date of mailing Nov. 4, 2014 for Japanese Patent Application No. JP2011-057868 and English translation of the same. (7 pages).

* cited by examiner

FRICTION ROLLER REDUCER AND DRIVE UNIT FOR ELECTRIC AUTOMOBILE

CROSS-REFERENCE TO RELATED APPLICATIONS

This application is a U.S. national phase application filed under 35 U.S.C. §371 of International Application Number PCT/JP2012/056183, filed on Mar. 9, 2012, designating the United States, which claims priority from Japanese Patent Application Number 2011-057868, filed on Mar. 16, 2011, Japanese Patent Application Number, 2011-0238867, filed on Oct. 31, 2011, Japanese Patent Application Number 2011-254776, filed on Nov. 22, 2011, and Japanese Patent Application Number 2011-254816, filed on Nov. 22, 2011, which are hereby incorporated herein by reference in their entirety.

TECHNICAL FIELD

The present invention relates to a friction roller reducer for transmitting torque from an electric motor to driven wheels when assembled in the drive system of an electric automobile for example, and to a drive unit for an electric automobile in which this friction roller reducer is assembled.

BACKGROUND ART

In order to improve the convenience of electric automobiles that in recent years have begun to be widespread, it is very important that the distance traveled per one electric charge be lengthened by improving the efficiency of the electric motor. In order to improve the efficiency of the electric motor, using a compact electric motor that rotates at high speed, and transmitting the rotation of the output shaft of this electric motor to the driven wheels after reducing the rotating speed is effective. Of the reducers of an electric automobile, a first-stage reducer that is directly connected to the output shaft of the electric motor has a very fast operating speed, and it is necessary that vibration and noise be suppressed during operation. Therefore, use of a friction roller reducer as at least the first-stage roller is feasible. Friction roller reducers that can be used for this purpose are known and disclosed in JP 59-187154 A, JP 61-136053 A, and JP 2004-116670 A. Of these, conventional construction as disclosed in JP 2004-116670 A will be explained using FIG. 51 to FIG. 53.

This friction roller reducer 1 comprises an input shaft 2, and output shaft 3, a sun roller 4, ring-shaped roller 5, a plurality of planet rollers 6 as intermediate rollers, and a loading cam apparatus 7.

Of these, the sun roller 4 comprises a pair of sun roller elements 8a, 8b that are divided in the axial direction, and that are arranged concentrically around the input shaft 2 with a gap between the tip end surfaces of each and are capable of relative rotation with respect to the input shaft 2. The outer circumferential surfaces of these sun roller elements 8a, 8b are each provided with an inclined surface that is inclined in a direction such that the outer diameter becomes smaller going toward the tip end surface, and these inclined surfaces function as rolling contact surfaces. Therefore, the outer diameter of the rolling contact surface of the overall sun roller 4 is small in the middle section in the axial direction and becomes larger going toward both end sections.

Moreover, the ring-shaped roller 5 is overall ring shaped, and is supported by and fastened to a stationary portion such as a housing (not illustrated in the figure) so as to be arranged around the sun roller 4 and so as to be concentric with the sun roller 4. The inner circumferential surface of the ring-shaped roller 5 functions as a rolling contact surface and is inclined in a direction such that the inner diameter becomes larger going toward the center section in the axial direction.

The plurality of planet rollers 6 are arranged at a plurality of locations in the circumferential direction of a ring-shaped space 9 between the outer circumferential surface of the sun roller 4 and the inner circumferential surface of the ring-shaped roller 5. The planet rollers 6 are arranged so as to be parallel with the input shaft 2 and the output shaft 3, and each is supported around a planet shaft 10, which is a rotating shaft, by way of radial needle bearing so as to be able to rotate freely. The end sections of these planet shafts 10 and supported by and fastened to a carrier 11, which is a support frame, that is connected and fastened to the base end section of the output shaft 3. The outer circumferential surface of the planet rollers 6 is a convex curved surface having a generating line that is a partial arc shape, and each comes in rolling contact with the outer circumferential surface of the sun roller 4 and the inner circumferential surface of the ring-shaped roller 5.

Furthermore, the loading cam apparatus 7 is provided between one sun roller element 8a of the sun roller elements 8a, 8b and the input shaft 2. In order for this, a support ring 13 is fastened to the middle section of the input shaft 2 by a retaining ring 12, and a disc spring 14, cam plate 15 and a plurality of balls 16 as rolling bodies are located in that order from the side of the support ring 13 between the support ring 13 and the one sun roller element 8a. Driven-side cam surfaces 17 and driving-side cam surfaces 18 are provided at a plurality for locations in the circumferential direction of each the base end surface of the one sun roller element 8a and the surface on one side of the cam plate 15 that face each other. These cam surfaces 17, 18 are shaped such that the depth in the axial direction is the deepest in the center section in the circumferential direction, and gradually becomes shallower going toward both end sections.

As illustrated in FIG. 53A, this kind of loading cam 7 is such that when the input shaft 2 is stopped, the ball 16 is located in the deepest portion of the driven-side cam surface 17 and the driving-side cam surface 18. In this state, the elastic force of the disc spring 14 presses the one sun roller element 8a toward the other sun roller element 8b. On the other hand, as illustrated in FIG. 53B, as the input shaft 2 rotates, the ball 16 moves to the portion of the cam surfaces 17, 18 that are shallow. The space between the sun roller element 8a and cam plate 15 is opened up, and the sun roller element 8a is pressed toward the sun roller element 8b. As a result, the sun roller element 8a is rotated and driven while being pressed toward the sun roller element 8b with the larger force of the elastic force of the disc spring 14 and the thrust force that is generated by the ball 16 riding up on the cam surfaces 17, 18.

During operation of the friction roller reducer 1 described above, the space between the sun roller elements 8a, 8b is reduced by the thrust force in the axial direction that is generated by the loading cam apparatus 7. Also, the surface pressure at the rolling contact sections between the outer circumferential surface of the sun roller 4 that is constructed by these sun roller elements 8a, 8b and the outer circumferential surfaces of the planet rollers 6 increases. As the surface pressure increases, the planet rollers 6 are pressed outward in the radial direction of the sun roller 4 and ring-shaped roller 5. When this happens, the surface pressure at the rolling contact areas between the inner circumferential surface of the ring-shaped roller 5 and the outer circumferential surface of the planet gears 6 also increases. As a result, the surface pressure at a plurality of rolling contact areas between the input shaft 2 and output shaft 3, which are traction sections for transmitting power, increases according to the size of the torque to be transmitted between the input shaft 2 and the output shaft 3.

When the input shaft 2 is rotated in this state, this rotation is transmitted to the planet rollers 6 from the sun roller 4, and these planet rollers 6 revolve while rotating around the sun roller 4. The revolving motion of these planet rollers 6 is outputted by the output shaft 3 by way of the carrier 11. The surface pressure at the traction sections becomes proper according to the size of the torque that is to be transmitted between the input shaft 2 and the output shaft 3, so excessive sliding at the traction sections does not occur, and rolling resistance due to excessive surface pressure at traction sections does not uselessly increase.

During operation of the conventional friction roller reducer 1, the planet rollers 6 displace a small amount (for example a maximum of several hundred μm) in the radial direction of the sun roller 4 and ring-shaped roller 5 due to the movement of the loading cam apparatus 7. In other words, as the torque that is inputted to the friction roller reducer 1 from the input shaft 2 changes, the dimension in the axial direction of the loading cam apparatus 7 changes (expands or contracts), and the dimension on the radial direction of the portion of the one sun roller element 8a that has entered on the inside of the planet roller 6 changes. Due to this change, the planet rollers 6 displace in the radial direction of the sun roller 4 and the ring-shaped roller 5, however, in the construction illustrated in FIG. 51, this displacement is only allowed due to the elastic displacement of the planet shafts 10. Therefore, when the torque changes, displacement of the planet rollers 6 in the radial direction is not always performed smoothly, and it becomes easy for the surface pressure at the traction areas to become ununiform. When the surface pressure is not uniform, the transmission efficiency of the friction roller reducer 1 worsens.

As technology related to the present invention, construction that increases the operation response is disclosed in JP 2004-52729 A wherein in an apparatus in which the tip end section of a link is caused to engage with the groove in the radial direction of a drive ring and in a coil shaped groove of an intermediate rotating member, and the base end section of the link is connected to a lever of a driven shaft member, and a rotation operating force that is applied to the intermediate rotating member is converted to relative rotation between the drive ring and driven shaft member by way of the link, a weight adding section is provided in the link such that the centrifugal force due to the rotation of the apparatus does not act as a large moment on the link.

SUMMARY OF THE INVENTION

In consideration of the problems described above, the object of the present invention is to achieve construction of a friction roller reducer in which the displacement of an intermediate roller can be performed smoothly as the thickness in the axial direction of a loading cam apparatus changes, and that can obtain excellent transmission efficiency, and the a drive unit for an electric automobile in which this friction roller reducer is assembled.

The friction roller reducer of the present invention comprises a sun roller, a ring-shaped roller, a plurality of intermediate rollers, a loading cam apparatus and a pivot mechanism.

The sun roller comprises a pair of sun roller elements that are separated in the axial direction and located around an input shaft, so that when there is a space between the tip end surfaces of each, each is concentric and is capable of relative rotating with respect to the input shaft. Moreover, each of the sun roller elements has an outer circumferential surface, which is a rolling contact surface, that has an inclined surface that is inclined in a direction such that the outer diameter thereof becomes smaller going toward the respective tip end surface.

The ring-shaped roller is located around the outside of the sun roller so as to be concentric with the sun roller, and has an inner circumferential surface, which is a rolling contact surface.

Moreover, a plurality of intermediate rollers are supported at a plurality of locations in the circumferential direction of a ring-shaped space between the outer circumferential surface of the sun roller and the inner circumferential surface of the ring-shaped roller so as to be able to rotate freely around rotation shafts that are arranged parallel with the input shaft, and each intermediate roller has an outer circumferential surface that comes in rolling contact with the outer circumferential surface of the sun roller and the inner circumferential surface of the ring-shaped roller.

The loading cam apparatus is provided between at least one movable sun roller element of the sun roller elements and the input shaft, and as the input shaft rotates, causes the movable sun roller element to rotate while pressing the movable sun roller element in the axial direction toward the other sun roller element. The loading cam apparatus has: driven-side cam surfaces that are provided at a plurality of locations in the circumferential direction of the base end surface of the movable sun roller element, and each is shaped such that the depth in the axial direction thereof gradually changes in the circumferential direction and becomes more shallow going toward the end section; driving-side cam surfaces that are provided at a plurality of locations in the circumferential direction of the surface on one side of a cam plate that faces the base end surface of the movable sun roller element, and each is shaped such that the depth in the axial direction thereof gradually changes in the circumferential direction and becomes more shallow going toward the end section; and a plurality of rolling bodies that are held between the each of the driven-side cam surfaces and the driving-side cam surfaces.

Furthermore, the pivot mechanism causes each of the intermediate rollers to pivotally displace in the radial direction of the sun roller and the ring-shaped roller as the thickness in the axial direction of the sun roller changes due to displacement in the axial direction of the movable sun roller element.

The friction roller reducer of the present invention is such that one member of the ring-shaped roller and a member that supports the rotation shafts is fastened, and the other member is connected to an output shaft, such that this other member rotates and drives the output shaft.

Preferably, the portion of the outer circumferential surface of the sun roller elements that come in rolling contact with the outer circumferential surface of the intermediate rollers is a partial conical convex inclined surface that is inclined in a direction such that the outer diameter becomes smaller going toward the tip end surface. Moreover, the outer circumferential surfaces of the intermediate rollers are complex curved surfaces that comprise a cylindrical convex surface in the middle section in the axial direction, the outer diameter in the axial direction thereof being constant, and a pair of partial conical convex shaped inclined surfaces on the portions near both ends in the axial direction, that are inclined in a direction such that the outer diameter becomes smaller going toward the both end surface in the axial direction. And the inner circumferential surface of the ring-shaped roller is a cylindrical concave surface, the inner diameter thereof being constant in the axial direction.

More specifically, construction can be employed wherein the member that supports the rotation shafts is stationary and does not rotate, and the intermediate rollers only rotate around the respective rotation shafts that are provided on the member that supports the rotation shafts, and transmit torque from the sun roller to the ring-shaped roller, and this ring-shaped roller is concentrically connected with the output shaft and rotates together with the output shaft.

Alternatively, construction can be employed wherein the ring-shaped roller is stationary and does not rotate, and the member that supports the rotation shafts rotates; the intermediate rollers are planet rollers that revolve around the sun roller together with the member that supports the rotation shafts while also rotating around the respective rotation shafts that are provided on the member that supports the rotation shafts; and the member that supports the rotation shafts is concentrically connected to the output shaft, and rotates together with the output shaft.

Preferably the pivot mechanism of the friction roller reducer of the present invention is constructed by: a support frame for supporting the end section of the rotation shaft of the intermediate roller so as to be able to rotate freely; a long guide section that is long in the radial direction of the sun roller and the ring-shaped roller; and a rolling bearing that comprises an inner ring that is fitted around and fastened to the outside of the end section of the rotation shaft, and an outer ring that engages with the guide section so as to be able to displace in the radial direction of the sun roller and the ring-shaped roller.

Alternatively, the pivot mechanism supports is constructed by: a plurality of pivot frames that supports the intermediate rollers so as to be able rotate freely around the respective rotation shafts, and a support frame that supports these pivot frames so as to be able to displace in the radial direction of the sun roller and the ring-shaped roller.

When the pivot mechanism is constructed by the pivot frames and the support frame, the pivot frames are supported by the support frame so as to be able to pivotally displace around each of a plurality of pivot shafts that are parallel with the rotation shafts and that are located on the support frame such that the phase of the pivot shafts in the direction of rotation of the sun roller is separated from the rotation shafts; and these pivot frames support the rotation shafts so as to be able to displace in the radial direction of the sun roller and the ring-shaped roller.

In this case, preferably, each pivot frame comprises abase section having the pivot shaft, and a pair of support arms that extend in the same direction as each other and essentially parallel from both end sections in the axial direction of the base section. Both end sections of the rotation shaft are supported between the tip end sections of these support arms.

Furthermore, preferably, the rotation shafts are constructed by bolts each having: a circular column section in the middle section in the axial direction, a male screw section on the tip end section having a diameter that is smaller than the circular column section, and a head section on the base end section having a diameter that is larger than the circular column section. Moreover, a through hole having a smaller diameter than the head section is formed in one of the tip end sections of each pair of support arms of the pivot frames, and a screw hole in which the male screw section can be screwed is formed in the other tip end section so as to be concentric with the through hole; and by inserting the circular column section through the through hole and screwing the male screw section in the screw hole, the rotation shaft is supported and fastened between the pair of support arms, and the space between the pair of support arms is prevented from expanding.

In this case, additionally, construction can be employed wherein a counterweight section is provided on the opposite side from the tip end section of the base section, and as the intermediate roller revolves, a force outward in the radial direction of the support frame that is applied to the planet roller due to a centrifugal force is reduced or cancelled out by the centrifugal force that is applied to the counterweight section.

In construction where the pivot frames are supported by the support frame so as to be able to pivotally displace around each of a plurality of pivot shafts that are parallel with the rotation shafts and that are located on the support frame such that the phase of the pivot shafts in the direction of rotation of the sun roller is separated from the rotation shafts, alternatively, each of the pivot frames can be formed by connecting and fastening together by way of connecting sections both ends in the lengthwise direction of a pair of support plate sections that are separated in the axial direction, and supports both end sections of the rotation shaft between the middle sections in the lengthwise direction of these support plate sections.

Moreover, when the pivot mechanism is constructed by a plurality of pivot frames and a support frame that supports these pivot frames, alternatively, the structure can be adopted where the support frame comprises concave support sections at a plurality of locations in the circumferential direction of the surface on one side in the axial direction; each pivot frame is formed by connecting and fastening together by way of connecting section both ends in the lengthwise direction of a pair of support plate sections that are separated in the axial direction; both end sections of the rotation shaft are supported between the middle sections in the lengthwise direction of these support plate sections; and the pivot frames is supported inside each of the concave support section so as to be able to pivotally displace around the area of contact between the outside surface of one end section in the lengthwise direction of each of the pivot frames and an inside surface of each of the concave support sections.

The drive unit for an electric automobile of the present invention comprises: an electric motor; a friction roller reducer having an input shaft that rotates together with an output shaft of the electric motor; a transmission apparatus having an input-side transmission shaft that is rotated and driven by an output shaft of the friction roller reducer, and an output-side transmission shaft, where the reduction ratio between this input-side transmission shaft and the output-side transmission shaft can be changed between at least two stages, high and low; wherein the friction roller reducer is constructed by a friction roller reducer of the present invention described above.

With the friction roller reducer of the present invention constructed as described above, construction of a friction roller reducer is achieved wherein displacement of intermediate rollers due to the change in thickness in the axial direction of loading cam apparatuses can be performed smoothly, and excellent transmission efficiency can be obtained. With such characteristics, when this friction roller reducer is assembled in a drive unit for an electric automobile, a highly efficient drive unit is achieved, and it is possible to lengthen the distance that can be traveled per electric charge.

BRIEF DESCRIPTION OF THE DRAWINGS

FIGS. 18A and 18B are drawings for explaining the size of the centrifugal force that is applied to a planet roller as the planet roller revolves during operation of a friction roller reducer of the fourth example of an embodiment of the present invention, wherein FIG. 18A is a partial front view illustrating the case of employing the construction of this example, and FIG. 18B is a partial front view illustrating the case of employing the construction of the first example of an embodiment.

FIG. 39A illustrates the preferred case, and FIGS. 39B and 39C illustrate two examples of non-preferred cases.

FIG. 41A illustrates the construction of this example, and FIG. 41B illustrates construction that is not this example.

FIG. 53A illustrates the state in which the loading cam does not generate torque, and FIG. 53B illustrates the state in which the loading cam does generate torque.

DETAILED DESCRIPTION OF THE PREFERRED EMBODIMENTS

First Example

Figure 1:
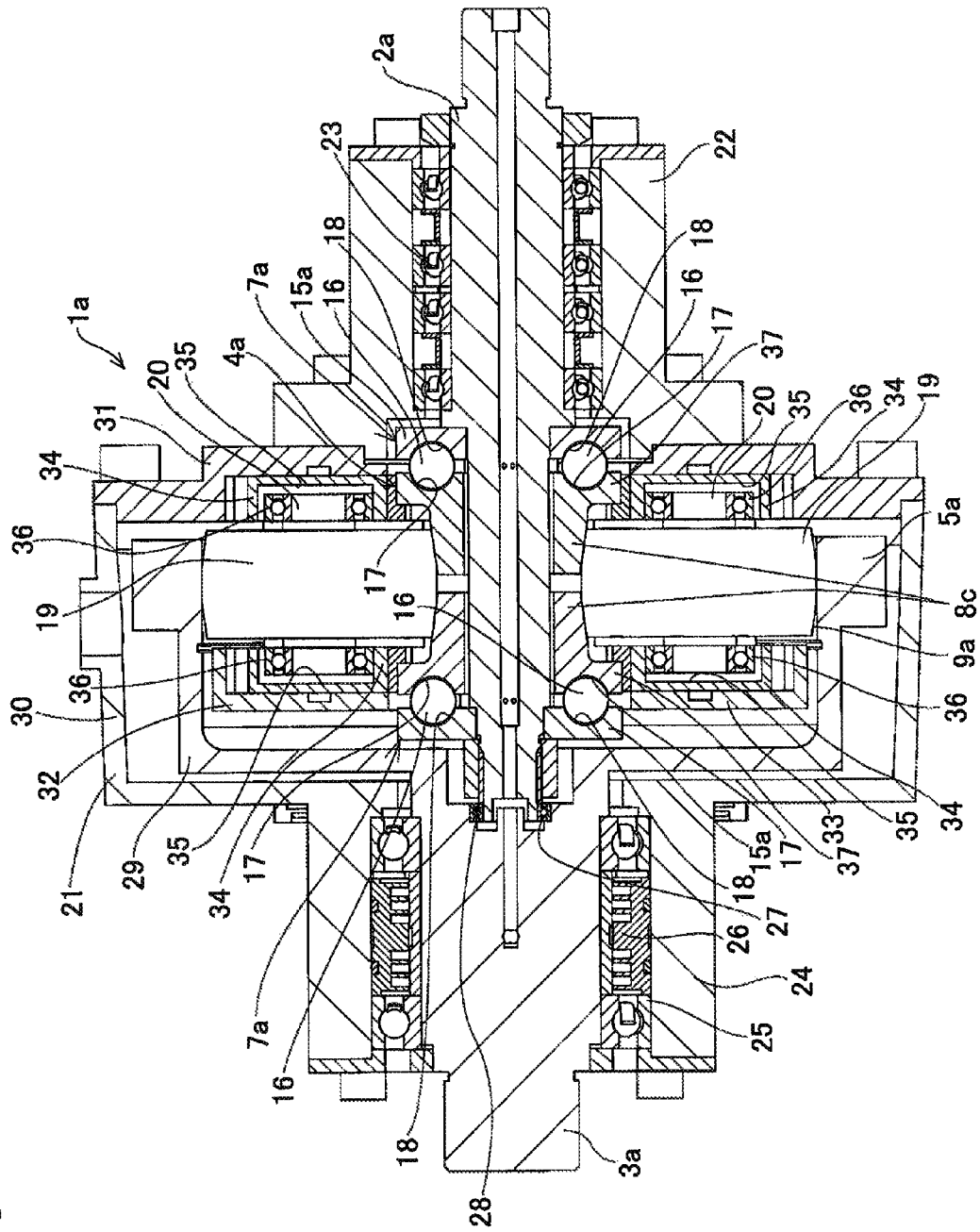
FIG. 1 is a cross-sectional view of a first example of an embodiment of the present invention.

FIG. 1 to FIG. 8 illustrate a first example of an embodiment of the present invention. As illustrated in FIG. 1, the friction roller reducer $1a$ of this example is such that an input shaft $2a$ rotates and drives a sun roller $4a$, the rotation of this sun roller $4a$ is then transmitted to a ring-shaped roller $5a$ by way of a plurality of intermediate rollers $19$, and the rotation of this ring-shaped roller $5a$ is outputted by way of an output shaft $3a$. The intermediate rollers $19$ only rotate about rotating shafts $20$ provided in the center section thereof, and do not revolve around the sun roller $4a$. The sun roller $4a$ is constructed by a combination of a pair of sun roller elements $8c$ that have the same shape as each other and are mounted concentrically, and a pair of loading cam apparatuses a$7a$ that are located on both sides on the axial direction of these sun roller elements $8c$. These members are housed inside a stepped cylindrical shaped housing $21$ having a diameter in the middle section in the axial direction that is large, and a diameter on both end sections that is small. In the following, the construction of each member will be explained in detail.

First, the base side half section of the input shaft $2a$ (right side half section in FIG. 1) is supported on the inside of the small-diameter cylindrical section $22$ on the input side of the housing $21$ by way of an input-side ball bearing unit $23$ an as to be able to rotate freely, and the output shaft $3a$ is supported on the inside of the small-diameter cylindrical section $24$ on the output side of the housing $21$ by way of an output-side ball bearing unit $25$ so as to be able to rotate freely. An output-side seal unit $26$ is provided between a pair of ball bearings of the output-side ball bearing unit $25$ and prevents foreign matter on the external space side from getting inside the housing $21$ through the portion where the output shaft $3a$ is located. The input shaft $2a$ and the output shaft $3a$ are arranged so as to be concentric with each other, and the tip end section of the input shaft $2a$ is supported by a ball bearing $28$ on the inside of a circular shaped concave section $27$ that is formed on the center section of the base end surface of the output shaft $3a$. With this construction, the support rigidity (particularly the radial rigidity) of the tip side half section (left side half section in FIG. 1) of the input shaft $2a$ while maintaining the free relative rotation between the input shaft $2a$ and the output shaft $3a$. Moreover, the base end section of the output shaft $3a$ is connected to the ring-shaped roller $5a$ by of a connecting section $29$ having an L-shaped cross section. This ring-shaped roller $5a$ is located on the inner-diameter side of the large-diameter cylindrical section $30$ provided in the middle section in the axial direction of the housing $21$, in the portion around the outside of the sun roller $4a$ such as to be concentric with the sun roller $4a$. In this example, the inner circumferential surface of the ring-shaped roller $5a$ is a cylindrical surface whose inner diameter does not change in the axial direction.

The pair of sun roller elements $8c$ are located around the tip side half section of the input shaft $2a$ and are concentric with the input shaft $2a$, and there is a gap between the tip end surfaces (surfaces that face each other) of both such that relative rotation with respect to the input shaft $2a$ is possible. Moreover, a pair of cam plates $15a$ of the pair of loading cam apparatuses $7a$ are fitted and fastened around the outside of two locations, the middle section and tip end section of the input shaft $2a$, and are located on both sides in the axial direction of the sun roller element $8c$, and rotate in synchronization with the input shaft $2a$. Driven-side cam surfaces $17$ and driving-side cam surfaces $18$ are provided at a plurality of locations each in the circumferential direction on the base end surfaces of the sun roller elements $8c$ and one of the side surfaces of the cam plates $15$ that face each other, and balls $16$ are held between these cam surfaces $17$, $18$ to form the loading cam apparatuses $7a$. The shapes of these cam surfaces $17$, $18$ are basically the same as in the conventional construction and are free to be appropriately changed according to the required performance. In any case, these cam surfaces $17$, $18$ are such that the depth in the axial direction gradually changes in the circumferential direction, with the center section in the circumferential direction being the deepest and becoming more shallow going toward both end sections in the circumferential direction.

Figure 2A:
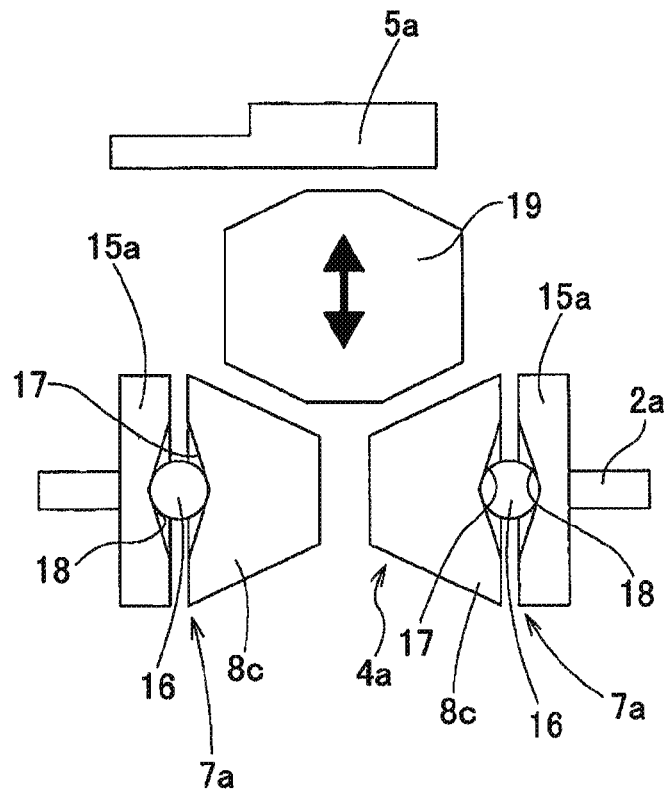
FIGS. 2A and 2B are schematic diagrams for explaining the mechanism for applied a preload in the first example of an embodiment of the present invention.

In this example, by placing the loading cam apparatuses $7a$ on both sides in the axial direction of the sun rollers $4a$, when torque is inputted to the input shaft $2a$, as will be described next, the surface pressure at the areas of traction, which are areas of rolling contact between the circumferential surfaces of the sun roller $4a$, intermediate rollers $19$ and the ring-shaped roller 5a, increases. First, as illustrated in FIG. 2A, in a state where no torque is inputted to the input shaft 2a, the balls 16 of the loading cam apparatuses 7a are located on the bottom section or on the side near the bottom section of the cam surfaces 17, 18. In this state, the thickness dimension of the loading cam apparatuses is small, and the gap between sun roller elements 8c is wide. In this state, the intermediate rollers 19 are not pressed outward in the radial direction of the sun roller 4a and ring-shaped roller 5a, or in the case that they are pressed by the elastic force of a pre-loaded spring, the force by which they are pressed is small.

Figure 2B:
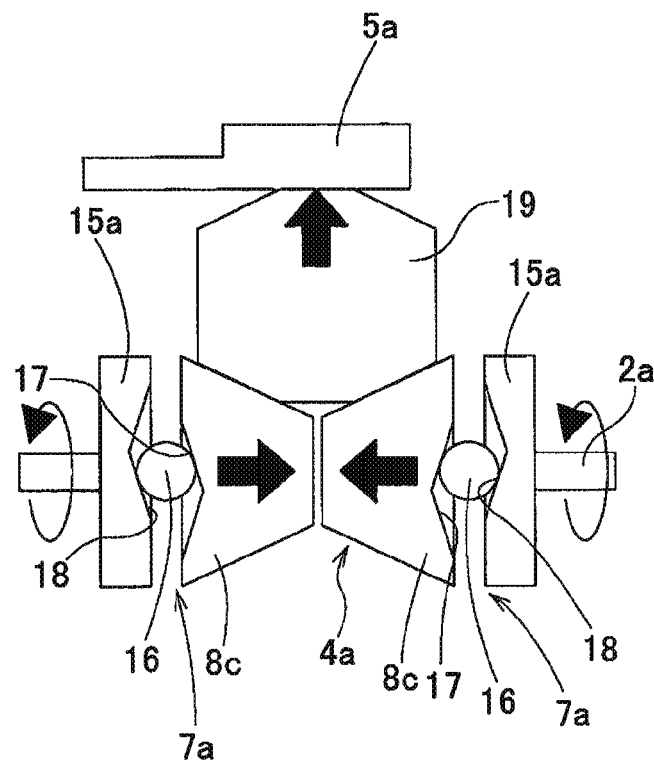

From this state, as illustrated in FIG. 2B, when torque is inputted to the input shaft 2a (the friction roller reducer 1a starts operating), the thickness in the axial direction of the loading cam apparatuses 7a increases due to the engagement between the balls 16 and the cam surfaces 17, 18. The sun roller elements 8c then bite into the inner sides of the intermediate rollers 19 in the radial direction of the friction roller reducer 1a, and press these intermediate rollers 19 outward in the radial direction of the friction roller reducer 1a. As a result, the surface pressure at the areas of traction between the sun roller 4a, the ring-shaped roller 5a and the intermediate rollers 19 increases, and power is transmitted from the sun roller 4a to the ring-shaped roller 5a without excessive sliding occurring in these areas of traction.

During operation of the friction roller reducer 1a, the intermediate rollers 19 rotate about the respective rotation shafts 20, and at the same time, displace in the radial direction of the friction roller reducer 1a as the transmitted torque fluctuates. In this example, construction as will be explained in the following is used as a pivot mechanism in order for the rotation and displacement in the radial direction of the intermediate rollers 19 to be performed smoothly. In other words, in this example, a support frame 32 for supporting the intermediate rollers 19 is constructed by an end plate 31 that covers one side in the axial direction of the large-diameter cylindrical section 30 of the housing 21, a support plate 33 that is located on the opposite side in the axial direction of the intermediate rollers 19 from the end plate 31, and stays (not illustrated in the figure) that hold the end plate 31 and support plate 33 in the portions between intermediate rollers 19 in the circumferential direction. In this way, a support frame 32 having construction like a carrier of a planetary gear mechanism is formed in a ring-shaped space 9a between the inner circumferential surface of the ring-shaped roller 5a and the outer circumferential surface of the sun roller 4a.

A plurality of guide blocks 34, which are guide sections from the intermediate rollers 19, are supported by and fastened to the inside surfaces of the end plate 31 and support plate 33 of the support frame that face each other. Long guide holes 35 that are long in the radial direction of the ring-shaped roller 5a and the sun roller 4a are formed in the inside surfaces of the guide blocks 34. On the other hand, single-row deep-groove type ball bearings 36 are supported on the end section of each of the rotating shafts 20 by fitting the inner rings of the ball bearings 36 around the outside of the end sections of the rotating shafts 20 with an interference fit. Moreover, the outer diameter of the outer rings of the ball bearings 36 is a little less than the width dimension of the long guide holes 35 (for example several μm to tens of μm). Therefore, the rotating shafts 20 are supported by the guide blocks 34 such that there is mostly no backlash in the circumferential direction, and so that a little displacement is possible in the radial direction of the ring-shaped roller 5a and the sun roller 4a.

The outer circumferential surface of the intermediate rollers 19 is such that the middle section in the axial direction is a simple cylindrical surface, and the portions on both sides are partial conical convex inclined surfaces that are inclined in the same direction and at the same angle as the outer circumferential surface of the sun roller elements 8c. Therefore, the outer surfaces of the sun roller 4a, intermediate rollers 19 and ring-shaped roller 5a come in contact with each other, and contact area of the traction areas between them is maintained.

Furthermore, in the case of the friction roller reducer 1a of this example, outward facing flange sections 37 are formed around the outer circumferential surface on the base end section of the sun roller elements 8c. In other words, of the outer circumferential surface of these sun roller elements 8c, the portion that comes in rolling contact with the outer circumferential surface of the intermediate rollers 19 is an inclined surface that is inclined in a direction such that the outer diameter becomes smaller going to the tip end surface, and the flange section 37 protrudes outward in the radial direction from the base end section of this inclined surface around the entire circumference. The plurality of concave sections 38 and the driven-side cam surfaces 17 are alternately arranged in the circumferential direction of the base end surface of the sun roller elements 8c including the flange section 37. Of these, the concave sections 38 are such that wide section 39 having a large width dimension in the radial direction and a narrow section 40 having a small width dimension in the radial direction are continuous in the circumferential direction. The arrangement direction of the narrow section 40 and the wide section 39 in the circumferential direction is the same among the concave sections 38. Moreover, the sun roller elements 8c are combined so that they are the same but facing in opposite directions in the axial direction. Therefore, the arrangement direction of the wide section 39 and the narrow section 40 between one sun roller 8c and the other sun roller element 8c are opposite each other.

On the other hand, strike plate sections 41 are provided on part of the inside surfaces (side surfaces on both sides that face each other) of the pair of cam plates 15a so that when the sun roller elements 8c are placed together they are in a portion that is aligned with the wide sections 39 of the concave sections 38. The strike plates 41 have a height dimension in the axial direction, and a width dimension in the radial direction so as to be able to enter into the wide sections 39 of the concave sections 38.

Figure 5:
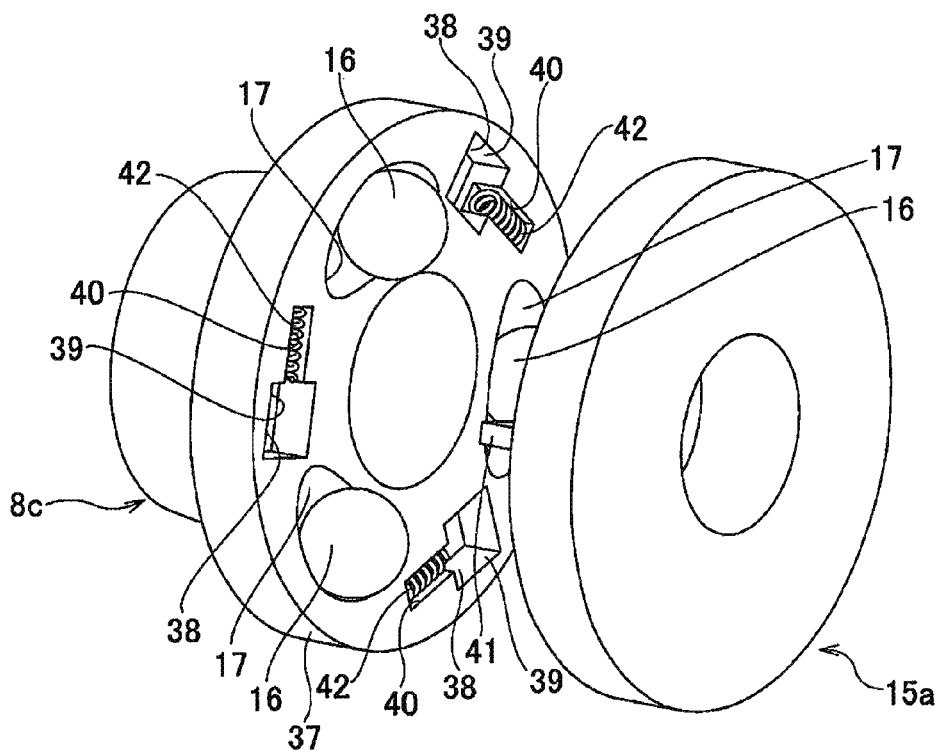
FIG. 5 is a perspective drawing that illustrates balls and compressing coil springs of a sun roller element and cam plate that have been removed from the right side in the center section of FIG. 1.
Figure 6:
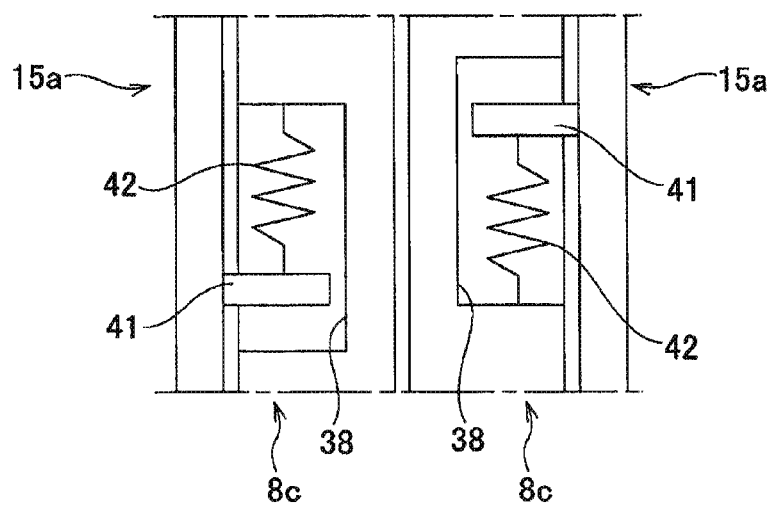
FIG. 6 is a schematic diagram for explaining the direction of preloading applied by compression springs in the first example of an embodiment of the present invention.
Figure 7:
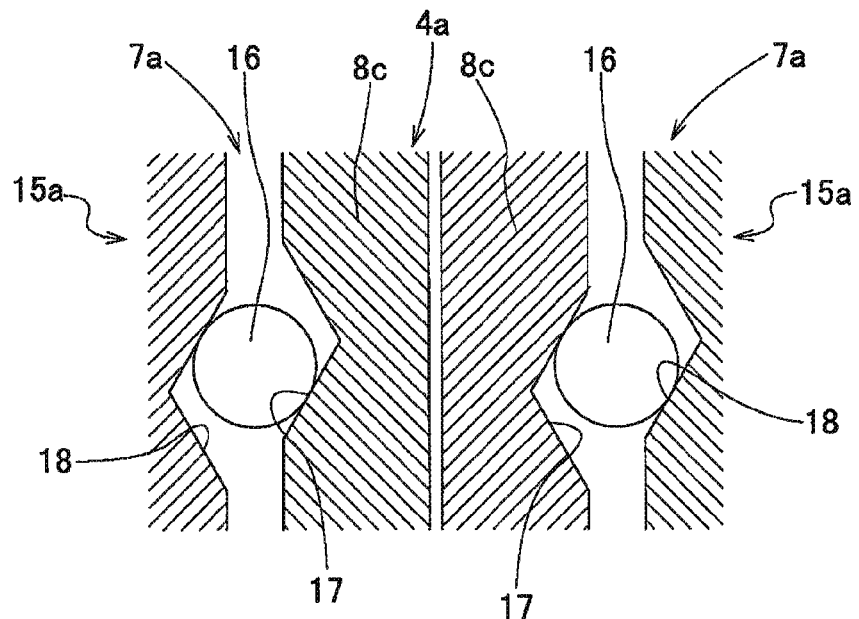
FIG. 7 is a schematic diagram for explaining the engaged state between the cam surfaces on the driving side and the driven side and the balls in the first example of an embodiment of the present invention.
Figure 8:
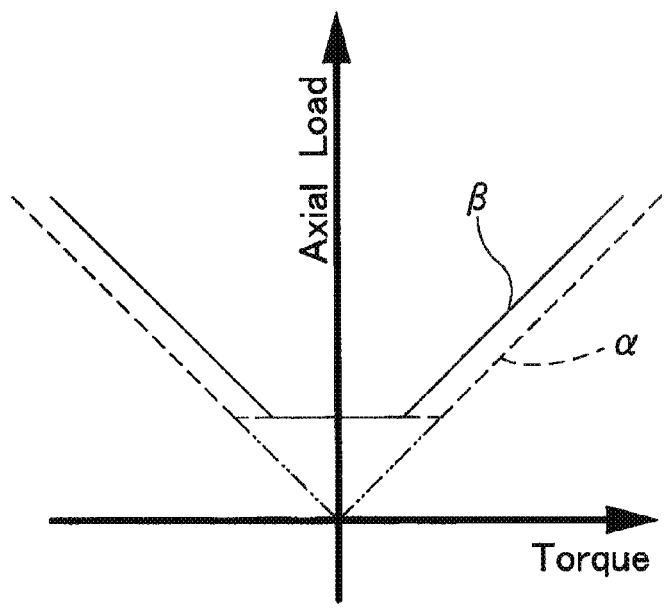
FIG. 8 is a graph that illustrates the relationship between the size and direction of torque that is applied to the input shaft and the pressure in the axial direction that is generated by a loading cam apparatus in the first example of an embodiment of the present invention.

As illustrated in FIG. 5, compression coil springs 42, which are elastic members, are inserted into the narrow sections 40 of the concave sections 38 that are provided on the base end surface of the sun roller element 8c. In this state, the strike plates 41 that is provided on the inside surface of the cam plates 15a are inserted into the wide sections 39 of the concave sections 38, and the compression coil springs 42 are held in the compressed state between one side surface in the circumferential direction of the strike plates 41 and the inside surfaces (surfaces on the back ends) of the narrower sections 40 of the inside end surfaces in the circumferential direction of the concave sections 38. In FIG. 5, the compression coil springs 42 are drawn in the elastically compressed state, however, in the free state, one of the end sections of the compression coil springs 42 protrude a large amount into the wide sections 39 of the concave sections 38. With this kind of construction, the pre-loading mechanisms of the loading cam apparatuses 7a are formed between the sun roller elements 8c and the cam plates 15a.

As described above, with the loading cam apparatuses 7a in the assembled state, an elastic force is applied between the sun roller elements 8c and the cam plates 15a in a direction that causes relative displacement in the circumferential direction between the sun roller elements 8c and these cam plates 15a. In this example, the directions of relative rotation of the sun roller elements 8c around the input shaft 2a are opposite each other between these sun roller elements 8c. Even in the state in which torque is not inputted to the input shaft 2a, the balls 16 are caused to displace toward the shallow portions of the driven-side cam surfaces 17 and the driving-side cam surfaces 18. This displacement causes a pressure force to be generated in the cam section in a direction in which the thickness dimension becomes larger in the axial direction, such that a pre-load for maintaining the surface pressure at the areas of traction between the sun roller 4a, the ring-shaped roller 5a and the intermediate rollers 19 is applied to the loading cam apparatuses 7a.

It is possible to reverse the surface on which the concave sections 38 are formed and the surface on which the strike plate sections 41 are formed so as to be opposite to that of this example. In other words, the strike plate sections can be formed on the base end surface of the sun roller element, concave sections can be formed in the surface of one side of the cam plates, and compression coil springs can be placed inside these concave sections. Alternatively, it is also possible to use an elastic member other than a compression coil spring as the elastic member of applying a pre-load. For example, it is possible to mount both end sections of a tension spring to a mounting pin provided in a protruding condition on the base end surface of the sun roller elements and the surface on one side of the cam plate. It is also possible as an alternative to engage both end sections of a torsion coil spring to mounting holes that are formed in the base end surface of the sun roller elements and the surface on one side of the cam plate. As long as it is possible to apply an elastic force in a direction that causes relative displacement in the circumferential direction between the cam plate and the sun roller elements with the input shaft, around the outside of which the cam plate is fastened, stopped, any arbitrary elastic member can be used.

The friction roller reducer 1a of this example, constructed as described above, by functioning as described below, transmits power from the input shaft 2a to the outer shaft 3a while increasing torque at the same time as reducing the speed. In other words, when the electric motor rotates and drives the input shaft 2a, the pair of cam plates 15a that fit around the outside of the input shaft 2a rotate, and due to the engagement between the balls 16, driven-side cam surfaces 17 and driving-side cam surfaces 18, the pair of sun roller elements 8c are pressed in a direction toward each other, and begin to rotate in the same direction and at the same speed as the input shaft 2a. Then, the rotation of the sun roller 4a that is constructed by these sun roller elements 8c is transmitted to the ring-shaped roller 5a by way of the plurality of intermediate rollers 19, and outputted from the output shaft 3a. Traction oil is circulated inside the housing 21 while the friction roller reducer 1a is operating, so there is a thin film of traction oil at the areas of rolling contact (traction areas) between the outer circumferential surfaces of the sun roller 4a, intermediate rollers 19 and ring-shaped roller 5a. Moreover, due to the pressure in the cam section that is generated due to the elastic force of the compression coil springs 42, the surface pressure at these areas of traction is maintained to a certain extent from the instant that the friction roller reducer 1a starts operating. Therefore, from this instant when operation starts, power begins to be transmitted without excessive sliding occurring at these areas of traction.

Figure 3:
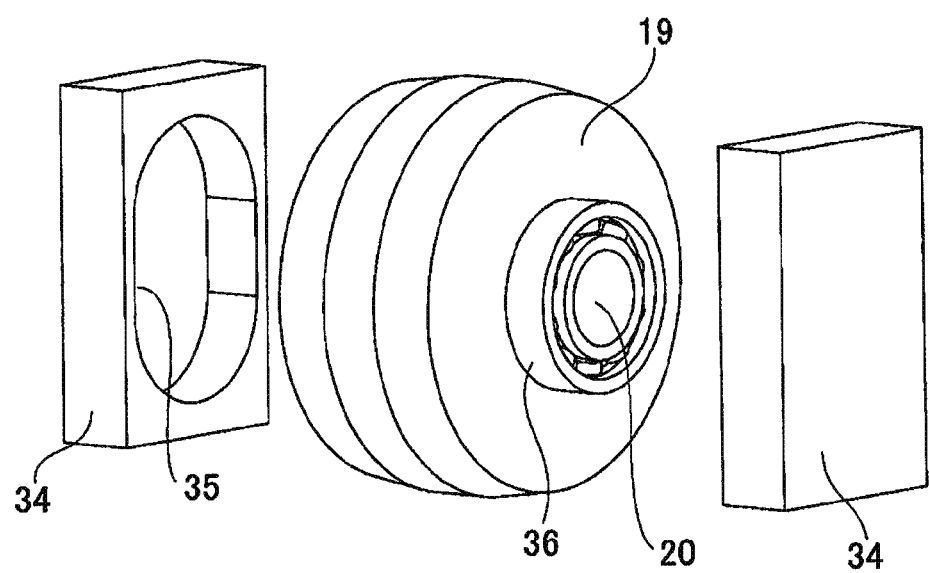
FIG. 3 is an exploded perspective drawing illustrating the construction of a pivot mechanism that supports the rotation shaft of an intermediate roller so as to be able to displace in the radial direction of a sun roller and ring-shaped roller in the first example of an embodiment of the present invention.
Figure 4:
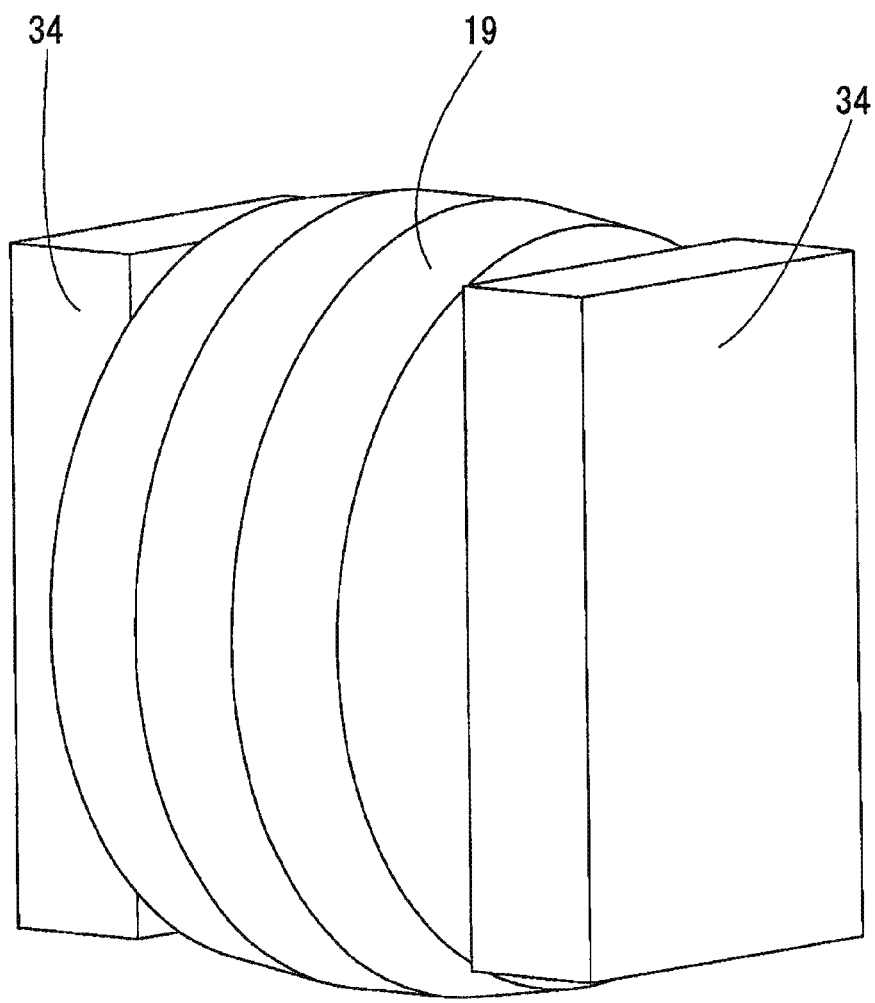
FIG. 4 is a perspective view illustrating the assembled state of an intermediate roller and pivot mechanism in the first example of an embodiment of the present invention.

As the torque that is applied to the input shaft 2a increases, the amount that the balls 16 of the loading cam apparatuses ride up on cam surfaces 17, 18 increases, and thus the thickness in the axial direction of these loading cam apparatuses 7a increases even more. As a result, the surface pressure at the areas of traction between the sun rollers 4a, intermediate rollers 19 and ring-shaped roller 5a increases even more, and torque is transmitted at these traction areas without excessive sliding occurring. The surface pressure at these traction areas is automatically adjusted to a proper value according to the torque that is to be transmitted between the input shaft 2a and the output shaft 3a, and more specifically to a value that is the result of multiplying the minimum required value with a suitable safety factor. As a result, regardless of fluctuation in the torque that is transmitted between the input shaft 2a and the output shaft 3a, it is possible to prevent excessive sliding from occurring at the traction areas between the sun roller 4a, intermediate rollers 19 and ring-shaped roller 5a, and conversely, it is possible to prevent rolling resistance at these traction areas from becoming needlessly large, and thus it is possible to improve the transmission efficiency of the friction roller reducer 1a. Particularly, in this example, as illustrated in FIG. 1 and FIG. 3, the outer ring of the ball bearings 36 that support both end sections of the intermediate rollers 19 come in rolling contact with the inside surface of the long guide holes 35, so the intermediate rollers 19 displace smoothly outward in the radial direction. It is also possible to prevent the surface pressure at the traction areas between the sun roller 4a, intermediate rollers 19 and the ring-shaped roller 5a from becoming uneven, and so it is possible to keep the surface pressure at these traction areas proper, and improve the transmission efficiency of the friction roller reducer 1 even more. In other words, the rolling friction resistance stays at about 1/10 the sliding friction resistance, so the intermediate rollers 19 displace smoothly in the radial direction according to the rolling movement of the outer rings of the ball bearings 36 with respect to the inside surfaces of the long guide holes 35. Therefore, the traction coefficient at the areas of rolling contact between the outer circumferential surfaces of the intermediate rollers 19 and the inner circumferential surface of the ring-shaped roller 5a, and the traction coefficient between the outer circumferential surfaces of these intermediate rollers 19 and the outer circumferential surface of the sun roller 4a are nearly the same. In regards to the construction of this example, in the case of construction in which displacement in the radial direction of the intermediate rollers 19 cannot be performed smoothly, the surface pressure at the areas of rolling contact between the outer circumferential surface of the intermediate rollers 19 and the inner circumferential surfaces of the ring-shaped roller 5 does not increase until the surface pressure at the areas of rolling contact between the outer circumferential surfaces of the sun roller elements 8c of the sun roller 4a and the outer circumferential surface of the intermediate rollers 19 increase due to the operation of the loading cam apparatuses 7a. In this state, a large difference occurs between the traction coefficients of these areas of rolling contact, with the traction coefficient on the sun roller 4a side becoming much less than the traction coefficient on the ring-shaped roller 5a side, and thus the transmission efficiency of the friction roller reducer 1a becomes bad.

Furthermore, in the case of the construction of this example, regardless of the rotation direction of the input shaft 2a and output shaft 3a, it is possible to make the characteristics the same at the start of operation of the friction roller reducer 1a. The reason for this will be explained with reference to FIG. 7. As described above, the directions in which the compression coil springs 42 press the sun roller elements 8c between the loading cam apparatuses 7a are opposite each other, so the positional relationship of the balls 16 and cam surfaces 17, 18 of the loading cam apparatuses 7a is symmetrical in the direction of rotation. Therefore, even when the input shaft 2a and output shaft 3a rotating in any direction, the characteristics at the start of operation of the friction roller reducer 1a can be made the same. At the start of operation, the sun roller 4a that is constructed by the pair of sun roller elements 8c displaces a little in the axial direction, and due to this, the intermediate rollers 19 that come in rolling contact with the outer circumferential surface of the sun roller 4a also displace a little in the axial direction. In this example, the inner circumferential surface of the ring-shaped roller 5a that comes in rolling contact with the outer circumferential surfaces of the intermediate rollers 19 is a simple cylindrical surface. Moreover, the long guide holes 35 that engage with the ball bearings 36 have a depth that allow displacement in the axial direction a certain amount. Therefore, displacement in the axial direction of the intermediate rollers 19 is performed smoothly, and these intermediate rollers 19 do not incline with respect to the rotation shafts 20.

Furthermore, in this example, by allowing relative displacement between the sun roller elements 8c and the cam plates 15a of the loading cam apparatuses 7a, a pre-load is applied to the traction areas. Therefore, efficiency of the loading cam apparatuses 7a is good, maintaining the stroke can be performed easily, and it becomes easy to sufficiently maintain durability. The reason for this is that in the case of the construction of this example, the compression coil springs 42 press the balls 16, which causes a pressure force in the cam section to be generated in loading cam apparatuses 7a. In other words, the compression coil springs 42 generate a pressure force in the cam section in the loading cam apparatuses 7a by nearly the same way as in the case when torque is inputted to the input shaft 2a. Even after torque is inputted to the input shaft 2a, the compression coil springs 42 continue to press the balls 16.

Figure 51:
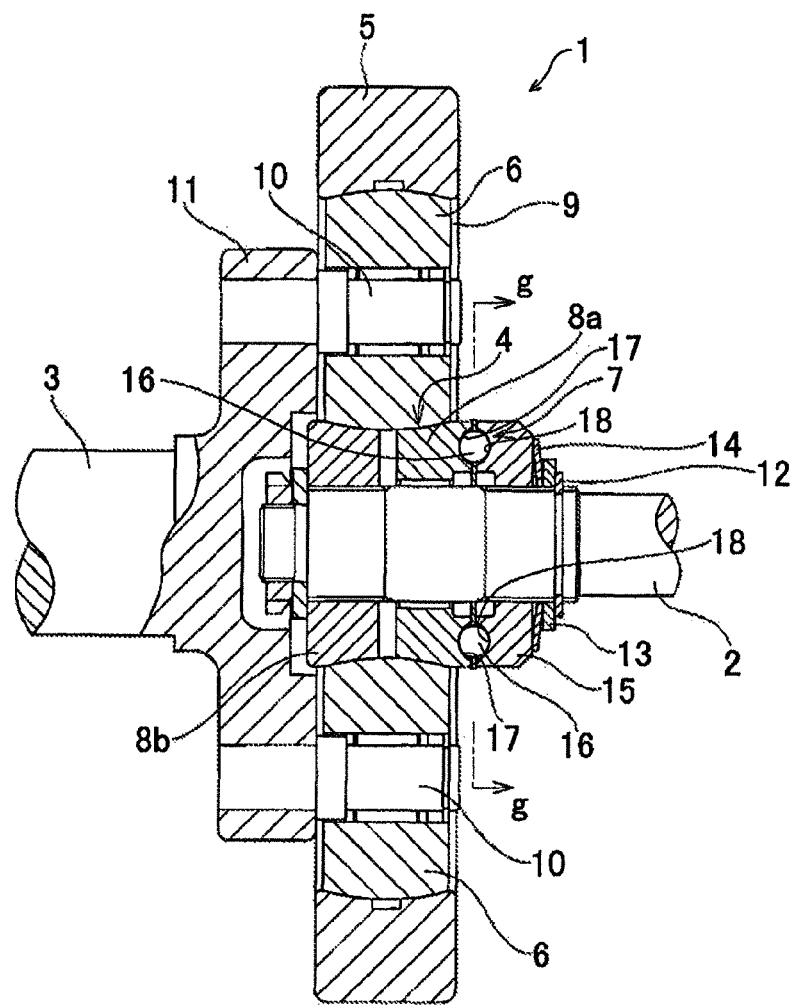
FIG. 51 is a cross-sectional drawing illustrating an example of conventional construction.
Figure 52:
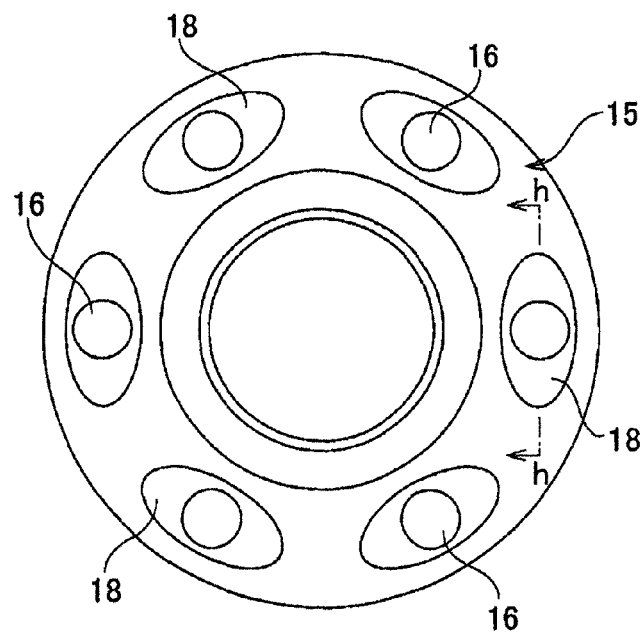
FIG. 52 is a cross-sectional drawing illustrating section "g-g" in FIG. 51 with part omitted.
Figure 53A:
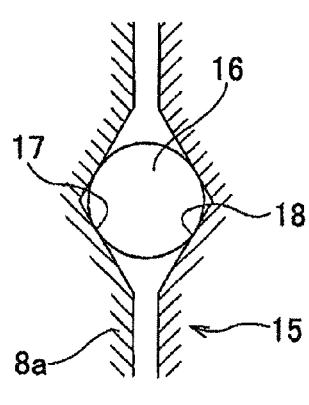
FIGS. 53A and 53B are schematic drawings corresponding to section "h-h" in FIG. 52, where
Figure 53B:
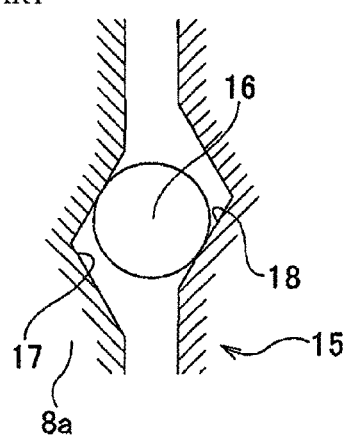

Therefore, the elastic force of the compression coil springs 42 contribute to increasing the total pressure force that is generated by the loading cam apparatuses 7a. A situation does not arise, as in the conventional construction illustrated in FIG. 51, where in a state that the pressure force of the cam section that is generated in the loading cam apparatuses 7 increases, the elastic force of the disc spring 14 does not contribute to the increase in the overall pressure force. Therefore, when it is presumed that the size of the balls 16 and the shape (inclination angle) of the cam surfaces 17, 18 are the same, with this conventional construction, the overall pressure force changes as indicated by the dashed line α in FIG. 8 according to the size of the torque that is applied to the input shaft 2, however, with the construction of this example, the size of the torque changes as indicated by the solid line β in FIG. 8. Therefore, presuming that the same overall pressure force is required, by increasing the inclination angle of the cam surfaces 17, 18, it is possible to keep the angle of relative displacement in the circumferential direction of the sun roller elements 8c and the cam plates 15a small until a specified overall pressure force is obtained. Keeping this angle small contributes to improvement in the response of the friction roller reducer 1a (rotation synchronization between the input shaft 2a and output shaft 3a).

Second Example

Figure 9:
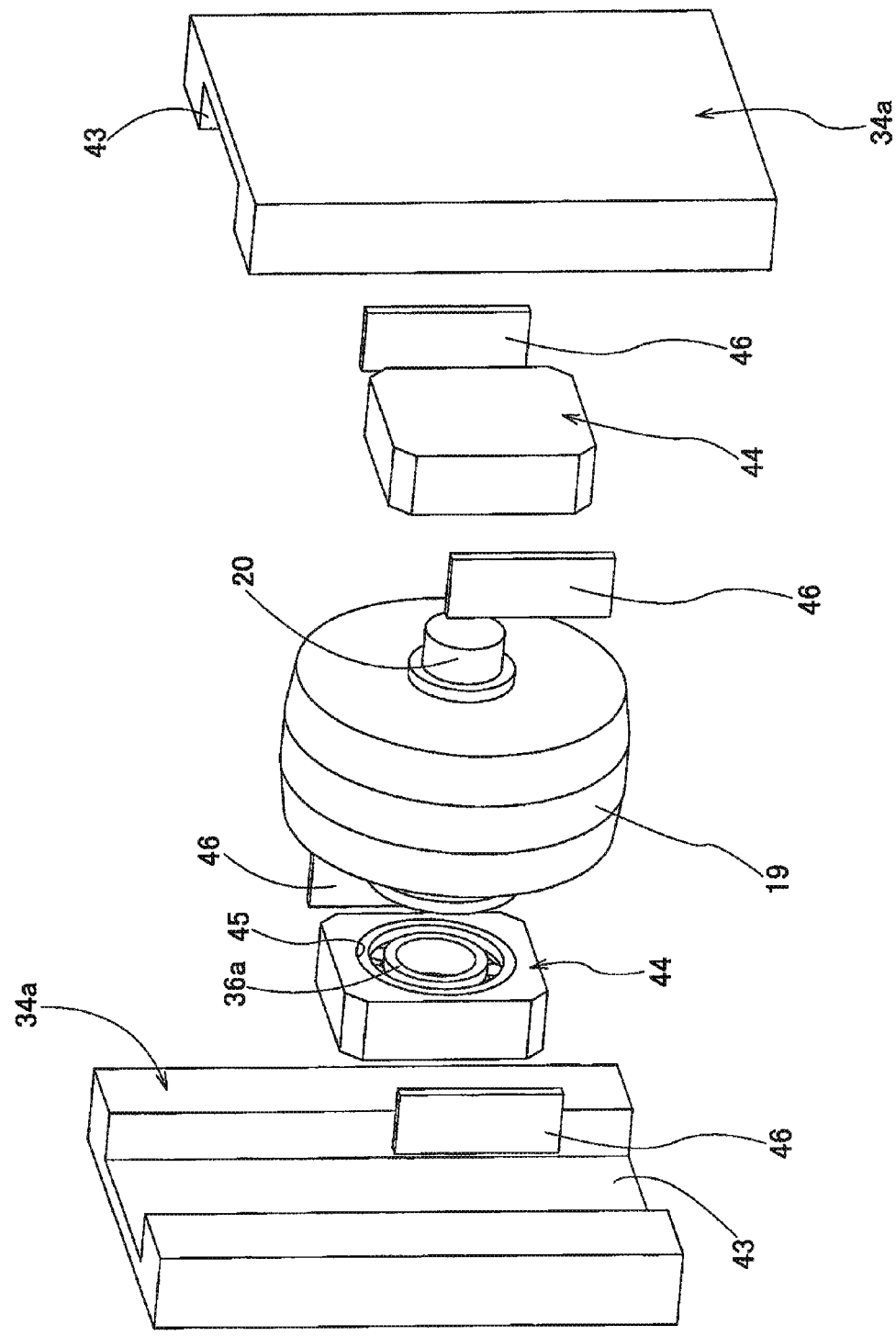
FIG. 9 is a drawing similar to FIG. 3, and illustrates a second example of an embodiment of the present invention.
Figure 10:
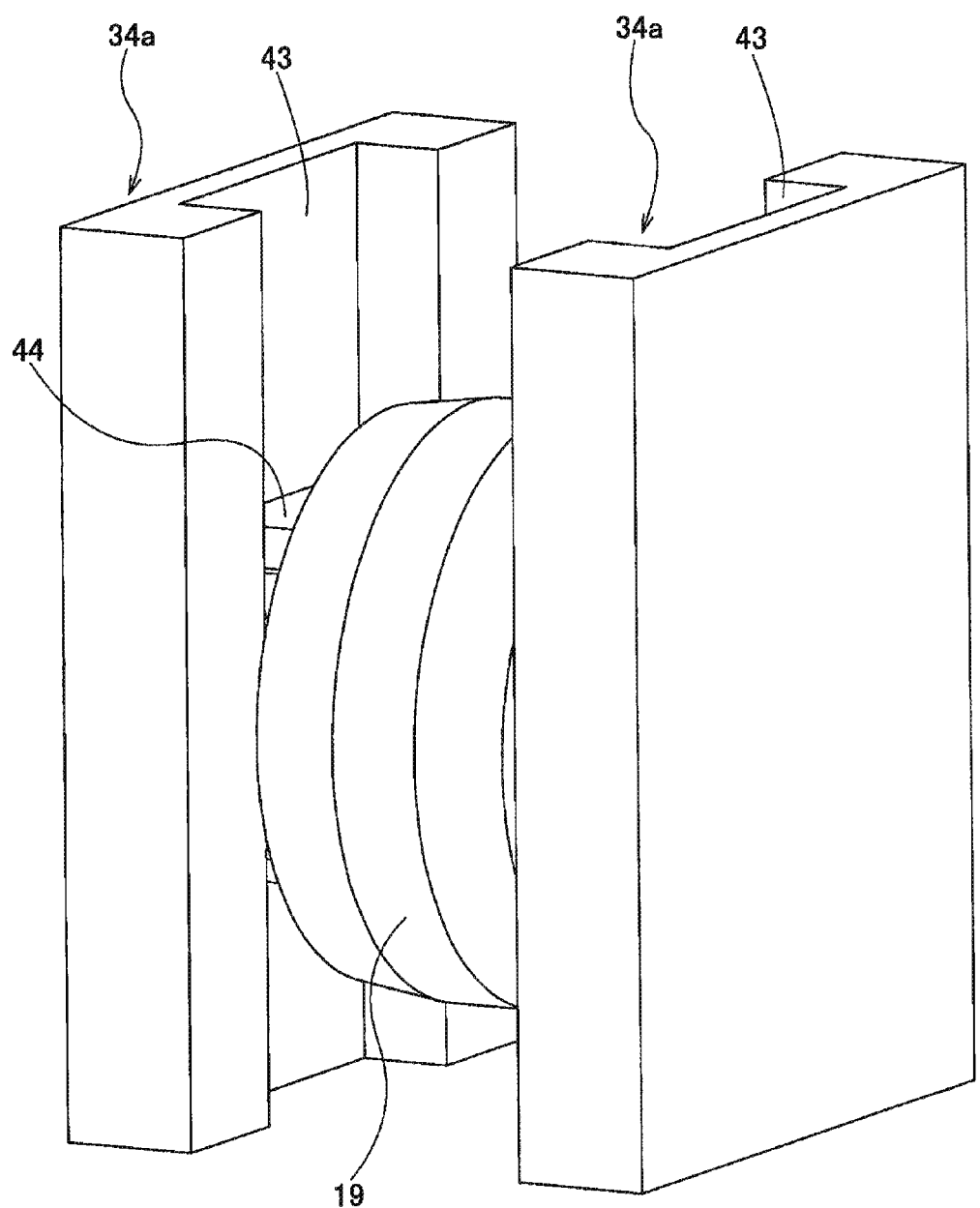
FIG. 10 is a drawing similar to FIG. 4, and illustrates the second example of an embodiment of the present invention.
Figure 11:
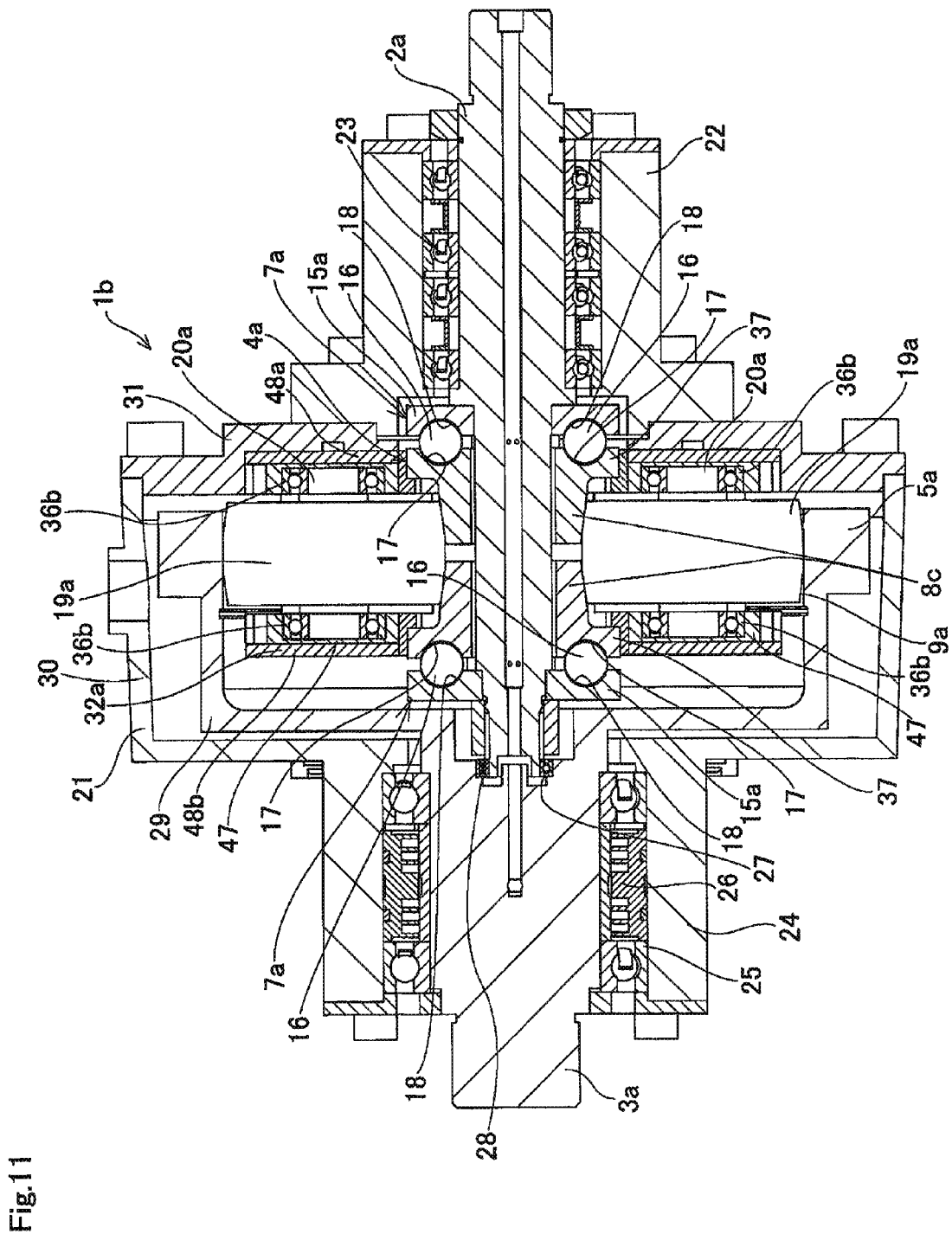
FIG. 11 is a cross-sectional drawing illustrating a third example of an embodiment of the present invention.

FIG. 9 and FIG. 10 illustrate a second example of an embodiment of the present invention. In this example, guide blocks 34a having a concave U-shaped cross section are used. These guide blocks 34a are supported by and fasted to the support frame 32 (refer to FIG. 1) in a state in which lengthwise direction of the guide blocks 34a coincide with the radial direction of the sun roller 4a and the ring-shaped roller 5a. On the inside surfaces of these guide blocks 34a, concave guide sections 43 are formed so as to be open on the end surfaces of both ends in the lengthwise direction. Moreover, the width dimension of these concave guide sections 43 in the circumferential direction of the sun roller 4a and ring-shaped roller 5a is sufficiently larger than the width dimension of the long guide holes 35 (see FIG. 1 and FIG. 3) of the first example of the embodiment.

Furthermore, in this example, the outer rings of the ball bearings 36a that support the end sections of the rotation shafts 20 of the intermediate rollers 19 fitted inside and supported by circular support holes 45 that are formed in a pair of sliding blocks 44 that are provided for each intermediate roller 19. These sliding blocks 44 engage with the concave guide sections 43 by way of a pair of sliding plates 46 for each sliding block 44 so as to be able to slide in the radial direction of the sun roller 4a and ring-shaped 5a. The construction and functions of the other parts are the same as in the first example of the embodiment, so any redundant drawings and explanations are omitted.

Third Example

FIG. 11 to FIG. 15 illustrate a third example of an embodiment of the present invention. The friction roller reducer 1b of this example, as in the first example of the embodiment, is such that an input shaft 2a rotates and drives a sun roller 4a, the rotation of the sun roller 4a is transmitted to a ring-shaped roller 5a by way of a plurality of intermediate rollers 19a, and the rotation of the ring-shaped roller 5a is outputted from an output shaft 3a.

In this example, a pivot mechanism for allowing rotation and displacement in the radial direction of the intermediate rollers 19a to be performed smoothly is constructed by a support frame 32a, and a plurality of pivot frames 47 that are provided for each of the intermediate rollers 19a. Of these, the support frame 32a is supported by and fastened to the inside surface of an end plate 31 that covers one side in the axial direction of a large-diameter cylindrical section 30 of a housing 21. The support frame 32a has construction like a carrier of a planetary gear mechanism and is constructed by connecting and fastening a pair of rim sections 48a, 48b that are circular ring shaped and arranged concentric with each other at a plurality of locations that are uniformly space in the circumferential direction with stays 49. This kind of support frame 32a is supported and fastened to the inside of the large-diameter cylindrical section 30 by screwing the rim sections 48a to the inside surface of the end plate 31 an as to be concentric with the sun roller 4a.

Moreover, the pivot frames 47 are formed into a U shape as seen from radial direction, by connecting the base end edges of a pair of support arms 50 that are parallel with each other with a base section 51. Both end sections of the rotation shafts 20a of the intermediate rollers 19a are supported by the tip end sections of the pair of support arms 50 of the pivot frames 47 by way of ball bearings 36b so as to be able to freely rotate. Pivot shafts 52 that are concentrically provided on both side surfaces of the base end sections of the pivot frames 47 are inserted into support holes 53, which are formed in portions of the rim sections 48a, 48b that are aligned with each other, such that there is no backlash.

The pivot shafts 52 and the rotation shafts 20a are parallel with each other, and the phases of each in the circumferential direction of the support frame 32a are offset by a large amount. More specifically, the offset in the circumferential direction of the pivot shafts 52 and the rotation shafts 20a is as large as possible, so the direction of an imaginary line that connects the pivot shafts 52 and the rotation shafts 20a is close to the direction of the tangent line of an imaginary arc that is centered around the center of the support frame 32a. With this kind of construction, the pivot frames 47 are able to pivotally displace around the pivot shafts 52 with respect to the support frame 32a, and the intermediate rollers 19a are essentially supported by the support frame 32a so as to be able to displace smoothly in the radial direction of the support frame 32a.

The friction roller reducer 1b of this example, constructed as described above, as in the first example of the embodiment, transmits power from the input shaft 2a to the output shaft 3a while increasing torque at the same time as reducing the speed. Particularly, in this example, the intermediate rollers 19a displace smoothly in the radial direction of the sun roller 4a and the ring-shaped roller 5a due to the pivotal displacement of the pivot frames 47 of the pivot mechanism. Therefore, it is possible to prevent the surface pressure at the traction areas between the sun roller 4a, intermediate rollers 19a and the ring-shaped roller 5a from becoming uneven, and it is possible to make the surface pressure at these traction areas proper and to further improve the transmission efficiency of the friction roller reducer 1b.

Moreover, in this example, when operation of the friction roller reducer 1b is started, as the sun roller 4a displaces a little in the axial direction, it is possible to cause small displacement of the intermediate rollers 19 in the axial direction to be performed smoothly. In other words, as in the first example of the embodiment, the inner circumferential surface of the ring-shaped roller 5a with which the outer circumferential surfaces of the intermediate rollers 19a come contact is a simple cylindrical surface. Also, there are some gaps between the inside surfaces of the support arms 50 of the pivot frames 47 and the both end surfaces in the axial direction of the intermediate rollers 19, and between the outside surfaces of these support arms 50 and the inside surfaces of the rim sections 48a, 48b. Therefore, displacement in the axial direction of the intermediate rollers 19a is performed smoothly, and rotation of these intermediate rollers 19a is not impaired. The construction and function of the other parts are the same as in the first example of the embodiment, so any redundant explanation is omitted.

Fourth Example

FIG. 16 to FIG. 18B illustrate a fourth example of an embodiment of the present invention. This example is related to an improvement of the pivot mechanism when a pivot mechanism such as in the third example of an embodiment of the present invention is applied to a planetary roller type friction roller reducer. In other words, in a planetary roller reducer, a large force outward in the radial direction of the support frame 32a (see FIG. 11 and FIG. 12) is applied to the intermediate rollers 19a, which are planetary rollers, due to centrifugal force that is applied to the intermediate rollers 19a due to revolving motion. As a result, the surface pressure at the outer-diameter side traction areas, which are areas of rolling contact between the outer circumferential surfaces of the intermediate rollers 19a and the ring-shaped roller 5a, becomes high. This kind of state is not desirable from the aspect of maintaining the rolling fatigue life of the circumferential surfaces of the intermediate rollers 19a and the ring-shaped rollers 5a, and from the aspect of maintaining transmission efficiency of friction roller reducer. Furthermore, of the power to be transmitted, the surface pressure of the outer-diameter side traction areas changes according to the rotation speed. The loading cam apparatuses 7a illustrated in FIG. 11 have the function of adjusting the surface pressure at the outer-diameter side traction areas according to the size of the torque to be transmitted, however, functions poorly to adjust the surface pressure of these outer-diameter side traction areas according to the rotation speed. Therefore, when a planetary roller type friction roller reducer rotates at high speed, the surface pressure at the outer-diameter traction areas becomes excessively large, and not only is the rolling fatigue life of the inner circumferential surface of the ring-shaped roller and the outer circumferential surface of the intermediate rollers 19a impaired, the rolling resistance at the outer-diameter side traction areas becomes excessive, and the transmission efficiency decreases. When the torque that occurs in the loading cam apparatuses 7a is kept low so that the surface pressure at these outer-diameter side traction areas does not become excessive even during high-speed operation, it becomes easy of harmful gross slipping to occur at the outer-diameter traction areas during low-speed operation. In regards to the surface pressure at the inner-diameter side traction areas, which are areas of rolling contact between the outer circumferential surfaces of the intermediate rollers 19a and the outer circumferential surfaces of the sun roller 4a, the proper value is maintained by the operation of the loading cam apparatuses.

The construction of this example takes into consideration the situation described above, and reduces the outward force in the radial direction of the support frame 32b that is applied to the intermediate rollers 19a that function as planet rollers. Construction is also achieved that is capable of maintaining rolling fatigue of the circumferential surfaces of the sun roller 4a, intermediate rollers 19a and ring-shaped roller 5a and the transmission efficiency of the friction roller reducer without gross slipping occurring even during low-speed operation. In order for this, in the construction of this example, as in the construction disclosed in JP 2004-52729 A, counter weight sections 54 are provided in the pivot frames 47a, and as the support frame 32b rotates, it is possible to reduce the moment around the pivot shafts 52a that is applied to these pivot frames 47a.

More specifically, the base sections of the pivot frames 47a where the pivot shafts 52a are located are supported by the support frame 32b so as to be able to pivotally displace by way of the pivot shafts 52a. The counter weight sections 54 are provided on the opposite side across the pivot shaft 52a from the tip end section of the base sections of the pivot frames 47, or in other words, on the opposite side from the rotation shafts 20 that support the intermediate rollers 19a. The counter weight sections 54 are as large as possible within a range in which there is no interference with the adjacent intermediate rollers 19a in the circumferential direction that are supported by the pivot frames 47a and in which the required pivotal displacement of the pivot frames 47a is possible. In order for this, stays that are provided on the rim section 48c of support frame 32b are thinner than in the construction of the third example of the embodiment.

In the case of this example, having construction as described above, it is possible to reduce the outward force in the radial direction of the support frame 32b that is applied to the intermediate rollers 19a due to centrifugal force that is applied to the counter weight sections 54 when the intermediate rollers 19a revolve during rotation of the support frame 32b. In other words, when the construction of the pivot frames 47 that was assembled in the third example of the embodiment is assembled as is in a planetary roller reducer, the center of gravity of a pivot frame 47 and an intermediate roller 19a that displace in synchronization in the radial direction is located at point P in FIG. 18B, and the distance $L_0$ between this point P and the pivot shaft 52 is large, and force that causes the intermediate roller 19a to displace outer in the radial direction becomes large. On the other hand, with the construction of this example, the center of gravity between a pivot frame 47a and an intermediate roller 19a is located at point Q in FIG. 18A. The distance $L_1$ between point Q and the pivot shaft 52a is small, so it is possible to make the force that causes the intermediate roller 19a to displace outward in the radial direction small.

As can be clearly seen from the explanation above, with the construction of this example, even when the construction of the present invention is applied to a planetary roller type of friction roller reducer, and the friction roller reducer is operated at high speed, it is possible to keep the difference between surface pressure at inner-diameter side traction areas and outer-diameter traction areas small. As a result, it is possible to prevent the surface pressure at outer-diameter side traction areas from becoming excessively high during high-speed operation, while at the same time prevent the occurrence of gross slipping at outer-diameter side and inner-diameter side traction areas during low-speed operation, and it is possible to maintain the durability and transmission efficiency of the friction roller reducer.

Fifth Example

Figure 19:
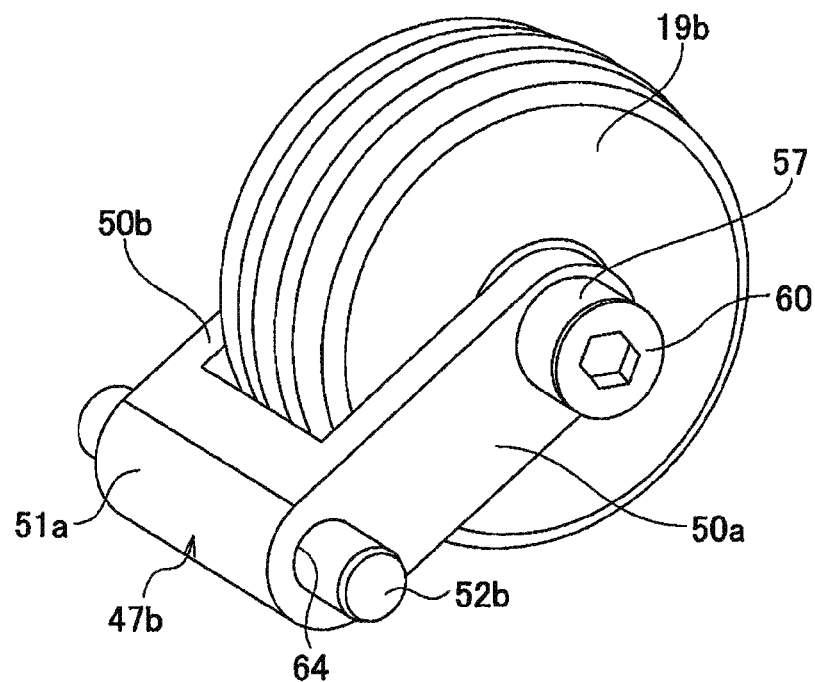
FIG. 19 is a drawing similar to FIG. 14, and illustrates a fifth example of an embodiment of the present invention.
Figure 20:
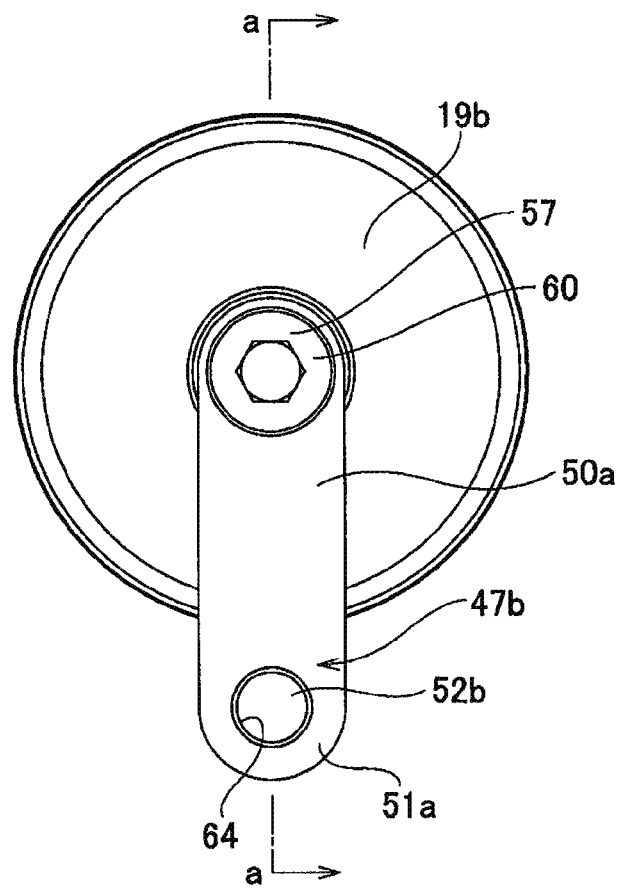
FIG. 20 is an orthographical drawing as seen from the right in FIG. 19 of the fifth example of an embodiment of the present invention.
Figure 21:
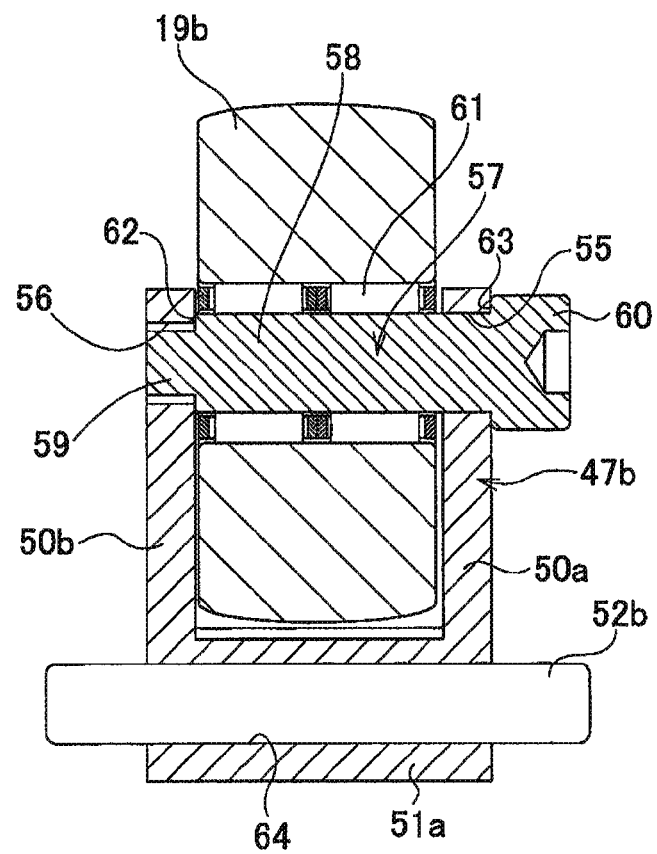
FIG. 21 is a cross-sectional view of section "a-a" in FIG. 20.

FIG. 19 to FIG. 21 illustrate a fifth example of an embodiment of the present invention. A feature of this example is construction for improving the rigidity of the support arms so that the tip end sections of the pair of support arms of a forked pivot frame do not separate from each other. In the construction of the third example and fourth example of the embodiment, in order to make it possible to stably transmit a large torque, preferably the rigidity of each pair of support arms that are provided for each pivot frame is improved. The reason for this is explained below. In the case of the construction of the third example of the embodiment, as can be clearly seen from FIG. 14 and FIG. 15, the base end sections of the pair of support arms 50 of a pivot frames 47 are connected and fastened to the base section 51, and none of the portion from the middle section to the tip end section of each arm is fastened. That is, each support arm 50 has a free end that is not supported in any portion.

On the other hand, during operation of the friction roller reducer 1b, there is a possibility that a force in the axial direction, which is a force that causes displacement in the axial direction, will be applied to the intermediate rollers 19a. Various reasons are feasible for this kind of force occurring, such as when the characteristics of the circumferential surfaces (shape precision, surface roughness and the like) of the sun roller 4a, intermediate rollers 19a and ring-shaped roller 5a are irregular. For example, a force in the axial direction also occurs in the case when the intermediate rollers 19a rotates (skew occurs) with the center axes of rotation of the intermediate rollers 19a (rotations shafts 20a) and the center axis of the sun roller 4a or ring-shaped roller 5a inclined. In any case, when this force in the axial direction occurs, the intermediate roller 19a presses the inside surfaces of one of the supporting arms 50 of the pair of supporting arms 50, and there is a possibility that this support arm 50 will be caused to deform outward. As a result of this deformation, the outside surface of this support arm 50 strongly rubs with the inside surfaces of the rim sections 48a, 48b, and there is a possibility that pivotal displacement of the pivot frame 47 will not be performed smoothly.

The construction of this example takes this situation into consideration. In this example, the pivot frames 47b are integrally formed by cutting or casting of a metal material such that the pivot frames 47b comprises a base section 51a and a pair of support arms 50a, 50b. These support arms 50a, 50b are flat and parallel with each other. A circular through hole 55 that is formed in the tip end section of one support arm 50a (the right support arm in FIG. 19 and FIG. 21) is formed so as to be concentric with a screw hole 56 that is formed in the other support arm 50b (left support arm in FIG. 19 and FIG. 21). The diameter of the root circle of this screw hole 56 is smaller than the inner diameter of the through hole 55. Using the through hole 55 and screw hole 56, a bolt 57 that functions as the rotation shaft spans between the tip end sections of the support arms 50a, 50b.

This bolt 57 comprises a cylindrical column section 58 in the middle section in the axial direction, a male screw section 59 on the tip and section (left end section in FIG. 21) having a smaller diameter than the cylindrical column section 58, and a head section 61 on the base end section (right end section in FIG. 21) having a diameter that is larger than the cylindrical column section 58. The outer circumferential surface of the cylindrical column section 58 is a smooth cylindrical surface for functioning as the inner ring raceway of a radial needle bearing 61. Moreover, the outer diameter of the cylindrical column section 58 is a little smaller than the inner diameter of the through hole 55, and the diameter of the tip circle of the male screw section 59 is smaller than the outer diameter of the cylindrical column section 58. Furthermore, the border area between the cylindrical column section 58 and the male screw section functions as a stepped surface 62 on the tip end side, and the border area between the cylindrical column section 58 and the head section 60 functions as a stepped surface 63 on the base end side. These stepped surfaces 62, 63 are formed in a direction orthogonal to the center axis of the bolt 57, and the distance in the axial direction between them coincides with the appropriate distance between the outside surface of one support arm 50a and the inside surface of the other support arm 50b.

The bolt 57 as described above is such that the cylindrical column section 58 is inserted through the through hole 55, and the male screw section 59 is screwed into the screw hole 56, and by further tightening, spans between the tip end sections of the support arms 50a, 50b, the tip end sections of these support arms 50a, 506 are connected and fastened. When placing the bolt 57 so that it spans between the tip end sections of these support arms 50a, 50b in this way, an intermediate roller 19b and radial needle bearing 61 are placed between these support arms 50a, 50b. The radial needle bearing 61 is adhered to the inner circumferential surface of the intermediate roller 19b using traction grease or the like. With being inserted through the inner diameter side of the radial needle bearing 61, the bolt 57 is placed so that it spans between the tip end sections of the support arms 50a, 50b. Therefore, when the male screw section 59 of the bolt 57 is screwed into the screw hole 56 and further tightened, the intermediate roller 19b is supported between the support arms 50a, 50b so as to be able to rotate freely.

Figure 12:
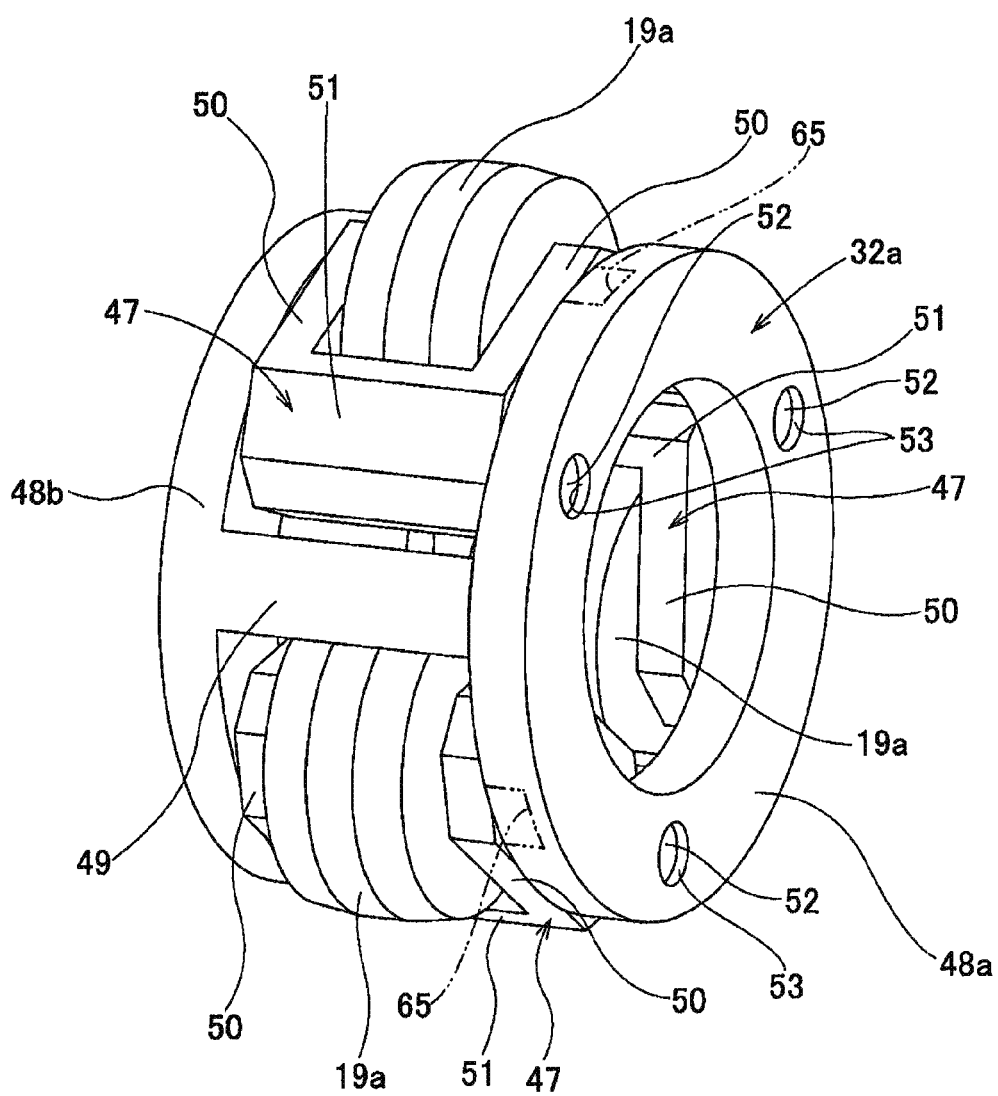
FIG. 12 is a perspective drawing illustrating the construction of a pivot mechanism that supports a rotating shaft of an intermediate roller so as to be able to displace in the radial direction of a sun roller and ring-shaped roller in the third example of an embodiment of the present invention.
Figure 13:
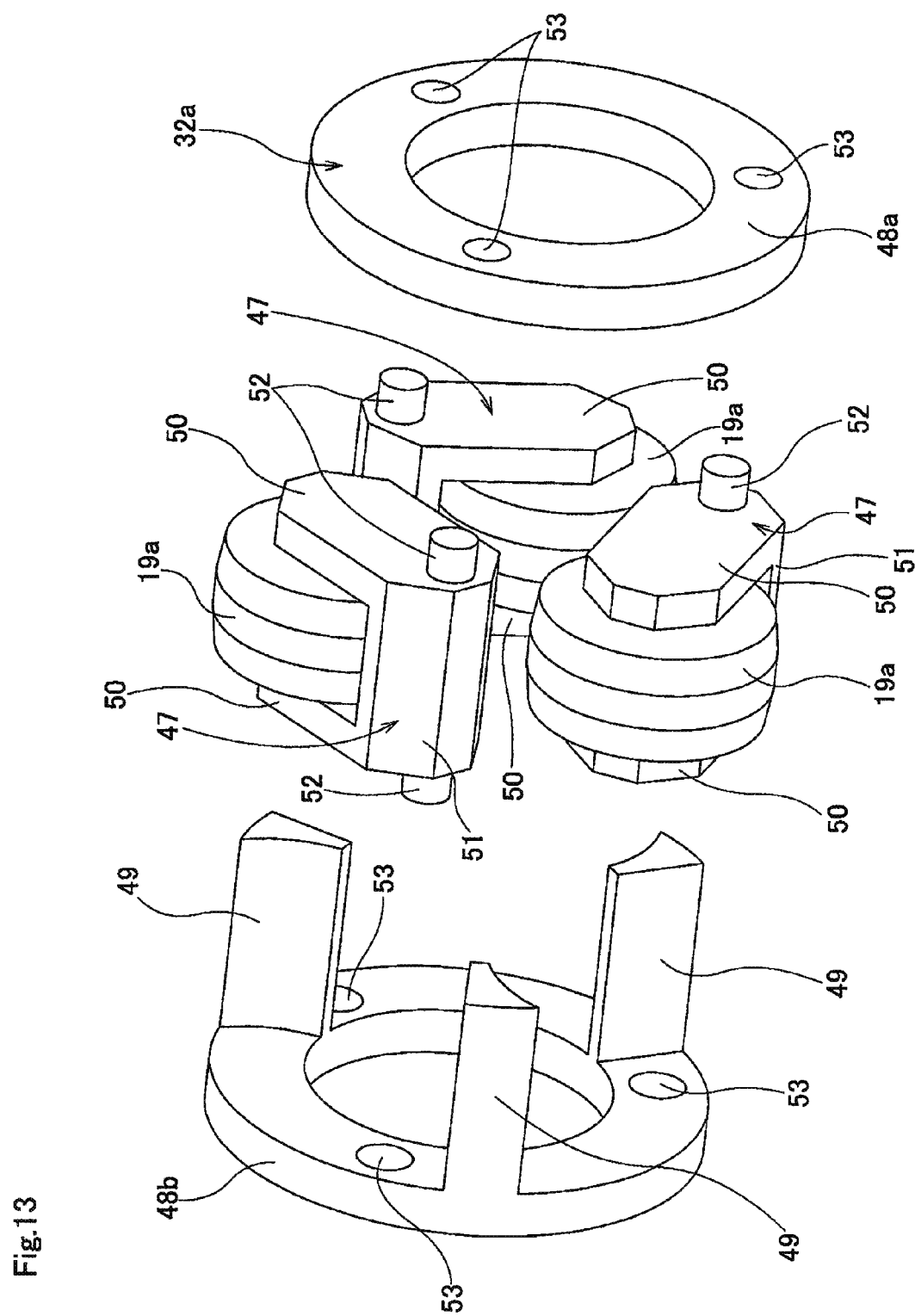
FIG. 13 is an exploded perspective drawing of the pivot mechanism illustrated in FIG. 12 of the third example of an embodiment of the present invention.
Figure 14:
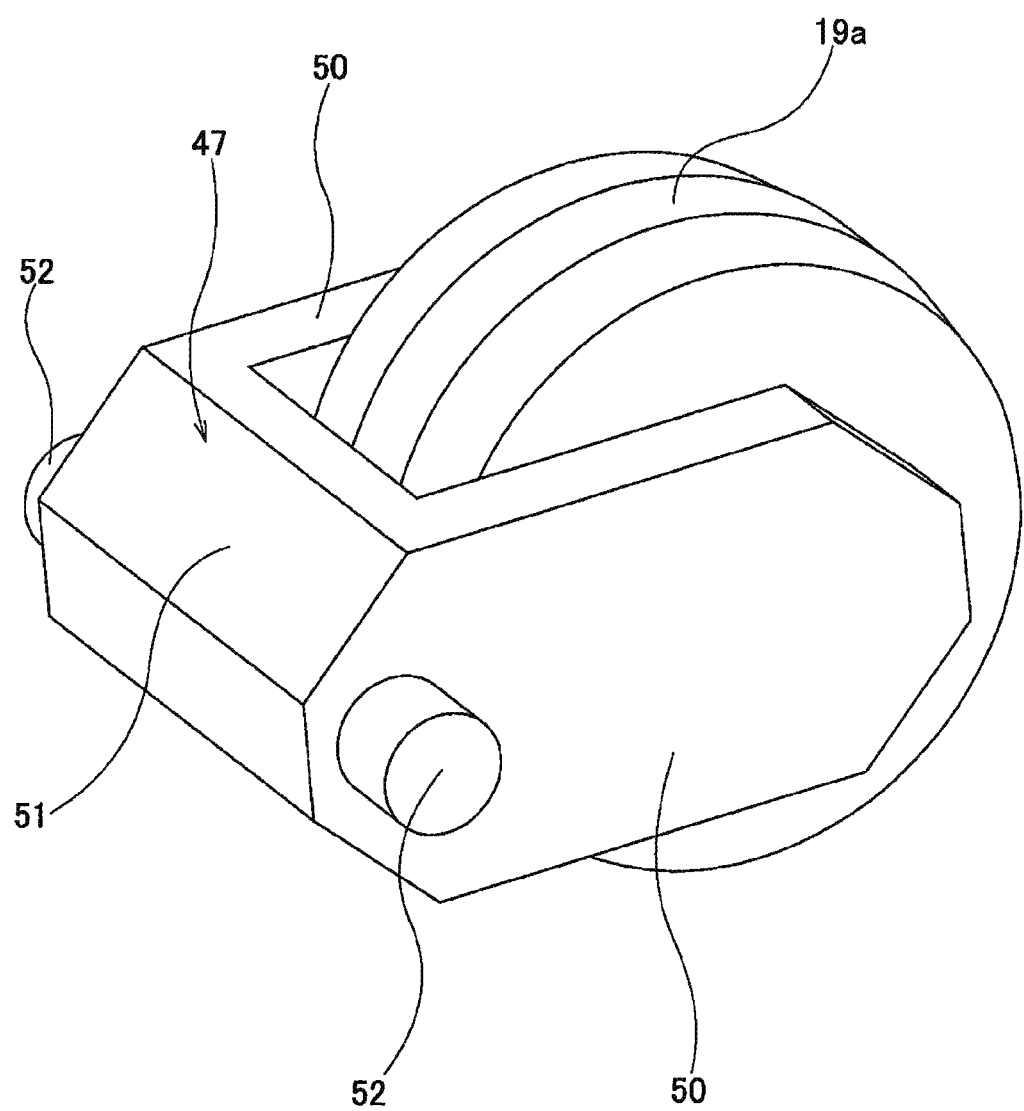
FIG. 14 is a perspective drawing illustrating only one unit of a combination of a pivot frame and intermediate roller that has been removed of the third example of an embodiment of the present invention.
Figure 15:
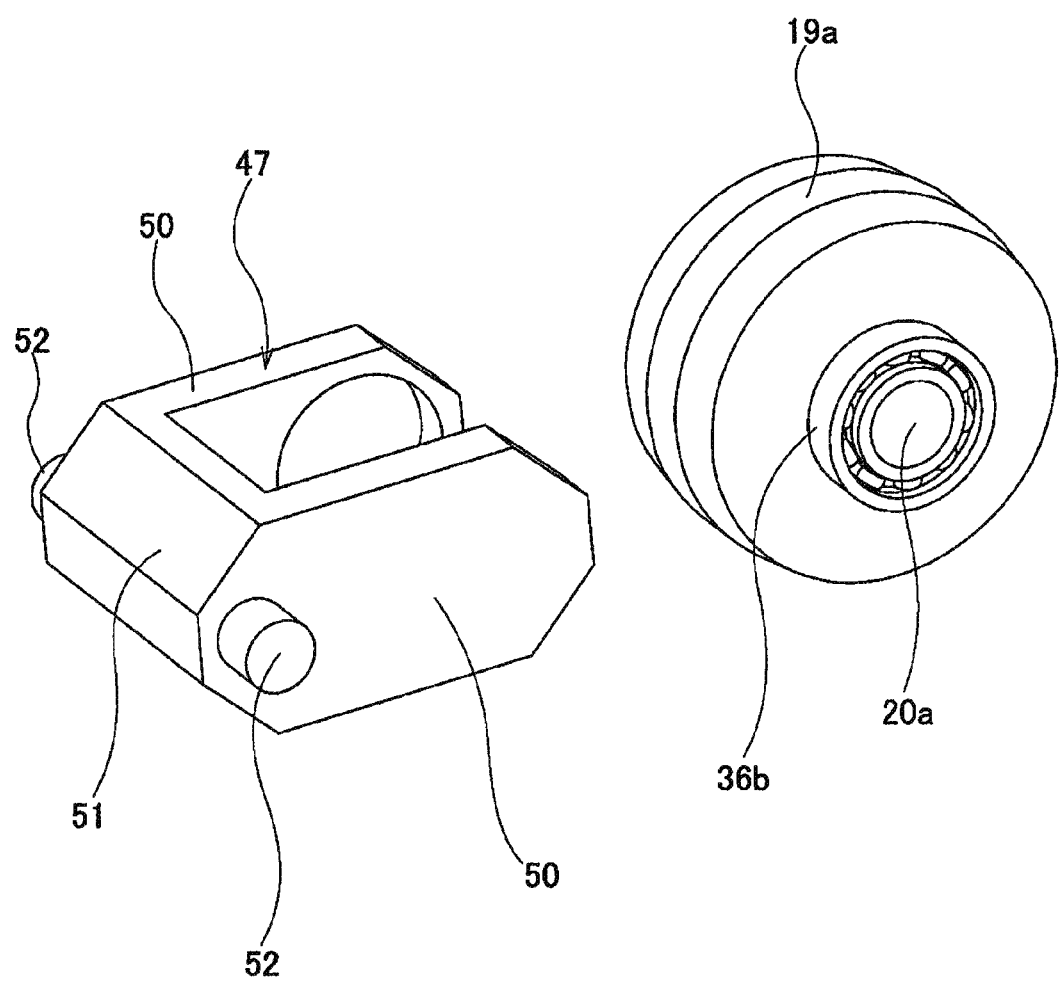
FIG. 15 is an exploded perspective drawing illustrating the unit that is illustrated in FIG. 14 with the unit further separated into the pivot frame and intermediate roller.
Figure 16:
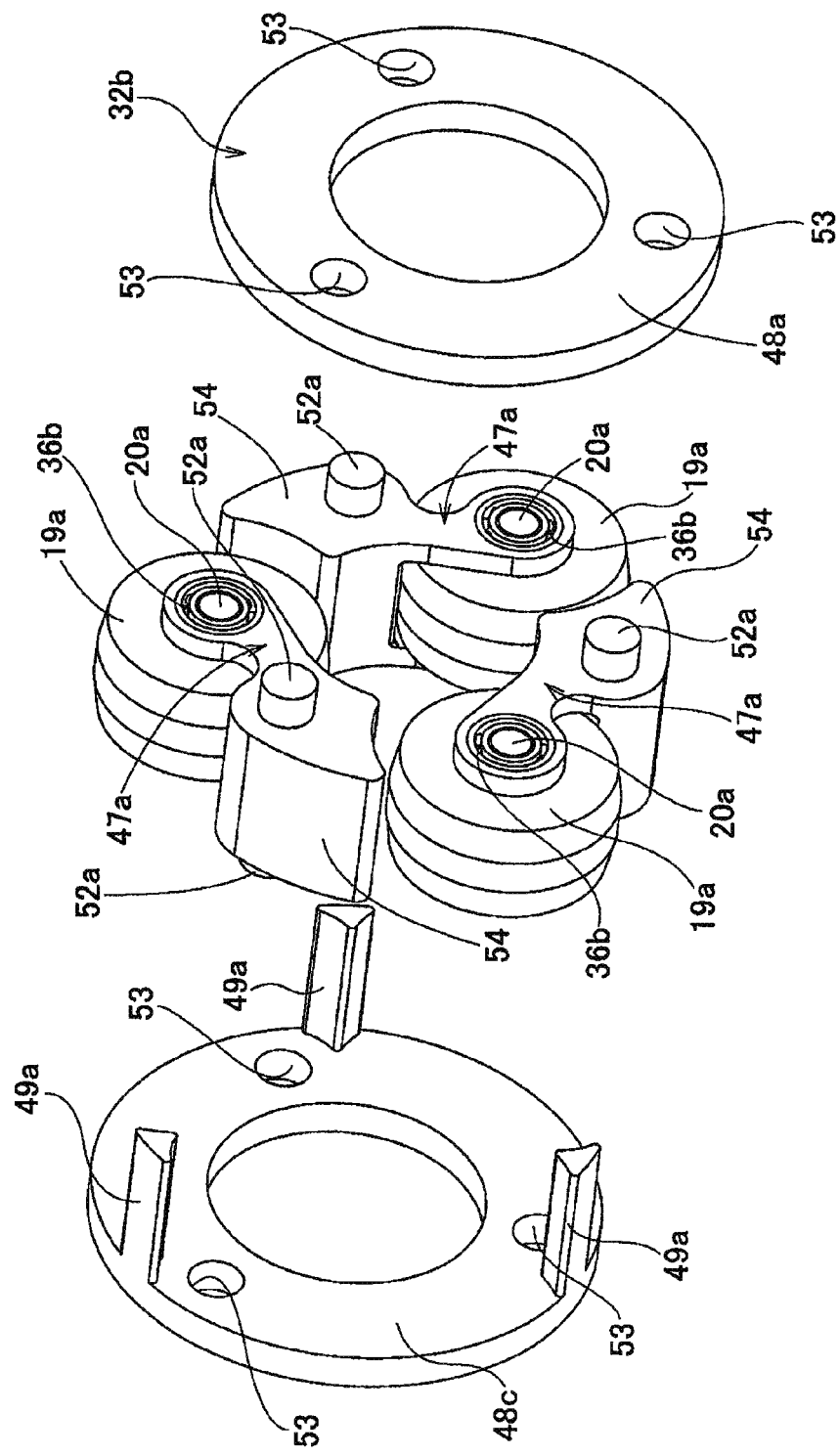
FIG. 16 is a drawing similar to FIG. 13, and illustrates a fourth example of an embodiment of the present invention.
Figure 17:
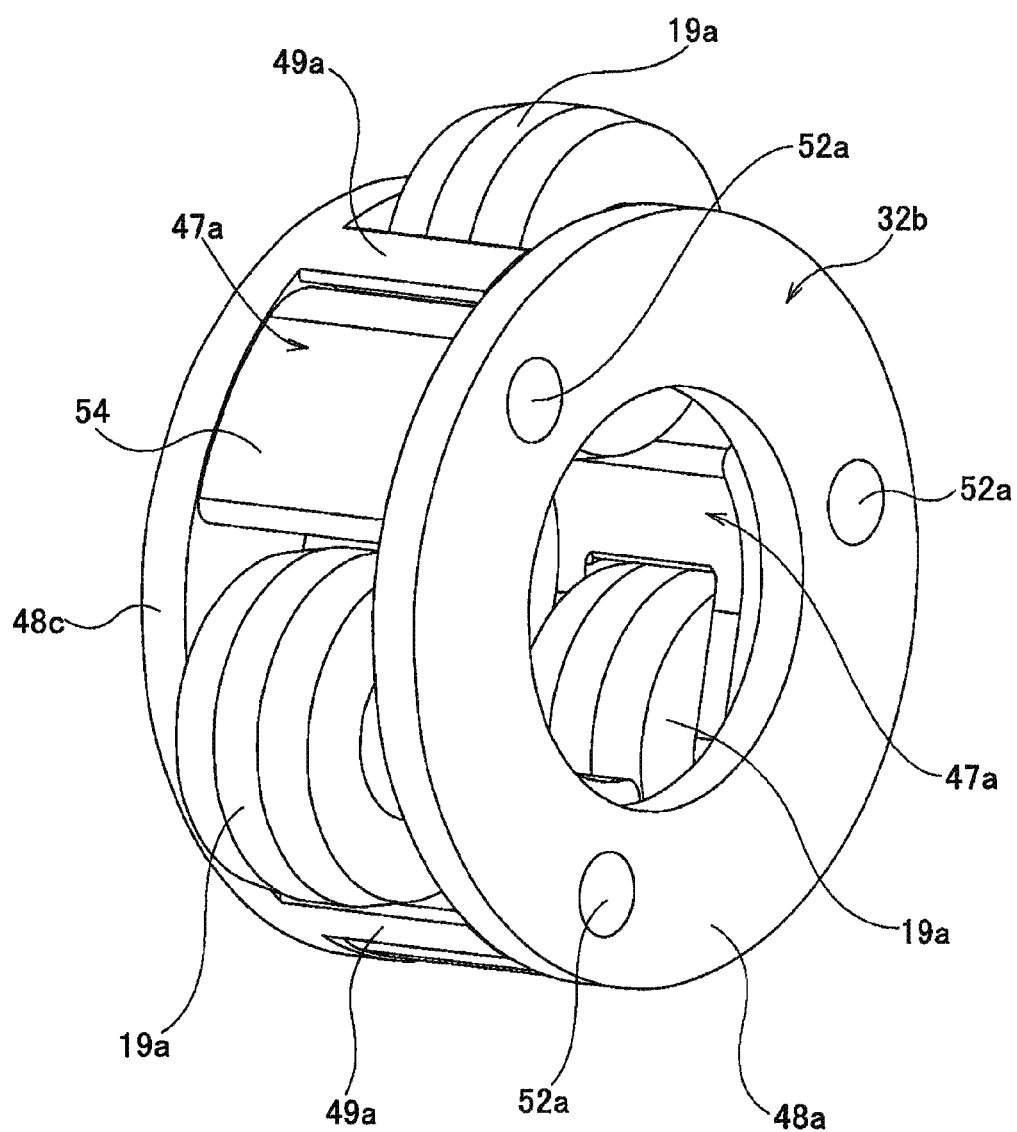
FIG. 17 is a drawing similar to FIG. 12, and illustrates the fourth example of an embodiment of the present invention.
Figure 18A:
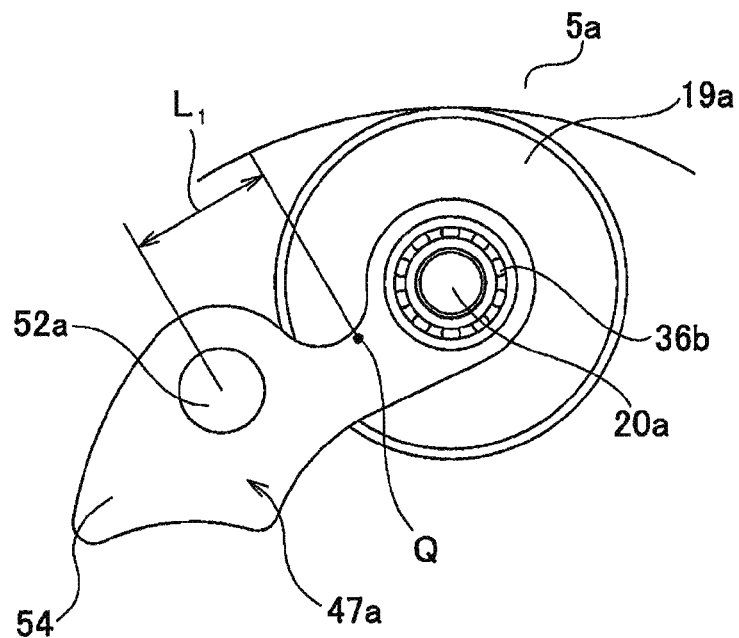
Figure 18B:
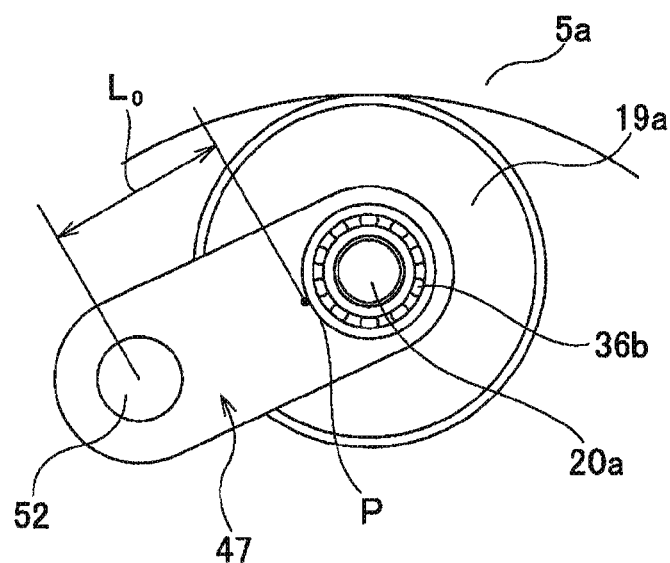

Furthermore, a through hole 64 is formed in the base section 51a, with connecting the surfaces on both ends of the base section 51a, so that this through hole 64 is parallel with the bolt 57. A pivot shaft 52b is inserted through this through hole 64. In this state, both end section of the pivot shaft 52b protrude from both outside surfaces of the pivot frame 47b. When the friction roller reducer is in the assembled state, both end sections of the pivot shaft 52b fit inside the support holes 53 (see FIG. 12 and FIG. 13) that are formed in the support frame 32a. Of the fitted section between the through hole 64 and the middle section of the pivot shaft 52b, and the fitted section between both end sections of the pivot shaft 52b and the support holes 53, one fitted section is a loose fit, and the other fitted section is an interference fit. With this construction, together with keeping the pivot shaft 52b from coming out, the pivot frame 47b is supported by the support frame 32a such that pivotal displacement around the pivot shaft 52b is possible. When there is a possibility that there will be interference between the head section 60 of the bolt 57 and the rim section 48a of the support frame 32a (see FIG. 12 and FIG. 13) when the pivot frame 47b pivots, then as illustrated in FIG. 12, a concave section 65 for preventing interference is formed in the rim section 48a. Alternatively, it is possible to use a low head bolt having a head section with a small thickness in the axial direction as the bolt, and provide a circular concave section (countersunk section) on the outside surface of the support arm 50a in the portion surrounding the opening of the through hole for inserting the bolt so that the head section does not protrude from the outside surface of the support arm 50a.

With the construction of this example, constructed as described above, it is possible to improve the rigidity of the support arms 50a, 50b of the pivot frames 47b that support the intermediate rollers 19b so as to be able to rotate freely. In other words, these support arms 50a, 50b are such that by way of the engagement section between the outside surface of one support arm 50a and the stepped surface 63 on the base end side, and the screwed connection between the screw hole 56 and the male screw section 59, displacement in a direction away from each other is prevented. Therefore, even when the intermediate roller 19b is skewed, and the inside surfaces of the support arms 50a, 50b are pressed by the side surfaces in the axial direction of the intermediate roller 19b, the space between the support arms 50a, 50b do not spread apart. Therefore, it is possible to prevent these support arms 50a, 50b from rubbing against other members such as the support frame 32a, and to prevent the pivotal displacement of the pivot frame 47b from being impaired. As a result, it is possible to keep the contact between the outer circumferential surface of the intermediate roller 19b that is supported by this pivot frame 47b and the outer circumferential surface of the sun roller 4a and the inner circumferential surface of the ring-shaped roller 5a in a good contact state, and to maintain the transmission efficiency of the friction roller reducer. The construction and functions of the other parts are the same as in the construction of the other examples of the embodiment.

Sixth Example

Figure 22:
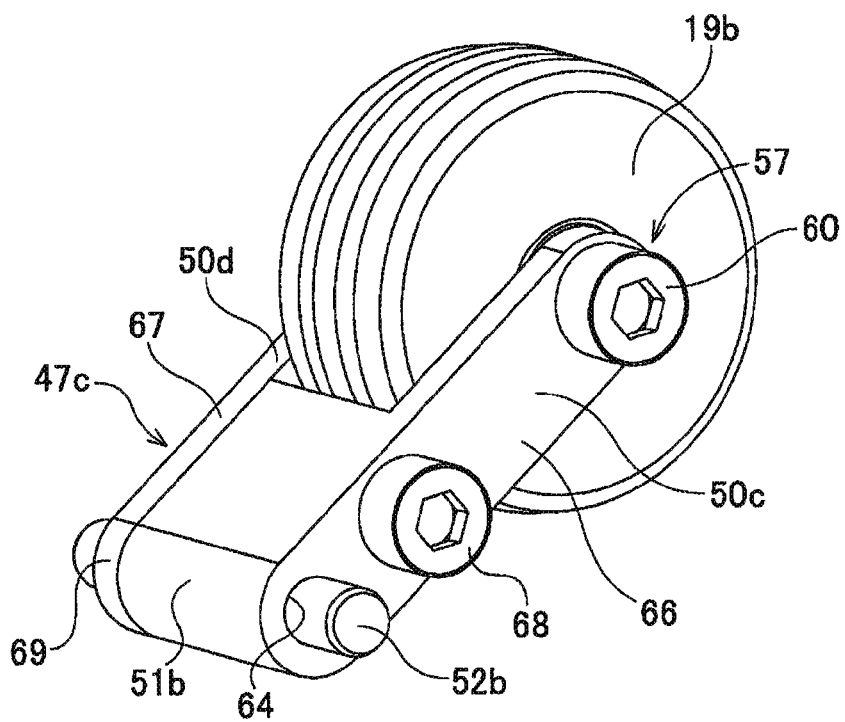
FIG. 22 is a drawing similar to FIG. 14, and illustrates a sixth example of an embodiment of the present invention.
Figure 23:
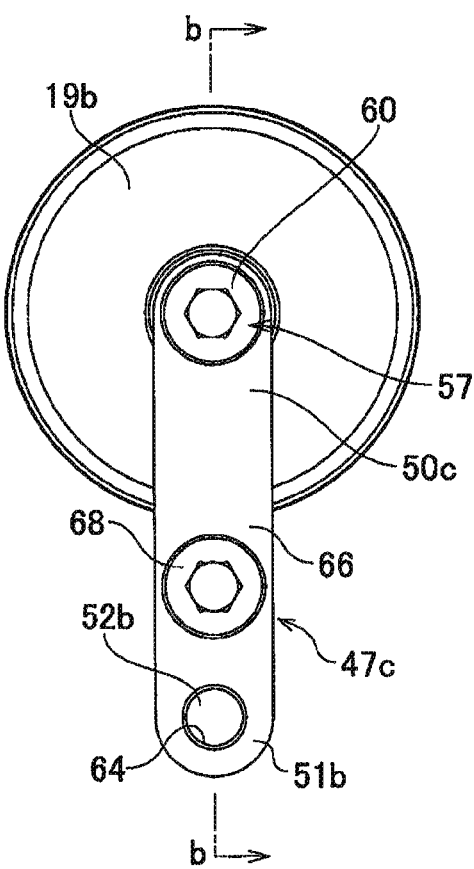
FIG. 23 is an orthographical drawing as seen from the right in FIG. 22.
Figure 24:
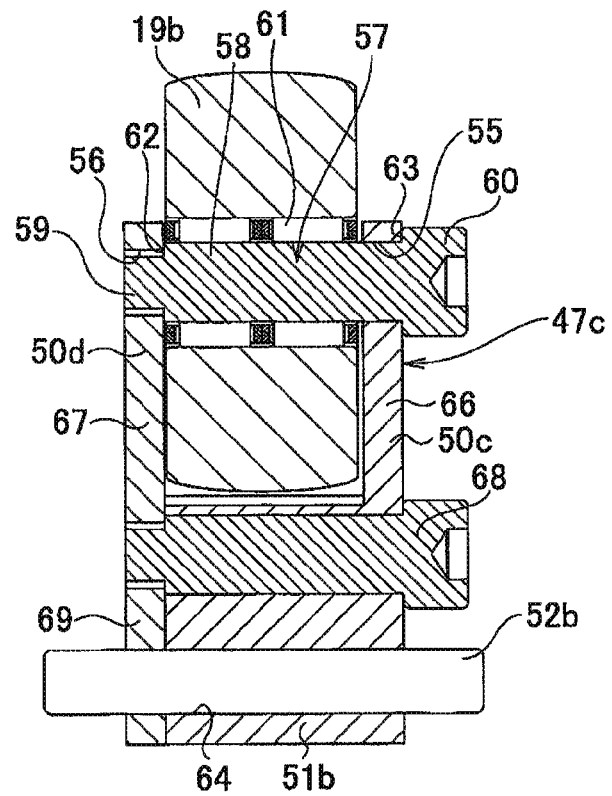
FIG. 24 is a cross-sectional drawing of section "b-b" in FIG. 23.

FIG. 22 to FIG. 24 illustrate a sixth example of an embodiment of the present invention. In this example, the pivot frames 47c are formed by connecting and fastening a first element 66 and second element 67 by a second bolt 68. Of these, the first element 66 is formed by cutting or casting of metal material, and includes an integrated base section 51b and one support arm 50c. The second element 67 is constructed by a plate of metallic material and has a connecting plate section 69 which is abutted to one end surface of the base section 51b and another support arm 50d. Each having the construction described above, the first element 66 and second element 67 are connected and fastened by a second bolt 68 that is inserted through the base section 51b in a portion nearer the tip end of the pivot frame 47c than the pivot shaft 52b, to form the pivot frame 47c. The construction and functions of the other parts are the same as in the fifth example of the embodiment.

Seventh Example

Figure 25:
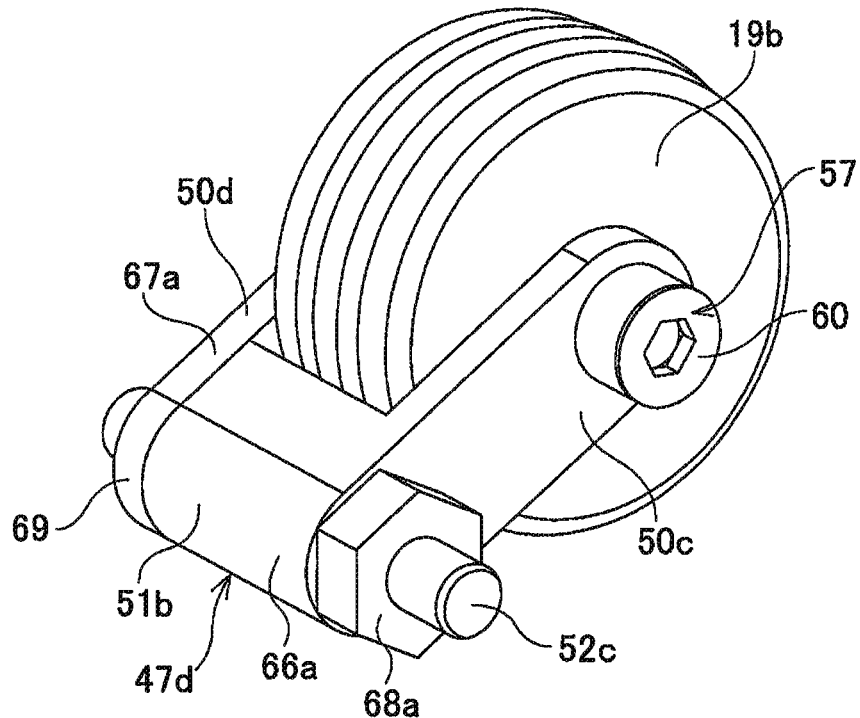
FIG. 25 is a drawing similar to FIG. 14, and illustrates a seventh example of an embodiment of the present invention.
Figure 26:
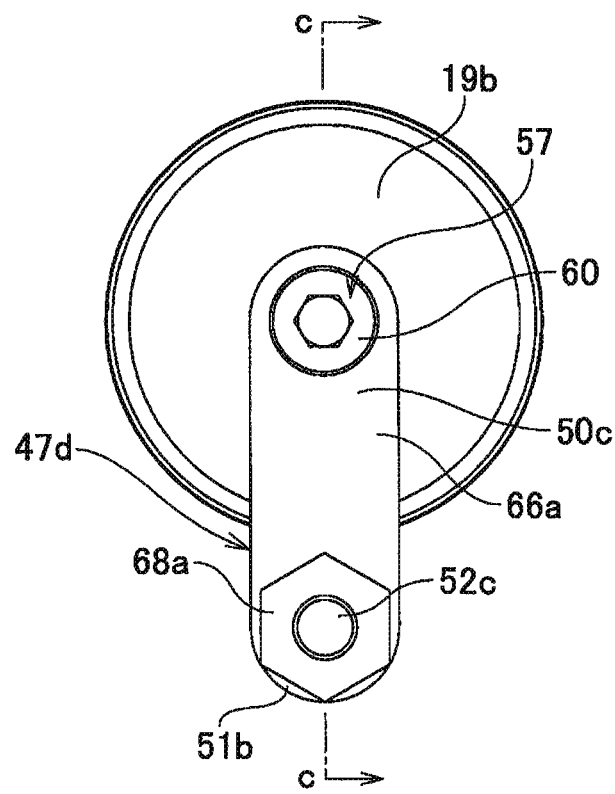
FIG. 26 is an orthographical drawing as seen from the right in FIG. 25 of the seventh example of an embodiment of the present invention.
Figure 27:
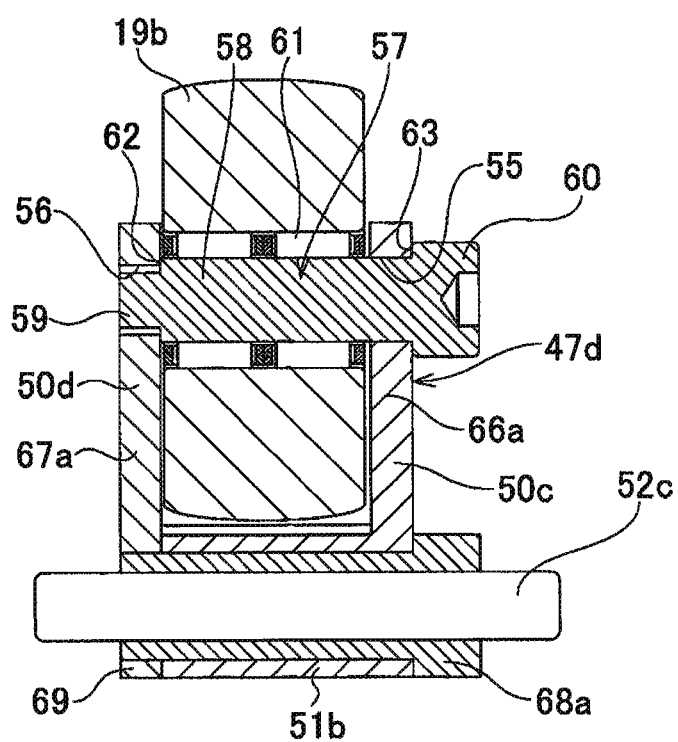
FIG. 27 is a cross-sectional drawing of section "c-c" in FIG. 26.
Figure 28:
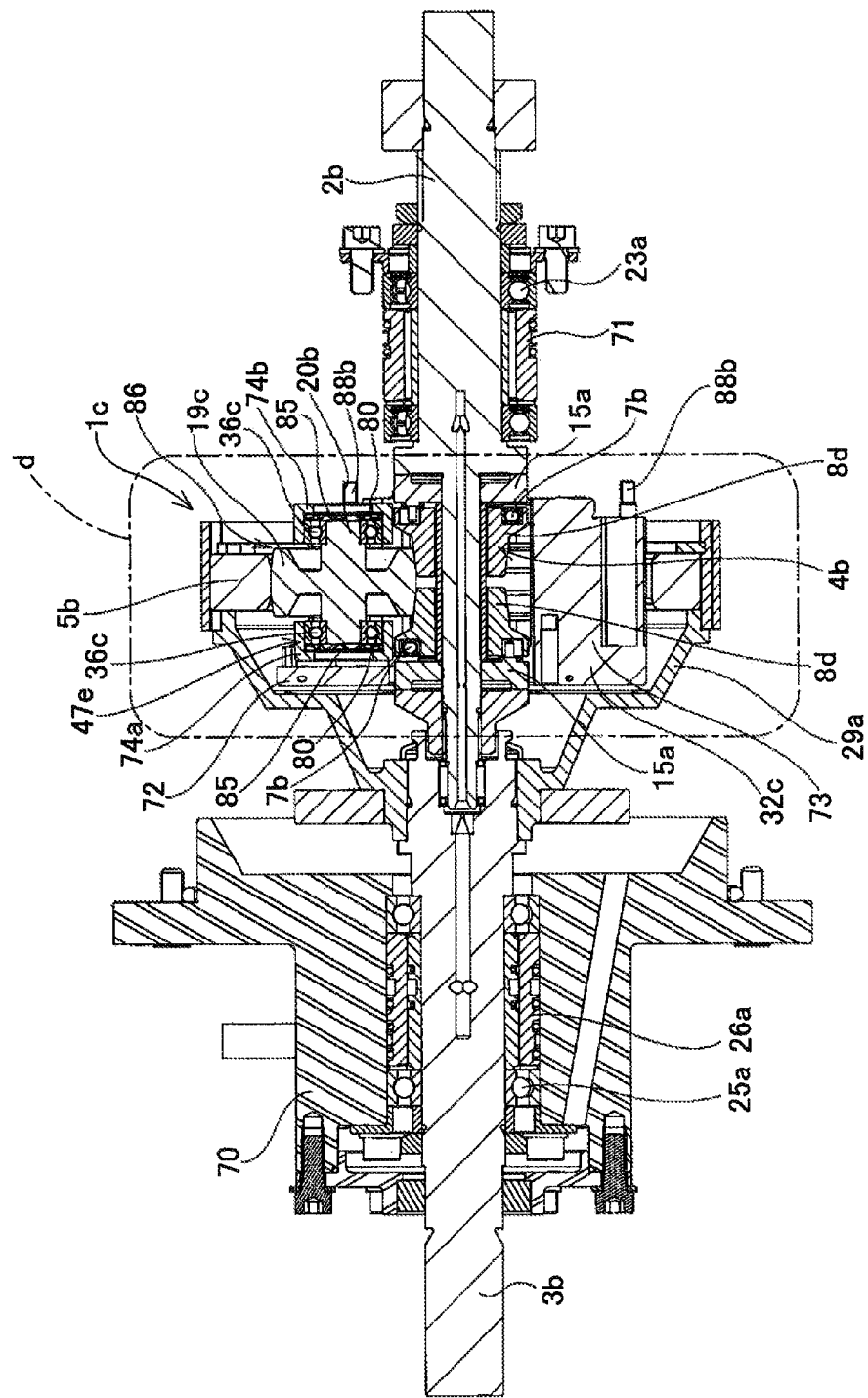
FIG. 28 is a cross-sectional drawing illustrating an eighth example of an embodiment of the present invention, and illustrates a power transmission apparatus of a drive unit for an electric automobile in which a friction roller reducer is assembled.
Figure 29:
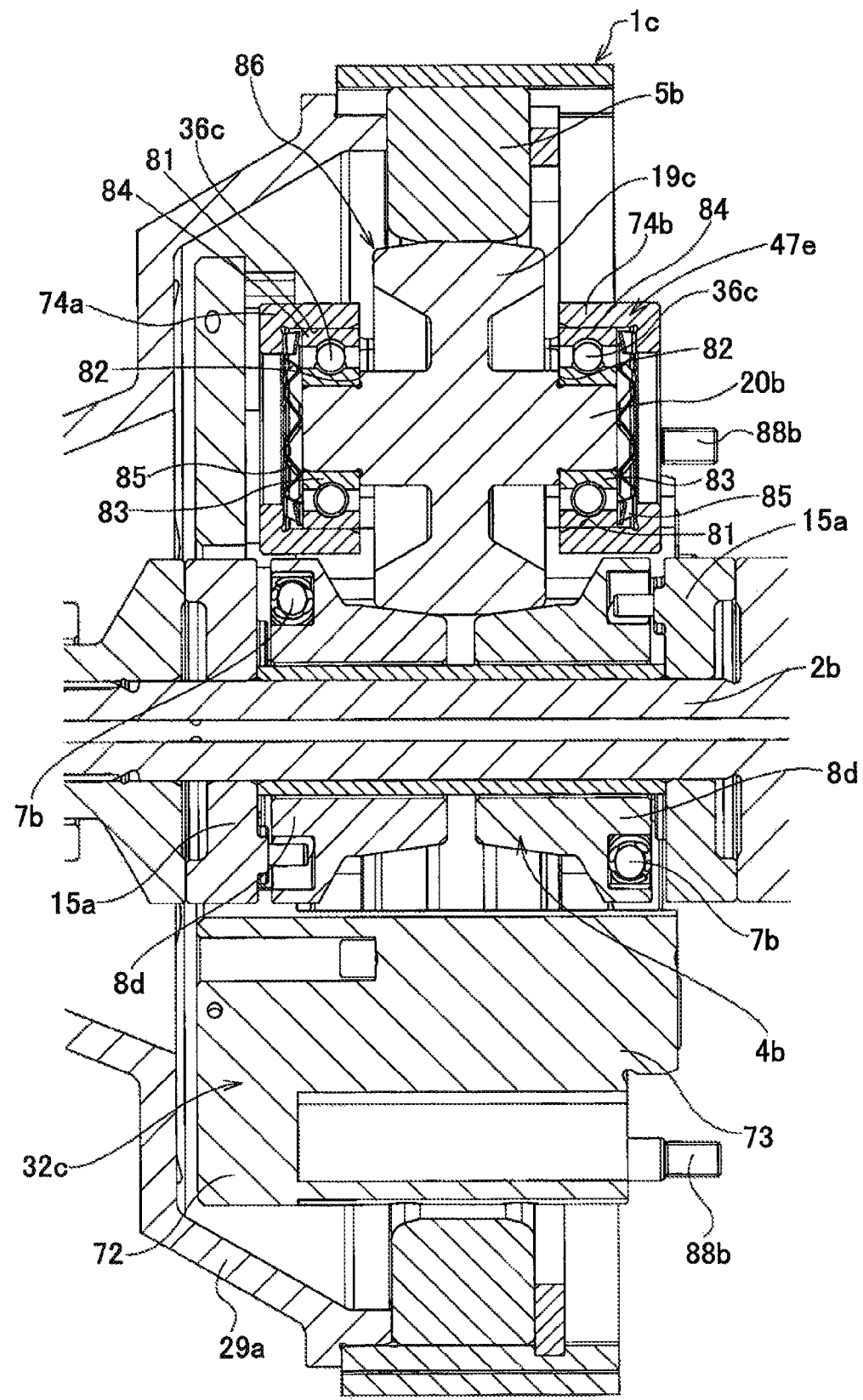
FIG. 29 is an enlarged drawing of part "d" in FIG. 28.
Figure 30:
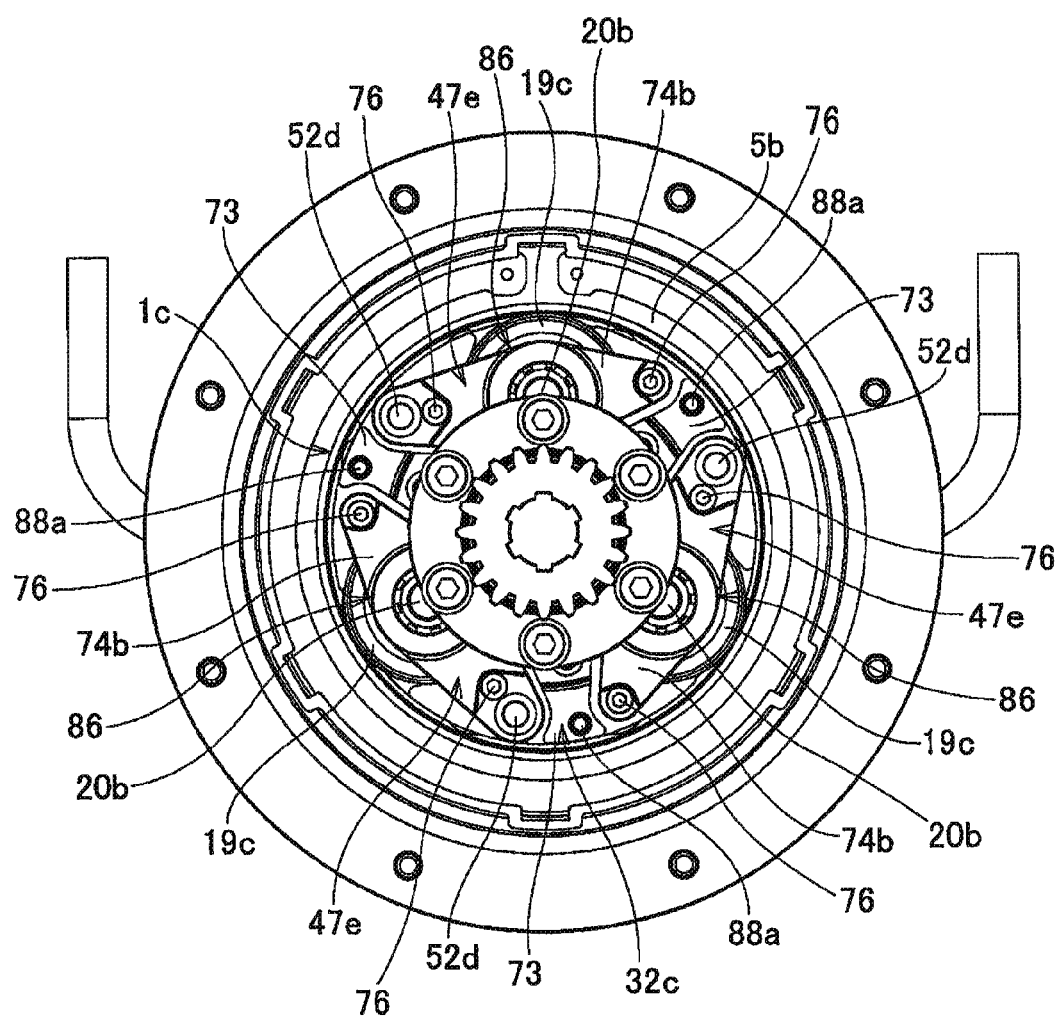
FIG. 30 is a drawing as seen from the right in FIG. 28.
Figure 31:
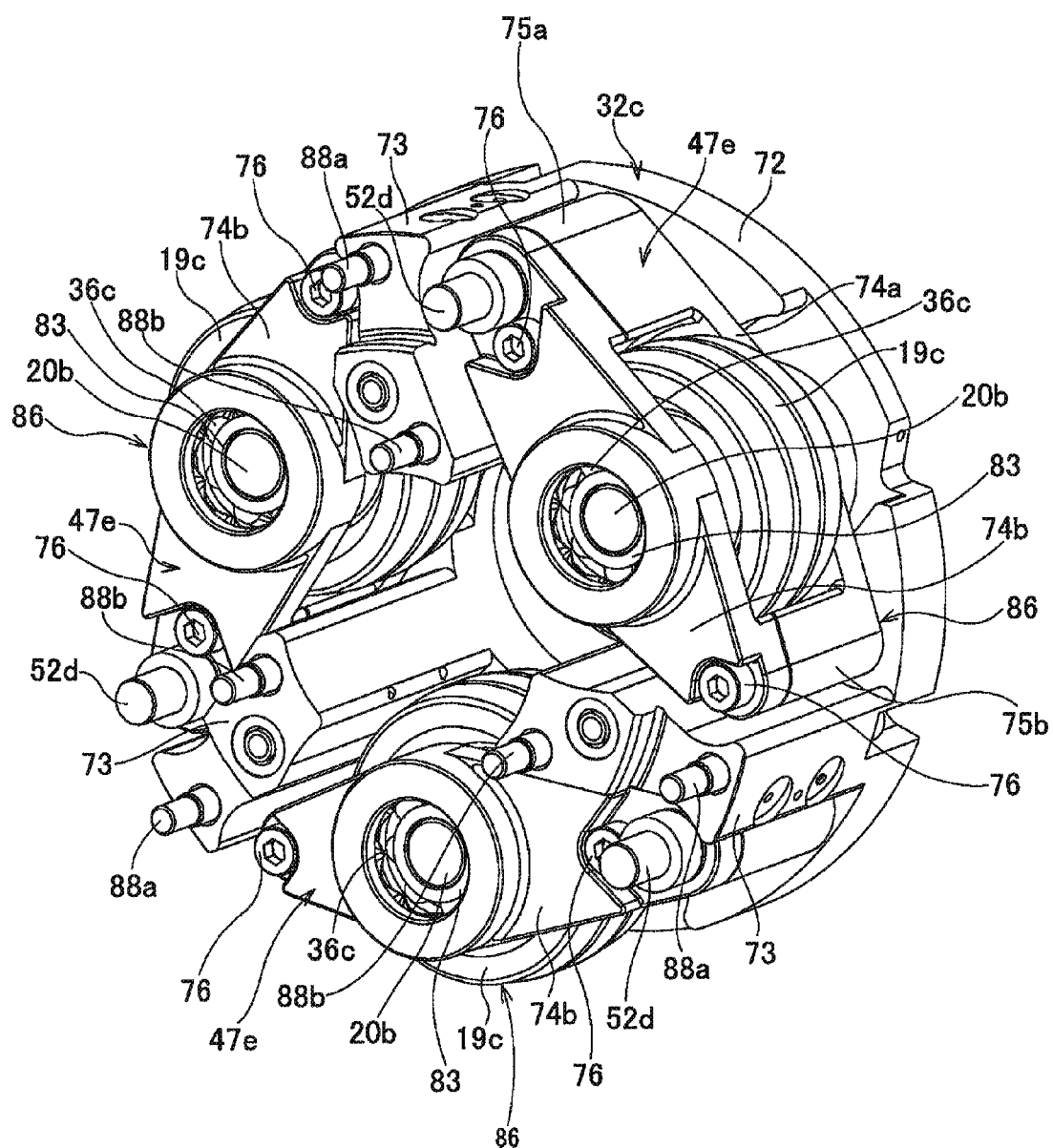
FIG. 31 is a perspective drawing illustrating the state as seen from the right in FIG. 28 of a removed friction roller reducer with the sun roller and ring-shaped roller omitted in the eighth example of an embodiment of the present invention.
Figure 32:
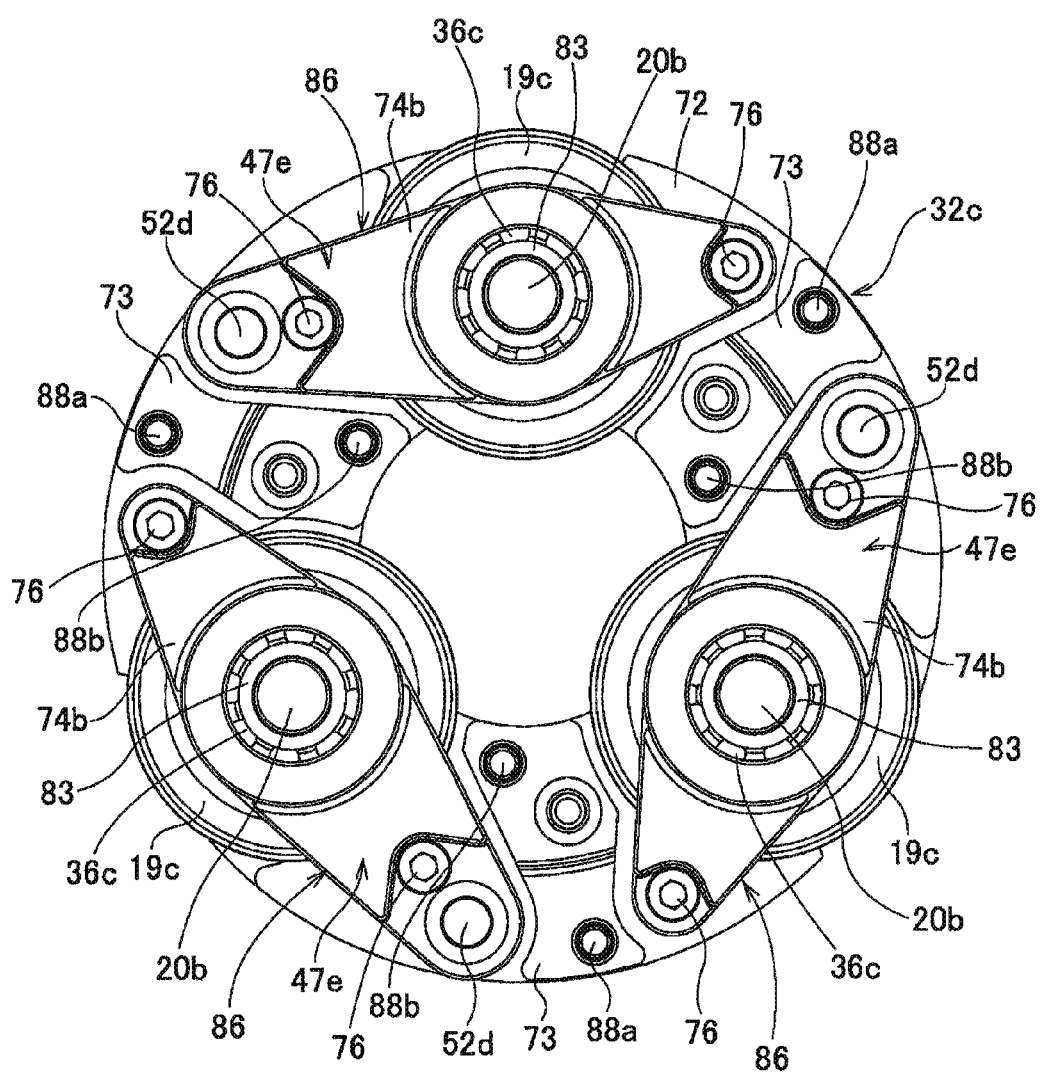
FIG. 32 is an orthographical drawing as seen from the left in FIG. 31 of the eighth example of an embodiment of the present invention.
Figure 33:
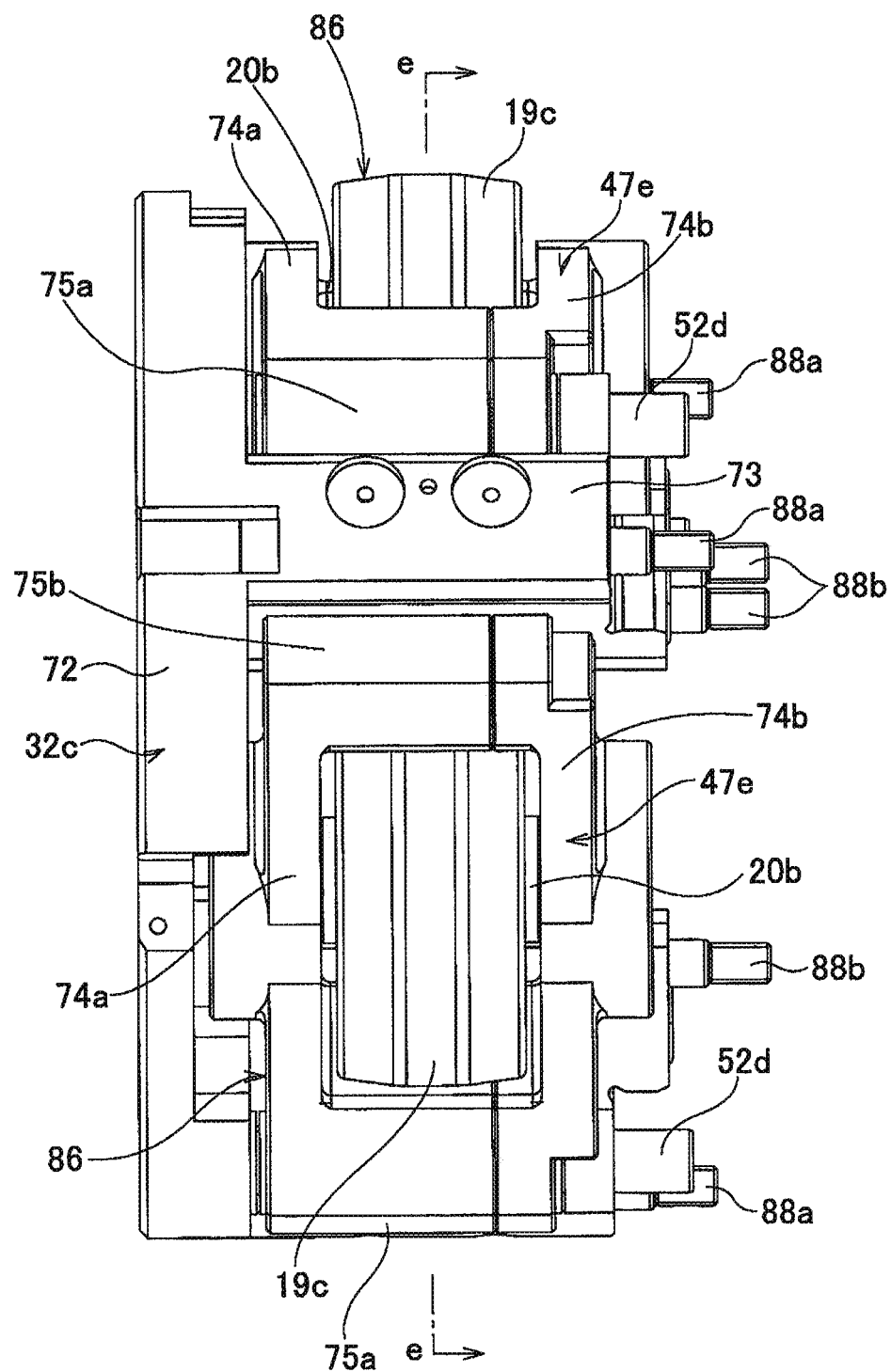
FIG. 33 is an orthographical drawing as seen from the left in FIG. 32 of the eighth example of an embodiment of the present invention.
Figure 34:
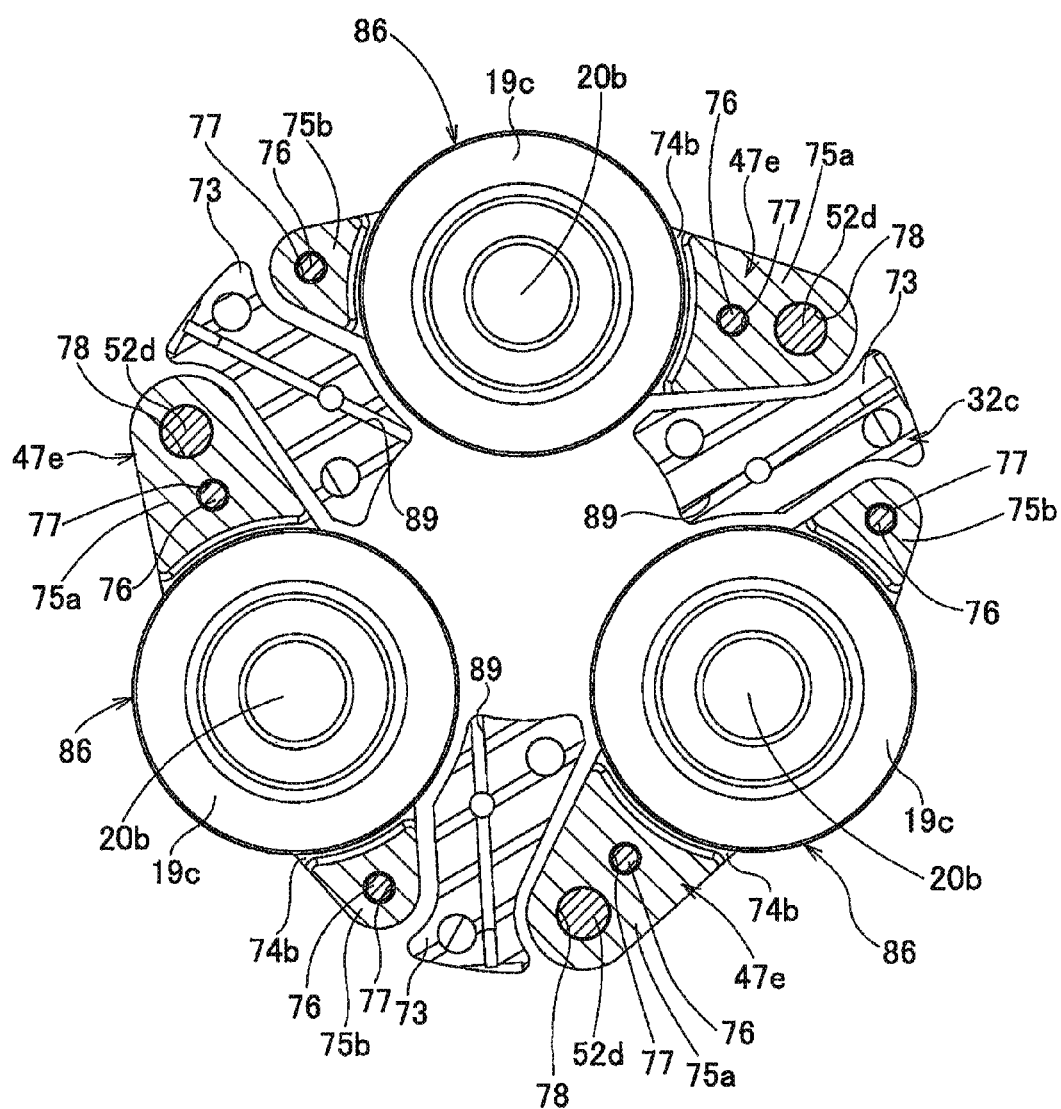
FIG. 34 is a cross-sectional drawing of section "e-e" in FIG. 33.
Figure 35:
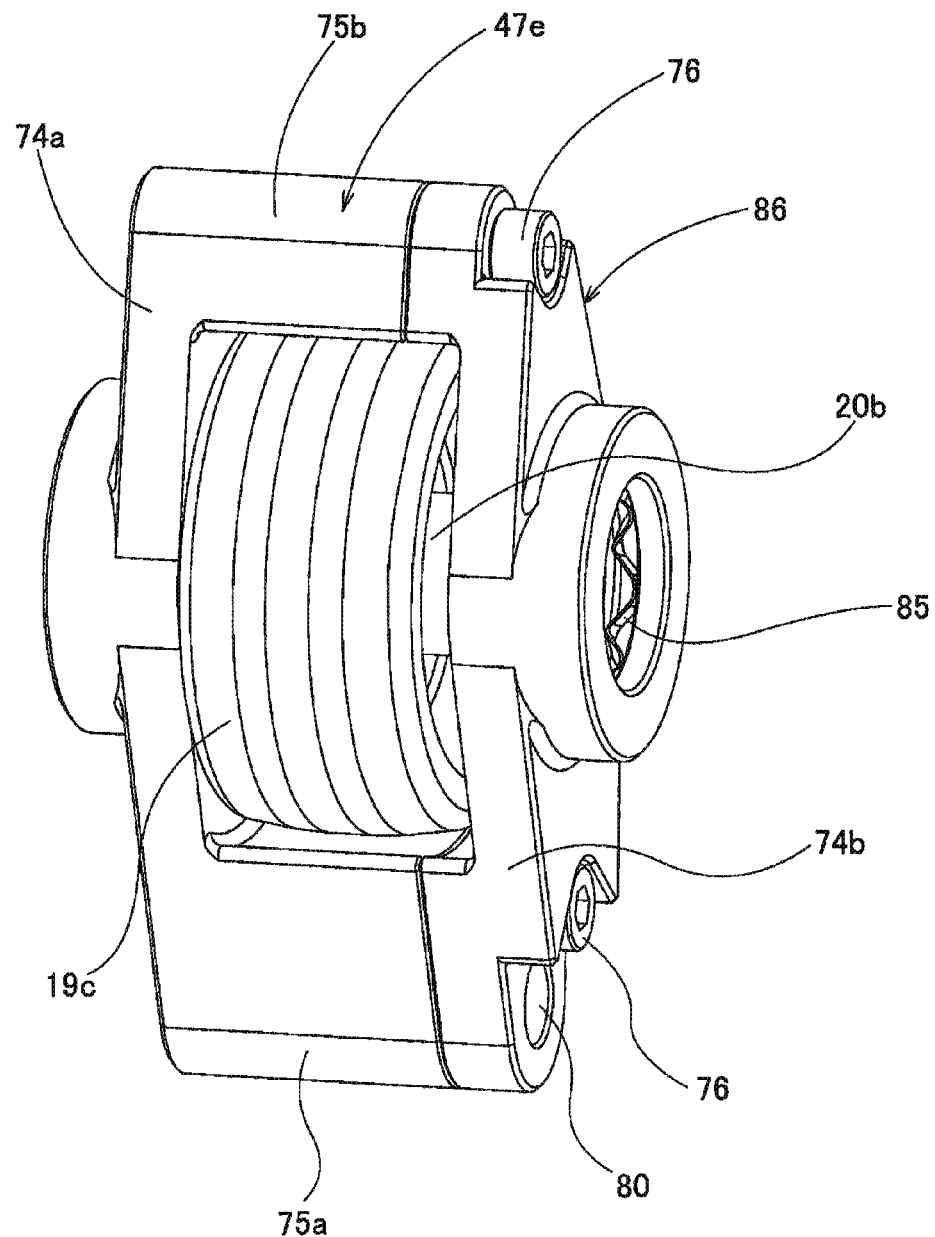
FIG. 35 is a perspective drawing illustrating a removed pivot frame and intermediate roller in the assembled state of the pivot mechanism of the eighth example of an embodiment of the present invention.

FIG. 25 to FIG. 27 illustrate a seventh example of an embodiment of the present invention. In this example as well, as in the case of the sixth example of the embodiment, the pivot frame 47d is constructed by connecting and fastening a first element 66a and a second element 67a by a second bolt 68a. Particularly, in the case of the construction of this example, a hollow cylindrical shaped bolt is used as the second bolt 68a. This second bolt 68a is provided around the pivot shaft 52c. In other words, the pivot shaft 52c is inserted through the inside of the second bolt 68a that connects and fastens the first element 66a and the second element 67a. The construction and functions of the other parts are the same as in the fifth and sixth example of the embodiment.

Eighth Example

FIG. 28 to FIG. 38 illustrated an eighth example of an embodiment of the present invention. The construction of this example, for the same reason as in the fifth example of the embodiment, is a construction for improving the rigidity of the support arms of the pivot frame that holds an intermediate roller from both sides in the axial direction so that the space between a pair of support plate sections does not widen. The friction roller reducer 1c of this example is housed inside a transmission case such as the housing 21 illustrated in FIG. 1. An electric motor that is provided on the outside of this transmission case rotates and drives a sun roller 4b of the friction roller reducer 1c, the rotation of this sun roller 4b is transmitted to a ring-shaped roller 5b by a plurality of intermediate rollers 19c, and the rotation of this ring-shaped roller 5b is outputted by way of an output shaft 3b. In order to install this output shaft 3b, a bearing case 70 is fastened to the wall section on one end of the transmission case so as to be oil tight. The output shaft 3b is supported on the inner-diameter side of this bearing case 70 in an oil tight state by an output-side ball bearing unit 25a and an output-side seal unit 26a so as to be able to rotate freely. This output shaft 3b and the ring-shaped roller 5b are connected by a connecting section 29a in a concentric state.

Moreover, the input shaft 2b is installed in a wall section on the other end of the transmission case, and is supported by this wall section on the other end by way of an input-side ball bearing unit 23a that comprises an input-side seal unit 71 on as to be able to rotate freely. The sun roller 4b is constructed by a pair of sun roller elements 8d that are symmetrical with each other, and are located around the base end half of the input shaft 2b. Moreover, loading cam apparatuses 7b are provided between these sun roller elements 8*d* and the input shaft 2*b*, such that the sun roller elements 8*d* can be rotated and driven by the input shaft 2*b*, with the loading cam apparatuses 7*b* pressing the sun roller elements 8*d* in a direction toward each other. The construction of this part is the same as the construction of the third example of the embodiment illustrated in FIG. 11, and is not related to the scope of the present invention. It is also possible to use other construction.

Then intermediate rollers 19*c* are supported by a support frame 32*c* that is supported by and fastened to the transmission case by way of the same number of pivot frames 47*e* as the number of intermediate rollers 19*c* so as to be able to freely rotate and to displace freely a little in the radial direction of the support frame 32*c*. The support frame 32*c* is constructed by a circular ring-shaped connecting plate section 72, and column sections 73 that protrude parallel with axial direction of the support frame 32*c* from a plurality of locations (three locations in the example in the figures) that are evenly spaced in the circumferential direction on the surface on one side in the axial direction of the connecting plate section 72. The cross-sectional shape of these column sections 73 is long in the radial direction of the support frame 32*c*. Moreover, the pivot frames 47*e* are located in the portion between adjacent column sections 73 in the circumferential direction, and one end thereof in the circumferential direction of the support frame 32*c* pivotally displaces freely around the pivot shaft 52*d*, the base end of which are connected and fastened to the surface on one side in the axial direction of the connecting plate 72.

Each of the pivot frames 47*e* is constructed by connecting and fastening both ends in the lengthwise direction of a pair of support plate sections 74*a*, 74*b*, which are separated in the axial direction, by a bolt 76, with the support plate sections 74*a*, 74*b* facing each other across connecting sections 75*a*, 75*b*. These connecting sections 75*a*, 75*b* are such that the base end sections of each are connected to the one support plate section 74*a* (left side in FIG. 35, FIG. 36 and FIG. 38) so as to be integrated with this one support plate section 74*a*. Screw holes 77 are formed on the inside of the connecting sections 75*a*, 75*b*, and these screw holes 77 are open on the tip end surfaces of the connecting sections 75*a*, 75*b*. One connecting section 75*a* (bottom side in the FIG. 35 to FIG. 38) of these connecting sections 75*a*, 75*b* is thicker (larger cross-sectional area) than the other connecting section 75 (top side in FIG. 35 to FIG. 37), and in the portion further separated toward the end section than the screw hole 77, a pivot support hole 78 having a circular cross section is formed so as to pass through the connecting section 75*a*. On the other hand, of the other support plate section 74*b* (right side in FIG. 35, FIG. 36 and FIG. 38), first through holes 79 are formed in positions that are aligned with the screw holes 77, and a second through hole 80 is formed in the portion that is aligned with the pivot support hole 78. Moreover, in the portions in center sections of the support plate sections 74*a*, 74*b* that are aligned with each other, circular concave support sections 81 are formed.

On the other hand, an intermediate roller 19*c* is formed so as to be integrated and concentric with a rotation shaft 20*b*. Both end sections of the rotation shaft 20*b* protrude further in the axial direction than the surfaces on both ends in the axial direction of the intermediate roller 19*c*, and the portion near the protruding tip ends have a smaller diameter than the portion near the base end such that a stepped section 82 is formed in between the portion near the tip end and the portion near the base end. Inner rings 83 of single-row deep-groove ball bearings 36*c* are fitted around both end sections of this kind of rotation shaft 82 with an interference fit, and the end surfaces in the axial direction of these inner rings 83 come in contact with the stepped section 82. Moreover, the outer rings 84 of the ball bearings 36 have an outer diameter just enough to fit inside the concave support section 81 without backlash in the radial direction but so as to be able to displace in the axial direction. Furthermore, with the end surfaces in the axial direction of the inner rings 83 in contact with the stepped sections 82, the space d between the outer end surfaces in the axial direction of the outer rings 84 (end surface on opposite sides from each other) is sufficiently smaller than the space D between the bottom surfaces of the concave support sections 81 (d<D).

The intermediate roller 19*c* described above is supported by the pivot frame 47*e* by way of ball bearings 36*c* so as to be able to rotate freely, and so as to be able to displace a little in the axial direction. The rotation resistance (dynamic torque) of these ball bearings 36*c* is small, so it is possible keep the rotation resistance of the intermediate roller 19*c* low, and to improve the transmission efficiency of the friction roller reducer 1*c*. Moreover, elastic members such as wave plate springs 85 are provided between the surface on the outside ends in the axial direction of the outer rings 84 and the bottom surface of the concave support sections 81, and these springs elastically presses the intermediate roller 19*c* toward the center in the axial direction. The elastic force of the wave plate springs is set to as small as possible but to still allow the intermediate roller 19*c* to displace in the axial direction due to the operation of the loading cam apparatuses 7*b*. With this construction, the intermediate rollers 19*c* are supported by the middle section of the pivot frame 47*e* so that there is no backlash, however, when the rigidity against a moment in the direction that causes the center axes of the intermediate rollers 19*c* to incline is suitably low, the intermediate rollers 19*c* are supported so as to be able to freely rotate and to displace in the axial direction due to inevitable manufacturing error of each of the parts. The main purpose of installing the wave plate springs 85 is to position the intermediate roller 19*c* in a center position in the axial direction with respect to the pivot frame 47*e*, and to simplify the work for assembling the intermediate rollers 19*c*, sun roller 4*b* and ring-shaped roller 5*b*. Therefore, when there is no external force acting on the intermediate rollers 19*c*, the elastic force of the wave plate springs 85 can be a small value that is just enough to return the intermediate rollers 19*c* to the center position.

Figure 36:
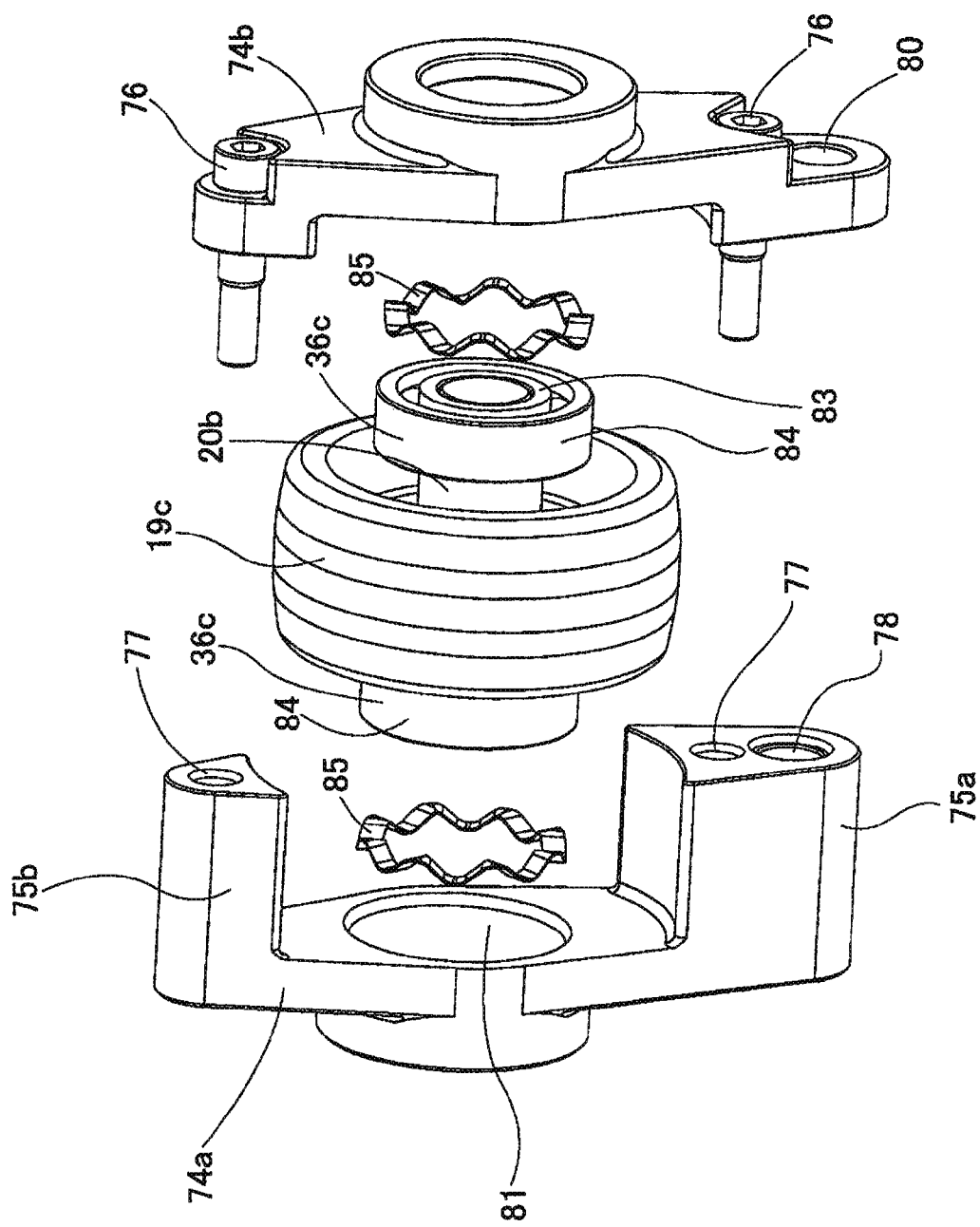
FIG. 36 is an exploded perspective drawing of the pivot mechanism illustrated in FIG. 35.
Figure 37:
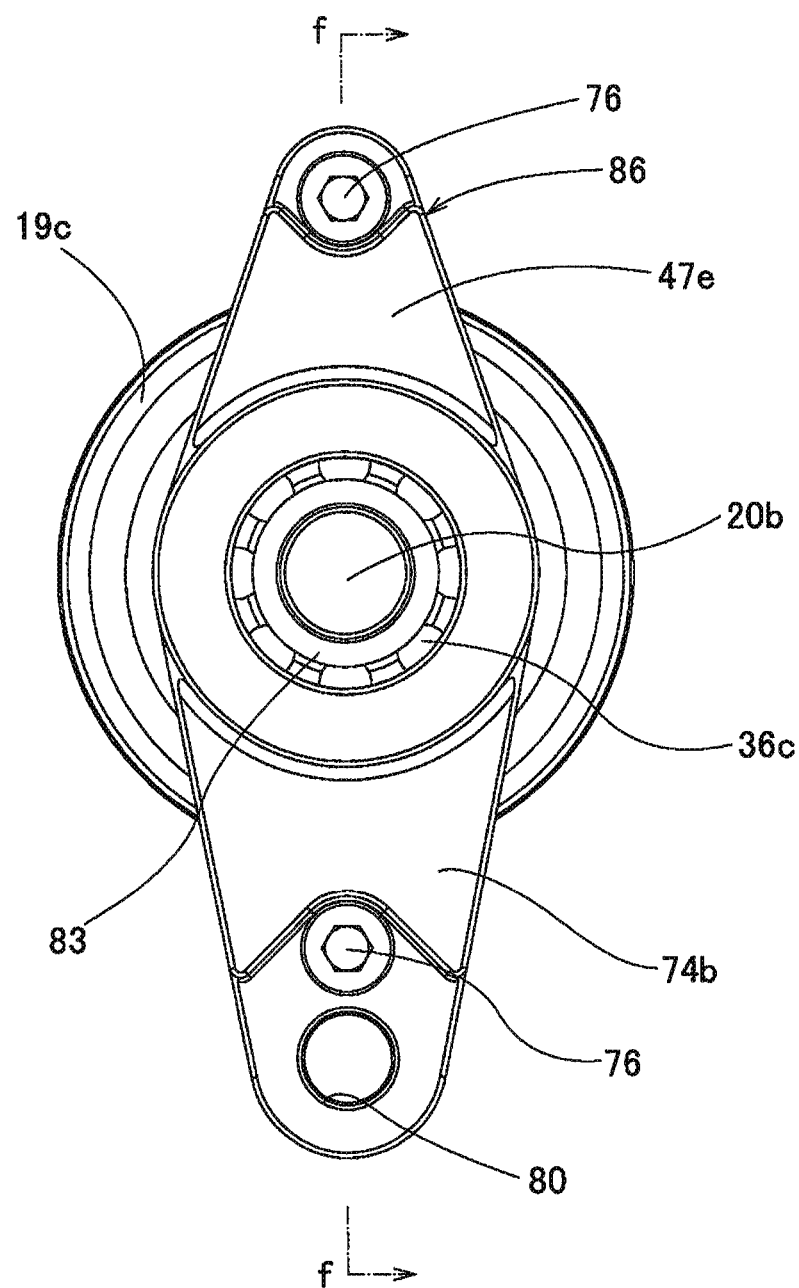
FIG. 37 is an orthographical drawing as seen from axial direction of the intermediate roller of the pivot mechanism illustrated in FIG. 35.
Figure 38:
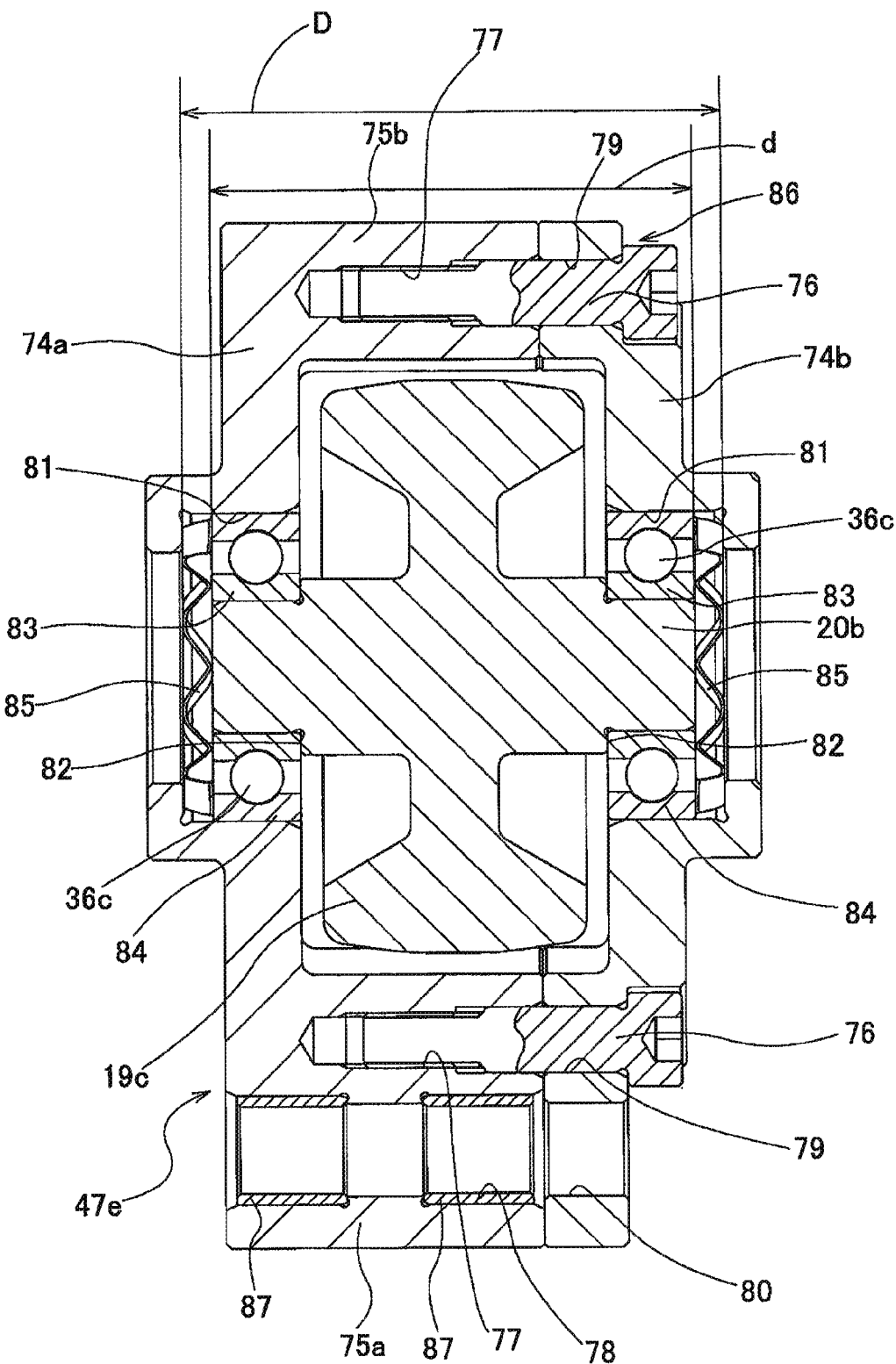
FIG. 38 is a cross-sectional drawing of section "f-f" in FIG. 37.

As illustrated in FIG. 36, when installing the intermediate roller 19*c* in the pivot frame 47*e*, the inner rings 83 of the ball bearings 36*c* are fitted and fastened around the outside of both end sections of the rotation shaft 20*b*, after which the support plate sections 74*a*, 74*b* are placed close to each other. When doing this, the wave plate springs 85 are inserted into the concave support sections 81. Next, while compressing the wave plate springs 85 in the axial direction, the support plate sections 74*a*, 74*b* brought close together. Then, after bringing the tip end surfaces of the connecting sections 75*a*, 75*b* into contact with the inside surfaces of both end sections of the other support section 74*b*, the bolts 76 that have been inserted through the first through holes 79 of the other support plate section 74*b* are screwed into the screw holes 77 that are formed in the connecting sections 75*a*, 75*b*, and then further tightened. As a result, an intermediate roller unit 86 in which the intermediate roller 19*c* is supported by a pivot frame 47*e* so as to rotate freely is obtained.

This kind of intermediate roller unit 86 is built into the support frame 32*c* so as to be able to pivotally displace freely around the pivot shaft 52*d*. In order for this, sliding bearings 87 are fitted inside a second through hole 80 that is located on the end section of the pivot frame 47e. The pivot shafts 52d are inserted inside these sliding bearings 87, and the base end sections of the pivot frames 47e are supported by the pivot shafts 52d so as to be able pivot freely. Furthermore, the support frame 32c is supported by and fastened to the inside of the transmission case by screwing bolts 88a, 88b that are inserted though the column sections 73 into screw holes that are formed on a fastening wall section (not illustrated in the figure) that is provided inside the transmission case, and further tightening the bolts 88a, 88b. In this state, the pivot frames 47e are supported between the connecting plate section 72 and the fastening wall section or the like so as to be able to pivotally displace a little around the pivot shafts 52d.

Moreover, supply paths 89 for traction oil, which is a lubricant, are provided on the inside of the column sections 73. The downstream end of these supply paths 89 is open toward the outer circumferential surface of the sun roller 4b (see FIG. 28 and FIG. 29), and traction oil is fed to the contact areas (traction areas) between the circumferential surfaces of the sun roller 4b, intermediate rollers 19c and ring-shaped roller 5. This kind of lubrication construction for supplying traction oil is also not related to an aspect of the present invention, and other construction could also be used, on this construction is only illustrated in the figures and a detailed explanation is omitted.

The pivot frames 47e of the friction roller reducer 1c of this example are such that both end in the lengthwise direction of a pair of support plate sections 74a, 74b that is provided for each of these pivot frames 47e are connected together by connecting sections 75a, 75b and bolts 76. Therefore, the support plate sections 74a, 74b are such that both end sections in the lengthwise direction of each are connected together, so even when the inside surface of one support plate section 74a (74b) of these support plate sections 74a, 74b is pressed by an intermediate roller 19c, the space between the support plate sections 74a, 74b is not widened. Therefore, it is possible to prevent strong rubbing between the outside surface of the support plate sections 74a, 74b and the connecting sections and fastening wall section or the like that are adjacent to the support plate sections 74a, 74b, and it is possible perform pivotal displacement of the pivot frame 47e smoothly, and thus it is possible to prevent a drop in the transmission efficiency of the friction roller reducer 1c.

Furthermore, in the case of the construction of this example, by appropriately regulating the positional relationship of the sun roller 4b, ring-shaped roller 5b, intermediate rollers 19c and the pivot frames 47e that support these intermediate rollers 19c, the transmission efficiency of the friction roller reducer 1c is improved. In other words, the intermediate rollers 19c uniformly transmit torque between the sun roller 4b and the ring-shaped roller 5b, which makes it possible to maintain the transmission efficiency.

Figure 39A:
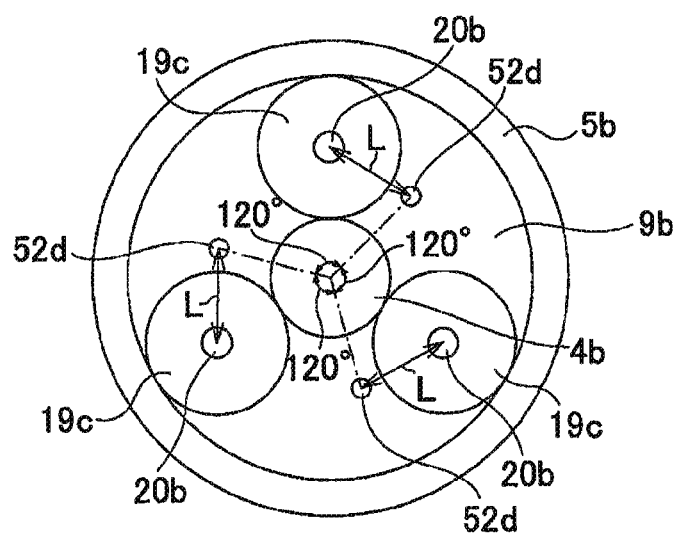
FIGS. 39A to 39C are schematic drawings for explaining the preferred positional relationship of the sun roller, ring-shaped roller, intermediate rollers, and the support structure of the pivot frame that supports the intermediate rollers, where

More specifically, as illustrated in FIG. 39A, the pivot shafts 52d, which support one end section of the pivot frames 47e so as to be able to pivot freely, are uniformly located in the circumferential direction inside the ring-shaped space 9b between the outer circumferential surface of the sun roller 4b and the inner circumferential surface of the ring-shaped roller 5b. In this example, three pivot shafts 52d are uniformly located in the circumferential direction inside this ring-shaped space 9b at a central angle pitch of 120°. Together with this, the distances L between the pivot shafts 52d that support the end sections of the pivot frames 47e and the rotation shafts 20b that are provided in the middle sections of these pivot frames 47e are the same between each of these pivot frames 47e.

Therefore, in the case of the friction roller reducer 1c of this example, the outer circumferential surfaces of the intermediate rollers 19c come uniform contact with the outer circumferential surface of the sun roller 4b and the inner circumferential surface of the ring-shaped roller 5b. Moreover, when the intermediate rollers 19c displace inside the ring-shaped space 9b in the radial direction of this ring-shaped space 9b due to the movement of the sun roller elements 8d of the sun roller 4b away from and toward the intermediate rollers 19c, the rotation shafts 20b that support these intermediate rollers 19c move in an arc shape having the same radius of curvature. Therefore, regardless of fluctuation in torque that is transmitted between the sun roller 4b and the ring-shaped roller 5b, the intermediate rollers 19c transmit nearly the same torque, so it is possible to keep the surface pressure at the traction areas, which are areas of rolling contact between the sun roller 4b, the intermediate rollers 19c and the ring-shaped roller 5b, uniform, and thus it is possible to improve the transmission efficiency of the friction roller reducer 1c.

Figure 39B:
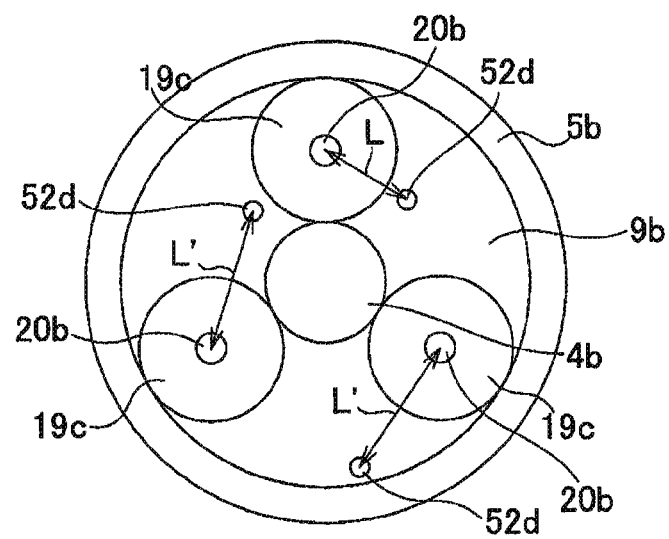
Figure 39C:
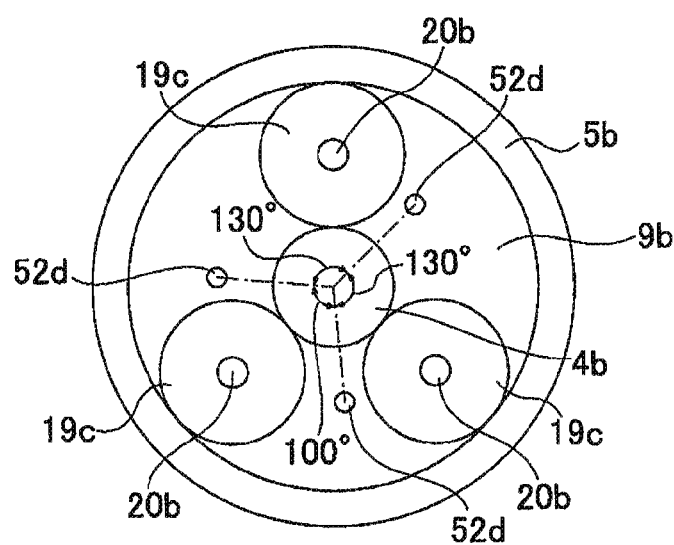

In contrast with the construction of this kind of example, when, as illustrated in FIG. 39B, the distances L, L' between the pivot shafts 52d and the rotations shafts 20b are different (L # L'), or as illustrated in FIG. 39C, when the pivot shafts 52d are not arranged inside the ring-shaped space 9b an as not to be uniformly spaced in the circumferential direction, it becomes easy for the surface pressure at the traction areas to become not uniform, and thus it becomes easy for the transmission efficiency of the friction roller reducer 1c to worsen.

Ninth Example

Figure 40:
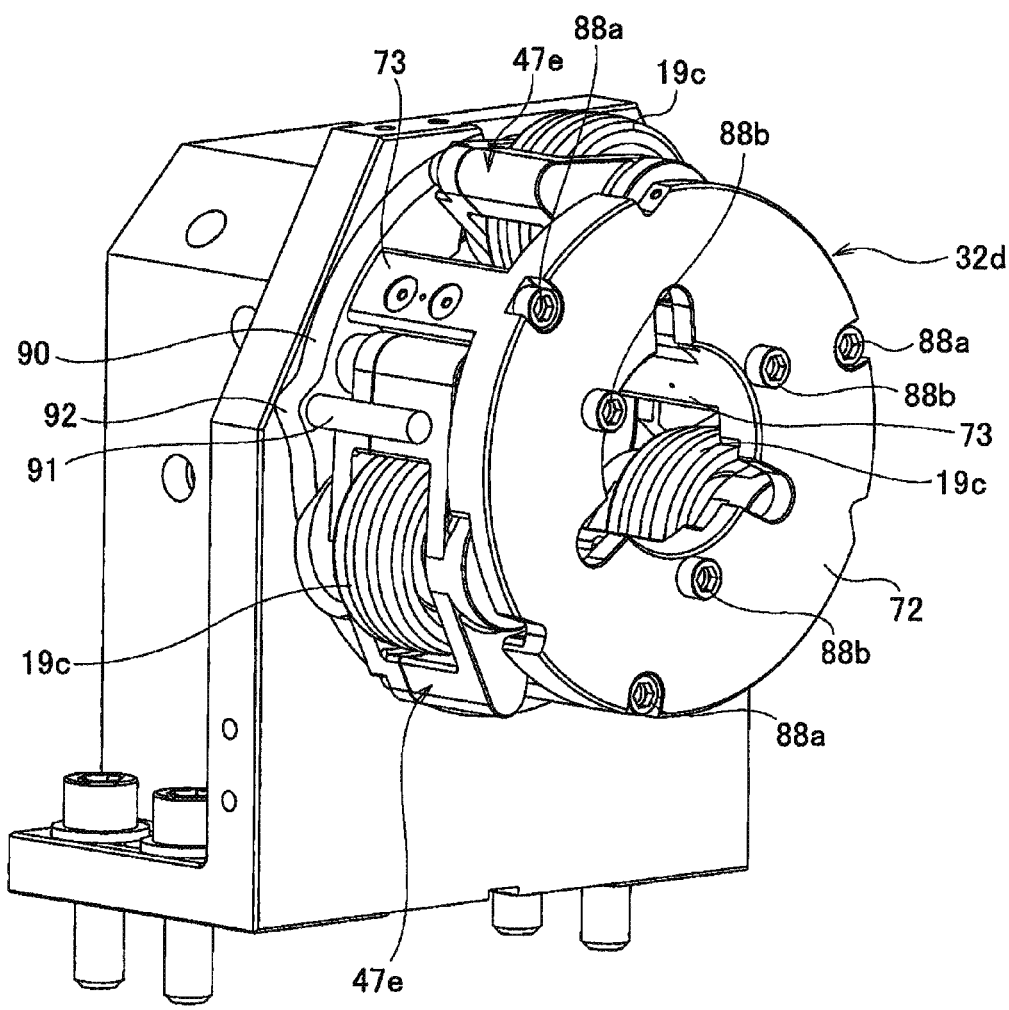
FIG. 40 is a perspective drawing illustrating a ninth example of an embodiment of the present invention, and illustrates the removed friction roller reducer in a state with the ring-shaped roller omitted.

FIG. 40 and FIG. 41 illustrate a ninth example of an embodiment of the present invention. In this example, the base end sections of the same number of stopper pins 91 as there are pivot frames 47e are supported by and fastened to a base plate 90 of a support frame 32d. Therefore, in the case of this example, protruding sections 92 are formed at three locations on the outer circumferential edge of the base plate 90 that are evenly spaced in the circumferential direction, and small-diameter screw sections that are formed on the base end sections of the stopper pins 91 are screwed into screw holes (not illustrated in the figure) that are formed in these protruding sections 92, and further tightened. The outer circumferential surfaces of part of these stopper pins 91 face the edges on the outer diameter side of corresponding pivot frames 47e in the radial direction of the support frame 32d.

In this state, when the ring-shaped roller 5b (see FIG. 28 to FIG. 30) is assembled around the outside of the intermediate rollers 19c, and the outer circumferential surfaces of the intermediate rollers 19c come in contact with the inner circumferential surface of the ring-shaped roller 5b, the dimensions and position relationship of the parts are regulated so that small spaces 93 exist between part of the outer circumferential surfaces of the stopper pins 91 and the edges on the outer diameter side of the pivot frames 47e. The width dimension of these spaces 93 are regulated as follows. First, the minimum value of this width dimension is maintained so as to allow the outer circumferential surfaces of the intermediate rollers 19c that are supported by the pivot frames 47 to come in contact with the inner circumferential surface of the ring-shaped roller 5b such that the surface pressure at the traction areas, which are areas of rolling contact between these circumferential surfaces, sufficiently increases. On the other hand, the maximum value is regulated to prevent the diameter of the circumscribed circles of the intermediate rollers 19c from greatly exceeding the inner diameter of the ring-shaped roller 5b, so as not to hinder the assembly work of assembling the intermediate rollers 19c on the inner-diameter side of the ring-shaped roller 5b.

Figure 41A:
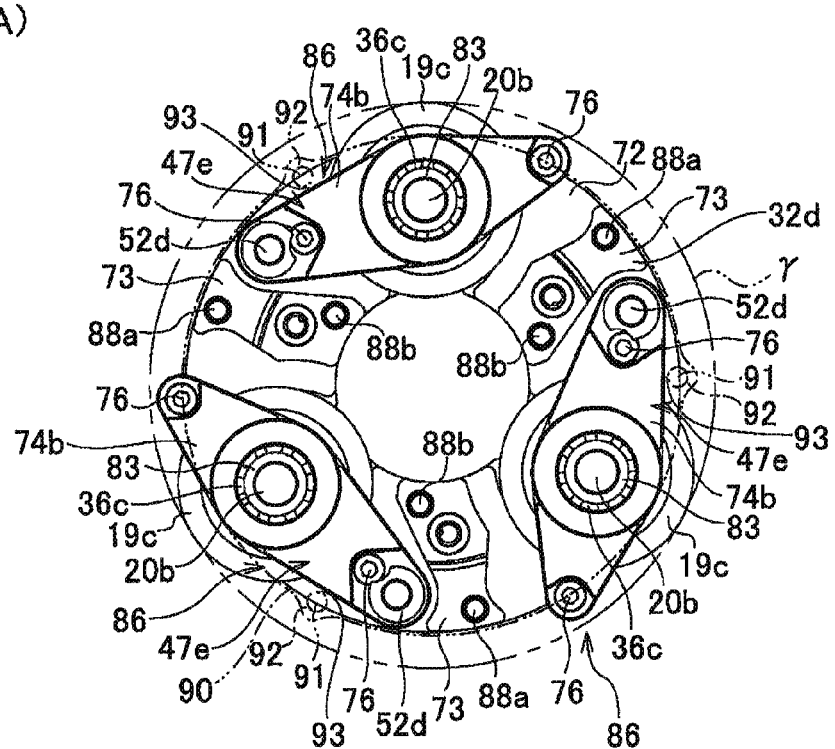
FIGS. 41A and 41B are orthographical drawings of the main parts as seen from the rear in FIG. 40 and are for explaining the functions of the construction of the ninth example of an embodiment of the present invention, where

This point will be explained in further detail with reference to FIG. 41A and FIG. 41B. As illustrated in FIG. 41A, in the case of the construction of this example, the stoppers 91 restrict the pivotal displacement of the pivot frames 47e around the pivot shafts 52d. Therefore, the even when the intermediate rollers 19c displace outward in the radial direction of the support frame 32d, it is possible to keep the diameter of the circumscribed circle of the intermediate rollers 19c indicated by the chain line γ in FIG. 41A small. Moreover, the tip end sections of the pivot frames 47e do not protrude to the outside in the radial direction further than this circumscribed circle. Therefore, when assembling the intermediate rollers 19c inside the ring-shaped roller 5b, these intermediate rollers 19c can be assembled on the inner-diameter side of the ring-shaped roller 5b by causing these intermediate rollers 19c to displace only a little inward in the radial direction of the support frame 32d.

Figure 41B:
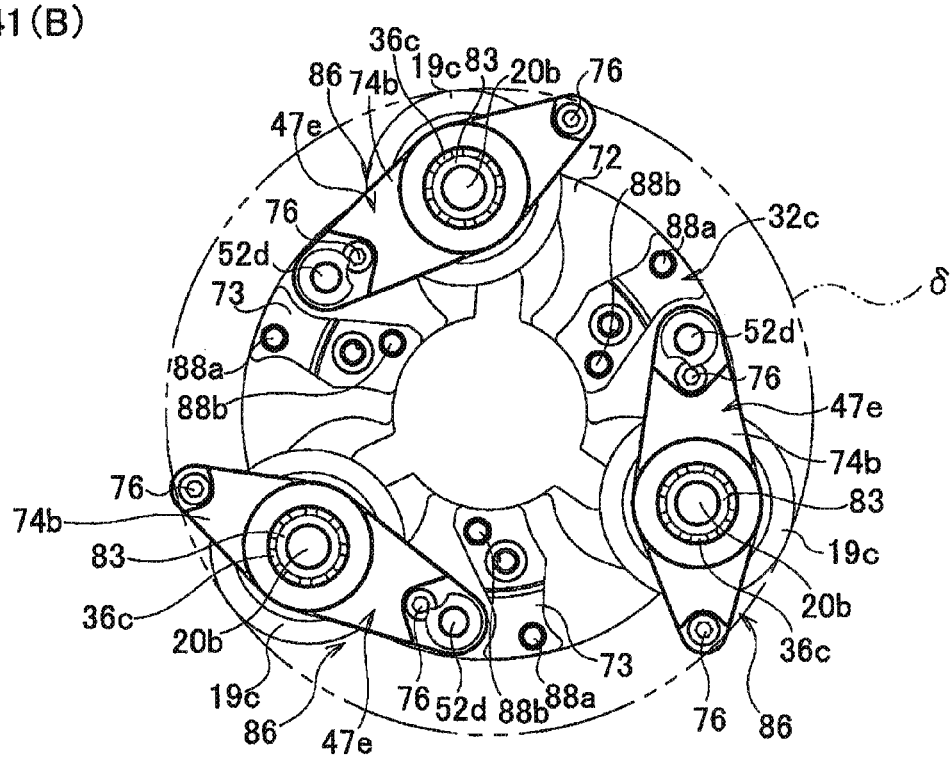
Figure 42:
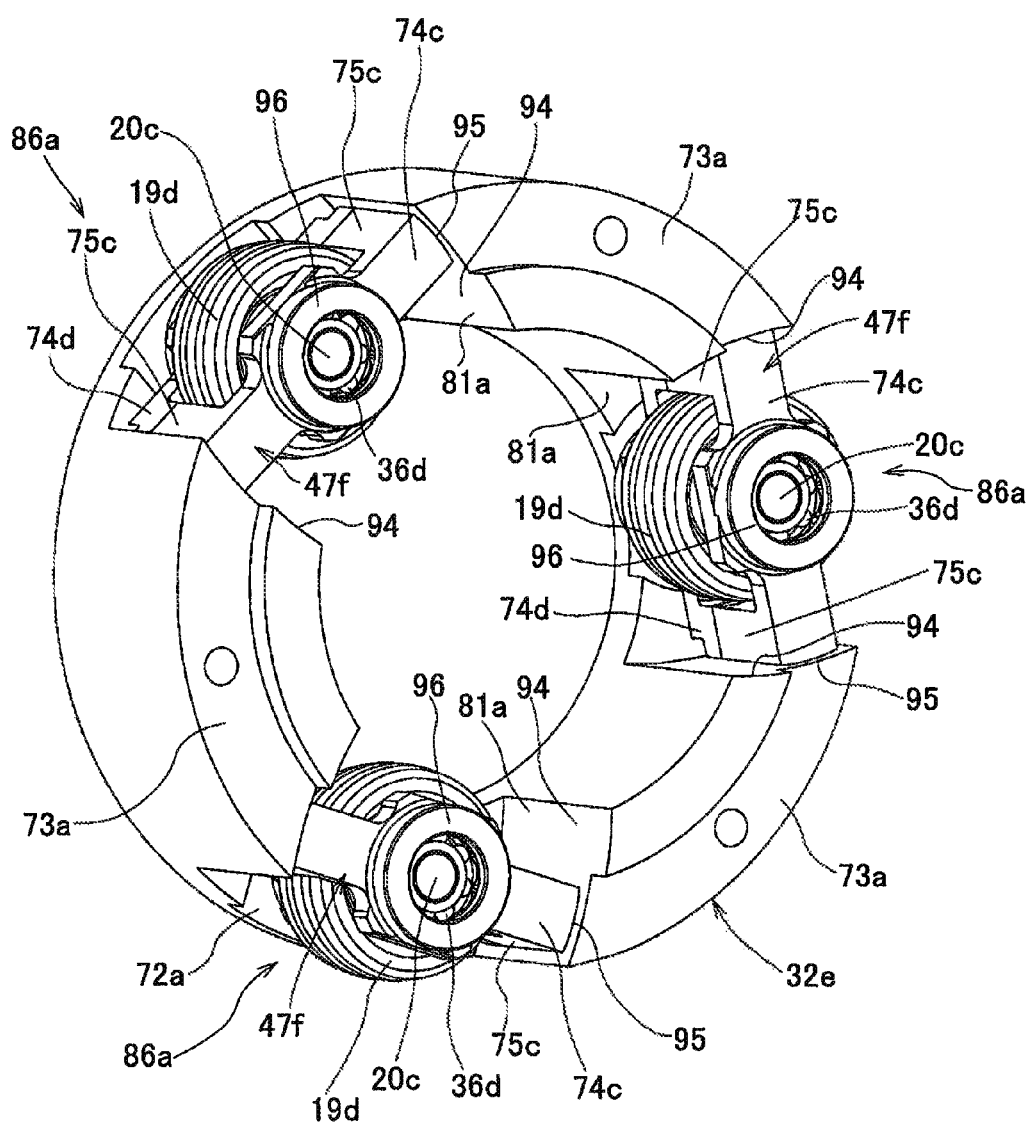
FIG. 42 is a perspective drawing illustrating a tenth example of an embodiment of the present invention, and illustrates the support frame and a plurality of pivot frames that support the intermediate rollers of a friction roller reducer.
Figure 43:
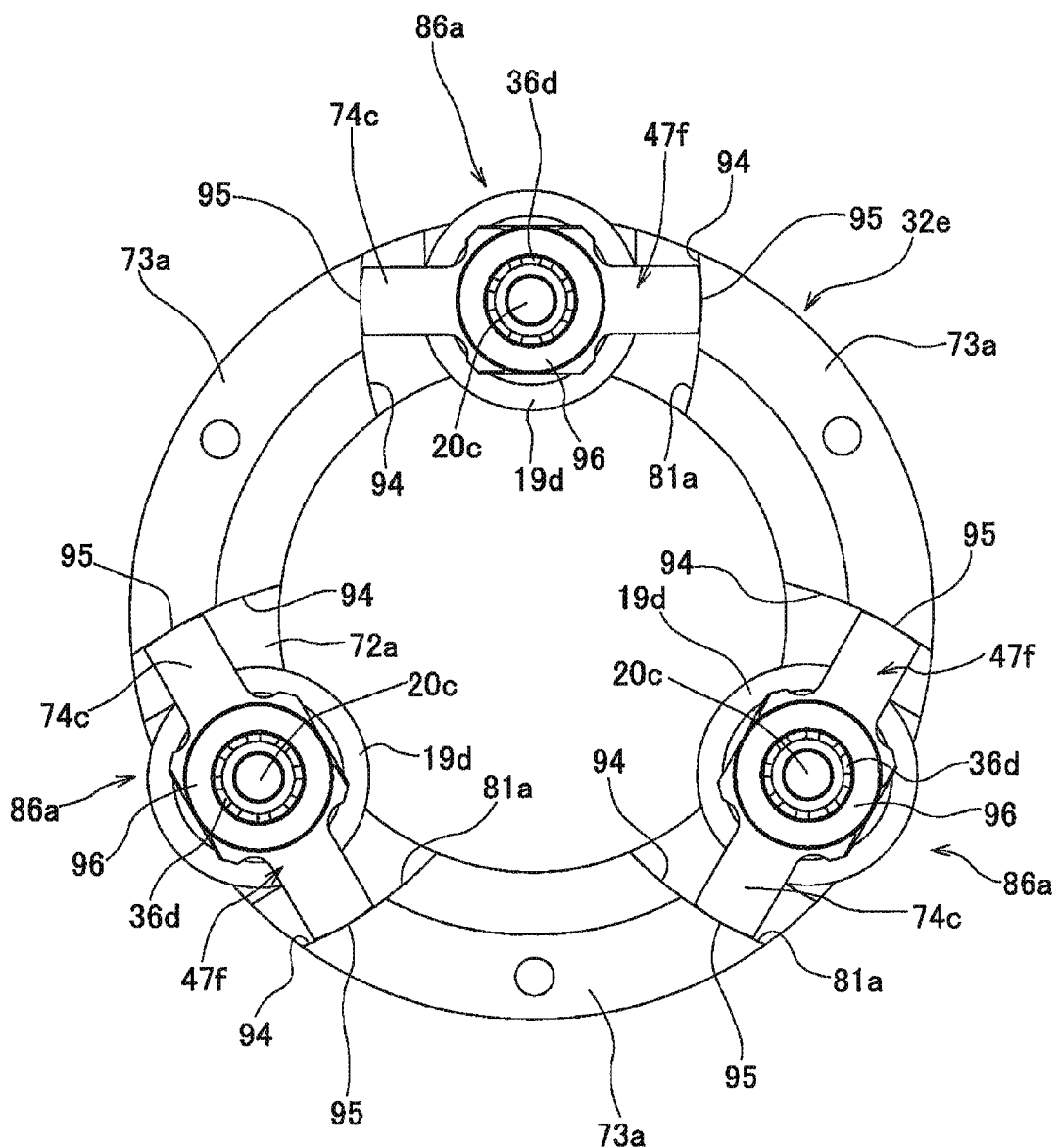
FIG. 43 is an orthographical drawing as seen from the axial direction of the pivot mechanism illustrated in FIG. 42.
Figure 44:
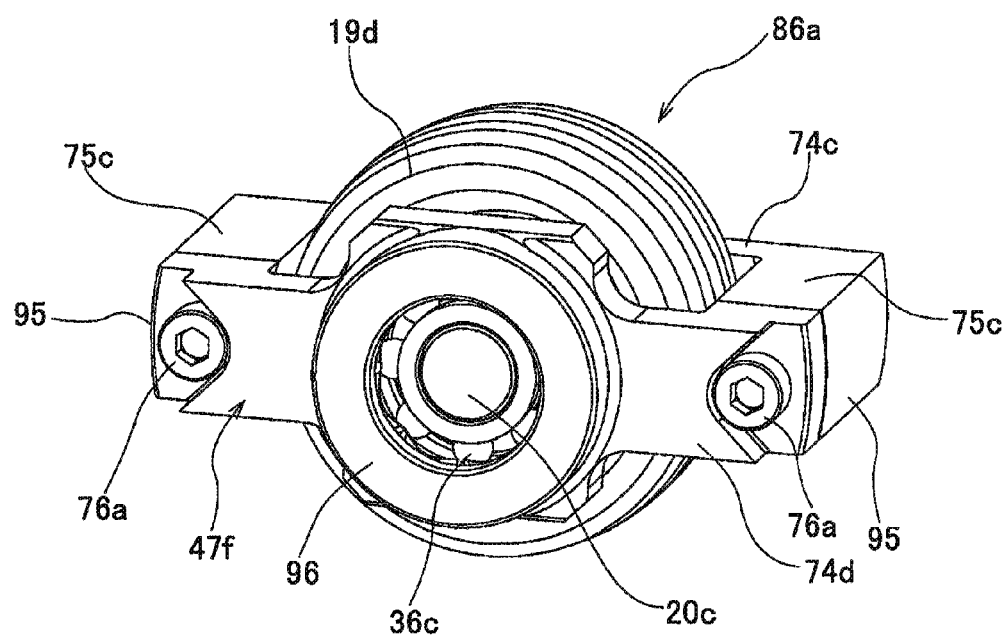
FIG. 44 is a perspective drawing illustrating the state as seen from the opposite side from that in FIG. 42 and FIG. 43 of the pivot frame illustrated in FIG. 42 that supports an intermediate roller.
Figure 45:
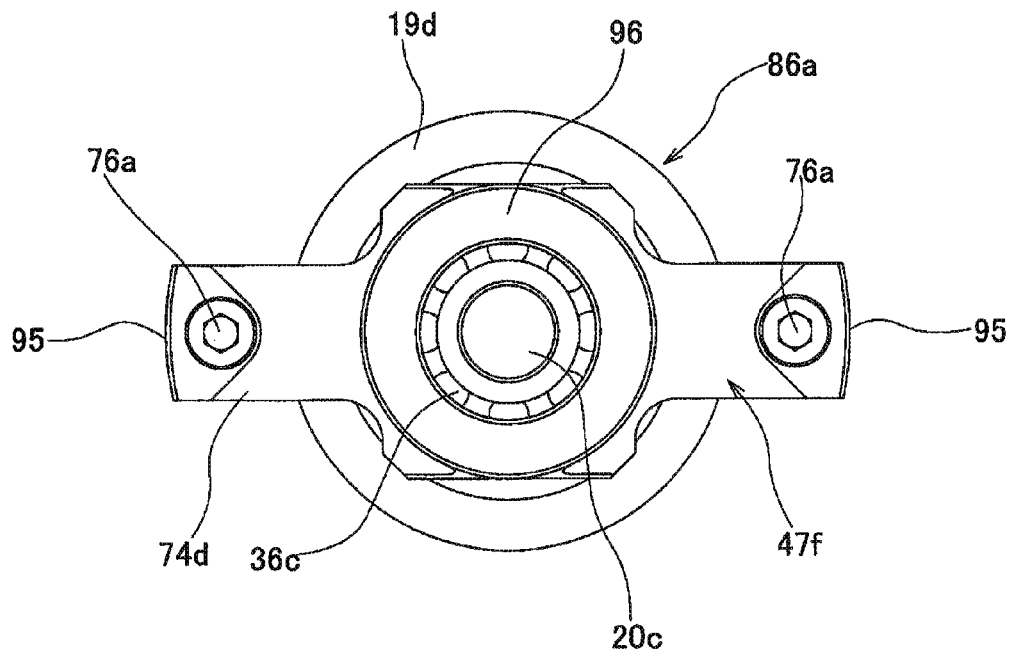
FIG. 45 is an orthographical drawing as seen from the axial direction of the pivot frame illustrated in FIG. 44 that supports an intermediate roller.

In the other hand, in the case of construction where there are not stopper pins such as in the eighth example of the embodiment, then as illustrated in FIG. 41B, when the intermediate rollers 19 displace outward in the radial direction of the support frame 32c, not only does the diameter of the circumscribed circle of the intermediate rollers 19c indicated by the chain line δ in FIG. 41B become large, but the tip end sections of the pivot frames 47e protrude to the outside in the radial direction further than this circumscribed circle. From this state, in order to assemble the intermediate rollers 19c inside the ring-shaped roller 5b, it is necessary for the intermediate rollers 19c to displace a large amount inward in the radial direction of the support frame 32c, and thus the work for assembling these intermediate rollers 19c inside the ring-shaped roller 5b is troublesome. Particularly, when performing the work of assembling the intermediate rollers 19c on the inside of the ring-shaped roller 5b in a state where the radial direction of the support frame 32d coincides with the direction of gravity, the assembling work becomes very troublesome because the pivot frame 47e which exists on the bottom side pivots downward a large amount. In the construction of this example, this kind of troublesome work is eliminated.

Tenth Example

FIG. 42 to FIG. 45 illustrate a tenth example of an embodiment of the present invention. A feature of the friction roller reducer of this example is, for the same reason as in the eighth example of the embodiment, is construction for improving the rigidity of a pair of support plate sections 74c, 74d of a pivot frames 47f that support intermediate rollers 19d so as to be able to rotate freely, and to bring the displacement direction of the intermediate rollers 19d close to the radial direction of the support frame 32e. The construction and functions of the other parts are the same as in the other examples of the embodiment, so drawings and explanations of identical parts are omitted or simplified, with the following explanation centering on the feature of this example.

A plurality (three in the example in the figures) of intermediate rollers 19d are supported by a support frame 32e that is supported by and fastened to the inside of a large-diameter cylindrical section 30 (see FIG. 11) of a housing 21 by way of the same number of pivot frames 47f as the number of intermediate rollers 19d so as to freely rotate and displace a little in the radial direction of the support frame 32e. Of these, the support frame 32e is constructed by a circular ring-shaped connecting plate section 72a, and column sections 73a that protrude from a plurality of locations (three locations in the example in the figure) uniformly spaced in the circumferential direction of one side surface in the axial direction of the connecting plate section 72a parallel with the axial direction of the support frame 32e toward the side where the intermediate rollers 19d are installed. The cross-sectional shape of these column sections 73a is a partial arc shape, and the portion that is surrounded on three sides by the end surfaces in the circumferential direction of adjacent column sections 73a and the connecting plate section 72a forms a concave support section 81a for supporting the respective pivot frames 47f. The inside surfaces 94 on both end section in the circumferential direction of these concave support sections 81a, which are constructed by the both end surfaces in the circumferential direction of the column sections 73a, are formed such that a pair of inside surfaces 94 that partition both end surfaces in the circumferential direction of these concave support sections 81a are flat surfaces that are parallel with each other. Furthermore, preferably these inside surfaces 94 are partial cylindrical concave surfaces. In this case, the radius of curvature of the partial cylindrical concave surface of these inside surfaces 94 is equal to or greater than the space between the pair of inside surfaces 94 of each concave support section 81a. More specifically, the radius of curvature of an inside surface 94 is the same as this space, or is a little greater (within 10% greater) than this space. Moreover, the center of curvature of each in the radial direction of the support frame 32e is in a portion in the center section of the inside surface 94 or in a portion a little further toward the outside than this center section.

The pivot frames 47f are respectively assembled inside these concave support sections 81a so as to be able to pivotally displace around the area of contact between the outside surface 95 of one end section in the lengthwise direction (circumferential direction of the connecting plate section 72a) of each of the pivot frames 47f and the inside surface 94. This kind of pivot frame 47f is constructed by placing both end sections in the lengthwise direction of a pair of support plate sections 74c, 74d that are separated in the axial direction together by way of connecting sections 75c, and connecting and fastening together this pair of support plate sections 74c, 74d with bolts 76a. The connecting sections 75c, 75c are such that the base end section is continuous with one (front side in FIG. 42 and back side in FIG. 44) support plate section 74c, and are integrated with that one support plate section 74c. Moreover, a screw hole (not illustrated in the figures) is formed in the connecting sections 75c so as to be open on the tip end surface of the connecting sections 75c. On the other hand, through holes (not illustrated in the figure) are formed in portions on both end sections in the lengthwise direction of the other (back side in FIG. 42 and front side in FIG. 44) support plate section 74c that are aligned with screw hole that are formed on the inside of the connecting sections 75c. The outside surfaces 95 of the connecting sections 75, which are the outer surfaces on both end sections in the lengthwise direction of the pivot frame 47f can partial cylindrical convex surfaces. The radius of curvature of the partial cylindrical convex surfaces of these outside surfaces 95 is sufficiently smaller than the radius of curvature of the partial cylindrical concave surfaces of the inside surfaces 94 on both end sections in the circumferential direction of the concave support sections 81a. In this example, the centers of curvature of the outside surfaces 95 are located on the center axes of the rotation shafts 20c that are located in the middle section in the lengthwise direction of the pivot frames 47f.

On the other hand, the intermediate rollers 19d are formed so as to be integrated with the rotation shafts 20c, and are concentric with the rotation shafts 20c. Both end sections of the rotation shaft 20c protrude in the axial direction further than the end surfaces in the axial direction of the intermediate roller 19d, the portions near the protruding tip ends are supported by the center section in the lengthwise direction of the pivot frame 47f by way of single-row deep-groove ball bearings 36d so as to be able to freely rotate. In order for this, short cylindrical support sections 96 are formed in the center section in the lengthwise direction of the support plate sections 74c, 74d of the pivot frame 47f and are open in the portions that are aligned with each other on the inside surfaces of the support plate sections 74c, 74d, and the outer rings of each of the ball bearings 36d fit inside and are supported by these support plate sections 96.

Intermediate roller units 86a, which are formed by assembling the intermediate rollers 19d in the pivot frames 47f by way of the ball bearings 36d, are assembled inside the concave support sections 81a of the support frame 32e so as to be able to pivotally displace. The assembly work is performed by bringing the intermediate roller units 86a close in the axial direction to the support frame 32e. After the intermediate roller units 86a have been assembled (inserted) inside the concave support sections 81a, one side surface of a circular ring-shaped connecting plate (not illustrated in the figures) is placed together with the tip end sections of the column sections 73a, and this connecting plate, together with the support frame 32e, is supported by and fastened inside the housing 21 (see FIG. 11) by bolts (not illustrated in the figure). In this state, the intermediate roller units 86a are assembled inside the housing so as to be able to pivotally displace, and the intermediate rollers 19d of the these intermediate roller units 86a are supported inside the housing 21 so as to be able to displace a little in the radial direction of the support frame 32e.

Figure 46A:
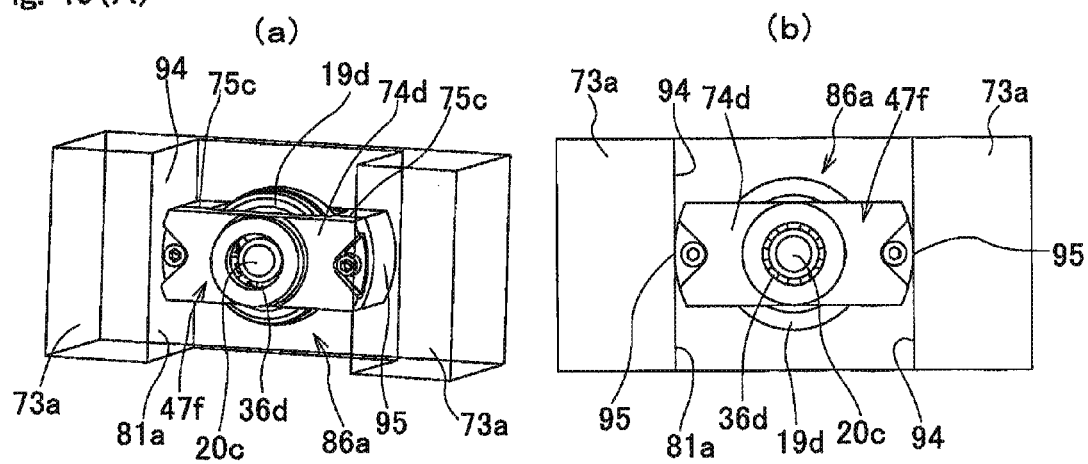
FIGS. 46A to 46C are schematic drawings for illustrating three examples of the form of displacement in the radial direction with respect to the support frame of an intermediate roller supported by a pivot frame of the tenth example of an embodiment of the present invention, where (a) is state as seen from an angle, and (b) is the state as seen in the axial direction.
Figure 46B:
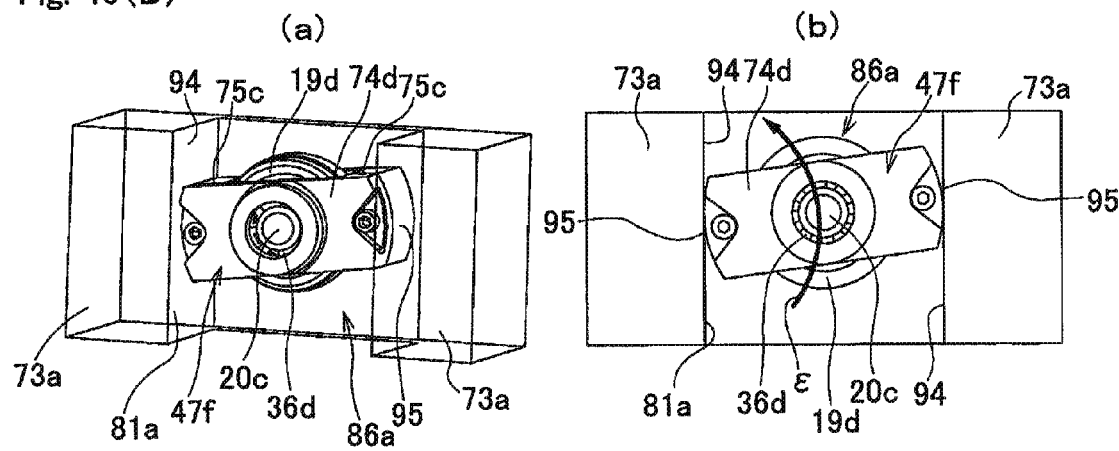
Figure 46C:
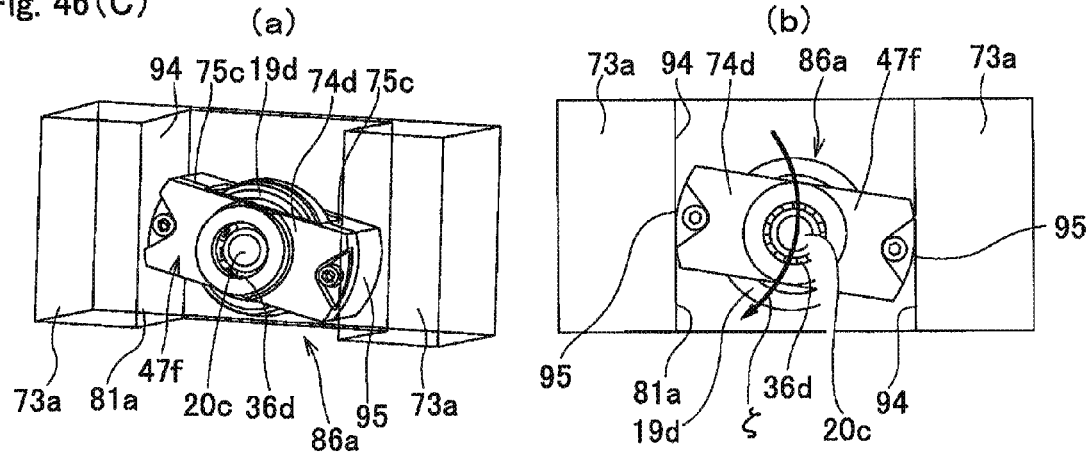

When the friction roller reducer of this example transmits torque, the space between the pair of sun roller elements 8d (see FIG. 28) of the sun roller 4b changes as the transmitted torque fluctuates, and when the intermediate rollers 19d displace inside the housing 21 in the radial direction of the support frame 32e, behavior such as illustrated in FIGS. 46A to 46C allow this displacement.

First, FIG. 46A illustrates the state wherein the intermediate roller unit 86a is located in the neutral state when the friction roller reducer is not transmitting torque or is transmitted only a small torque. As illustrated in FIG. 46B, when the torque transmitted by the friction roller reducer becomes large, the intermediate roller unit 86a is such that from this neutral state the pivot frame 47f pivotally displaces around the area of contact between the outside surface 95 of the side on one end in the lengthwise direction (left side in FIG. 46B) and the inside surface 94 of the concave support section 81a outward in the radial direction of the support frame 32e as indicated by the arrow 6 in (b) of FIG. 46B. As a result, surface pressure sufficiently increases at not only the area of rolling contact (traction area) between the outer circumferential surface of the intermediate roller 19d, which is supported by the center section in the lengthwise direction of the intermediate roller unit 86a so as to be able to rotate freely, and the outer circumferential surface of the sun roller 4b, but also at the area of rolling contact with the inner circumferential surface of the ring-shaped roller 5b (see FIG. 11). However, as illustrated in FIG. 46C, when the torque transmitted by the friction roller reducer decreases, the intermediate roller unit 86a pivotally displaces inward in the radial direction of the support frame 32e as illustrated by arrow Z in (b) of FIG. 46C. As a result, the surface pressure at the areas of rolling contact between the outer circumferential surface of the intermediate roller 19c and the outer circumferential surface of the sun roller 4b and the inner circumferential surface of the ring-shaped roller 5b are prevented from remaining excessively high, and it is possible to maintain the transmission efficiency and durability of the friction roller reducer.

The pivot frames 47f are such that both end sections in the lengthwise direction of the pair of support plate sections 74c, 74d that are provided for each pivot frame 47f are connected by connecting sections 75c and bolts 76a. Therefore, the support plate sections 75c are such that, even when the inside surface of one of the support plate sections 74c (74d) of the support plate sections 74c, 74d, having construction such that both end sections in the lengthwise direction are connected, is pressed by the intermediate roller 19d, the space between these support place sections 74c, 74d is not expanded. Therefore, strong rubbing between the outside surfaces of these support plate sections 74c, 74d and the connecting plate section and fastening wall section and the like adjacent to these support plate sections 74c, 74d is prevented, pivotal displacement of the pivot frame 47f is performed smoothly, and a decrease in the transmission efficiency of the friction roller reducer is prevented.

Furthermore, in the case of the friction roller reducer of the present invention, the pivot centers of the intermediate roller units 86a are not the pivot shafts 52 (see FIG. 11 to FIG. 14) located on the tip end sections of the pivot frames 47, but are the areas of contact between the outside surfaces 95 of these pivot frames 47f and the inside surfaces 94 of the concave support sections 81a. Therefore, even though the length dimension of these pivot frames 47f are not long, when the intermediate rollers 19d displace in the radial direction, the pivot radii of the pivot frames 47f can be made large. Therefore, when the intermediate rollers 19d displace in the radial direction of the support frame 32e, the displacement directions of the intermediate rollers 19d can be made to be close to the radial direction. As a result, the contact between the outer circumferential surfaces of the intermediate rollers 19d and the inner circumferential surface of the ring-shaped roller 5b can be made even more stable.

Eleventh Example

Figure 47:
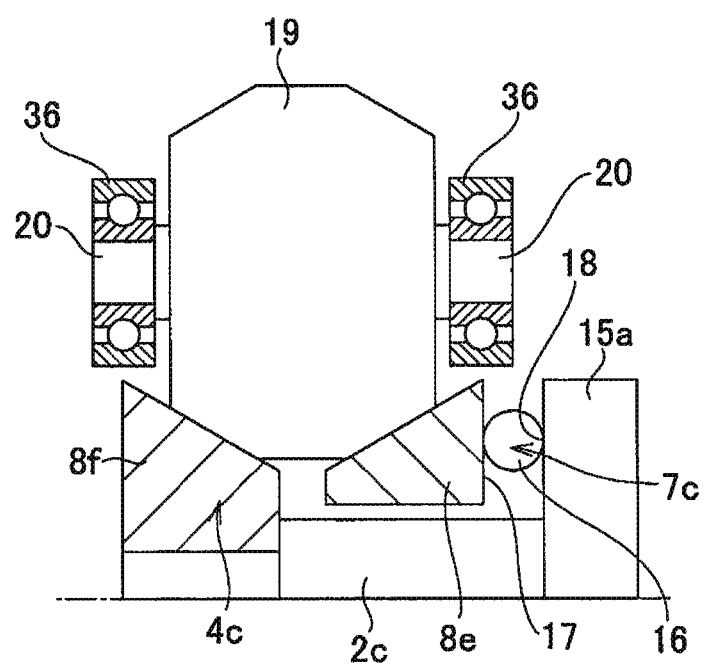
FIG. 47 is a schematic diagram illustrating an eleventh example of an embodiment of the present invention.

FIG. 47 illustrates an eleventh example of an embodiment of the present invention. In this example, a loading cam apparatus 7c is provided on only one side in the axial direction of the sun roller 4c. In order for this, only one sun roller element 8e of the pair of sun roller elements 8e, 8f of the sun roller 4c (right sun roller element 8e in FIG. 47) is supported so as to be able to rotate relative to the input shaft 2c, and the other sun roller element 8f (left sun roller element 8f in FIG. 47) is supported by and fastened to the input shaft 2c. In the case of this kind of example, instead of not being able avoid to change in characteristics at the start of operation of the friction roller reducer according to the direction of rotation of the input shaft 2c, it is possible to shorten and compress the dimension in the axial direction. The construction and functions of the other parts are the same as in the other examples of the embodiment, so any redundant drawings and explanations are omitted.

Twelfth Example

Figure 48:
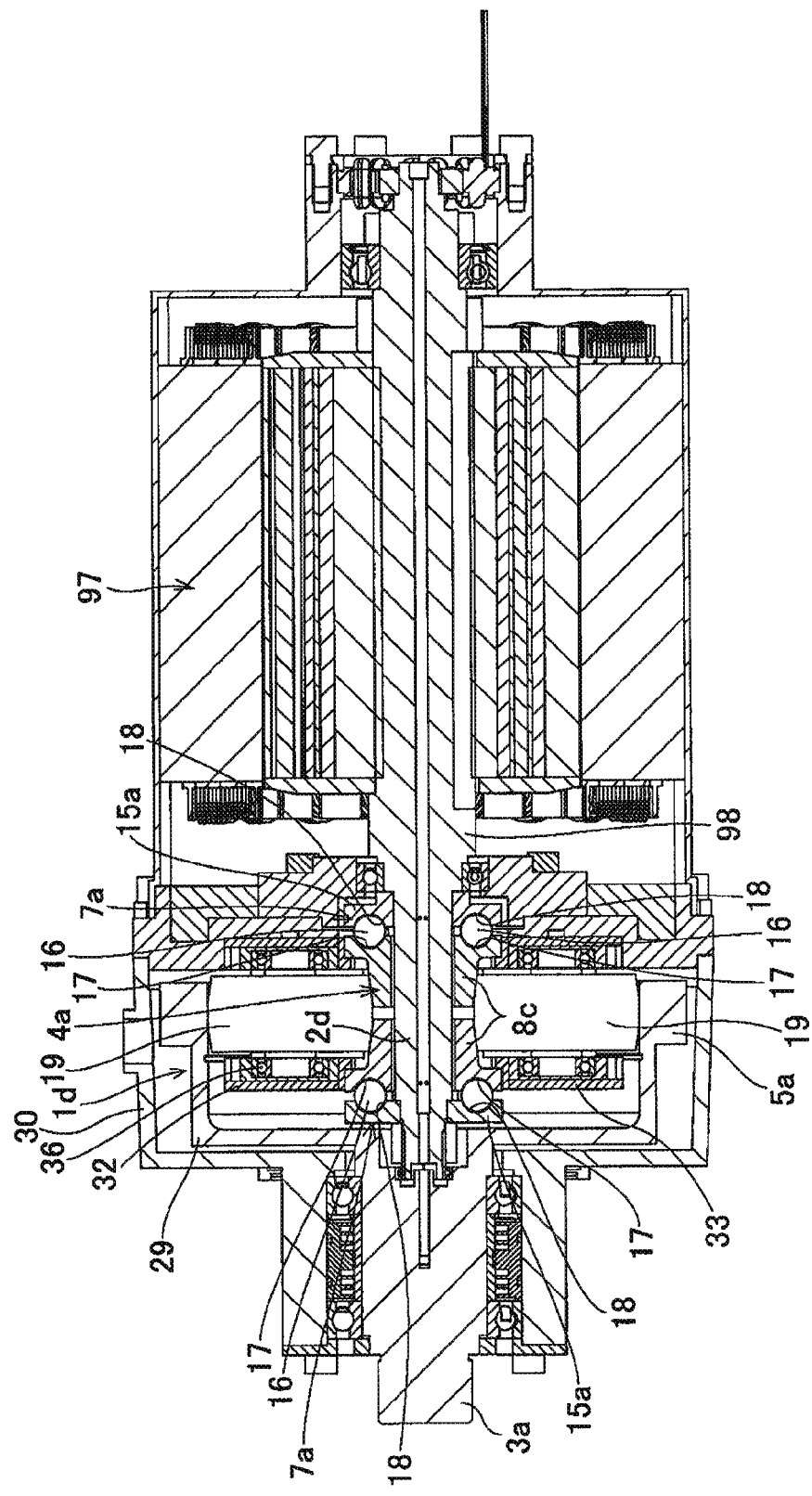
FIG. 48 is a schematic diagram illustrating a twelfth example of an embodiment of the present invention.

FIG. 48 illustrates a twelfth example of an embodiment of the present invention. In this example, the input shaft 2d of the friction roller reducer 1d is itself the output shaft 98 of the electric motor 87. In other words, the input shaft 2ds and the output shaft 98 are concentric with each other and are integrated into a single shaft. The construction and functions of the other parts are the same as in the other examples of the embodiment, so any redundant explanations are omitted.

Thirteenth Example

Figure 49:
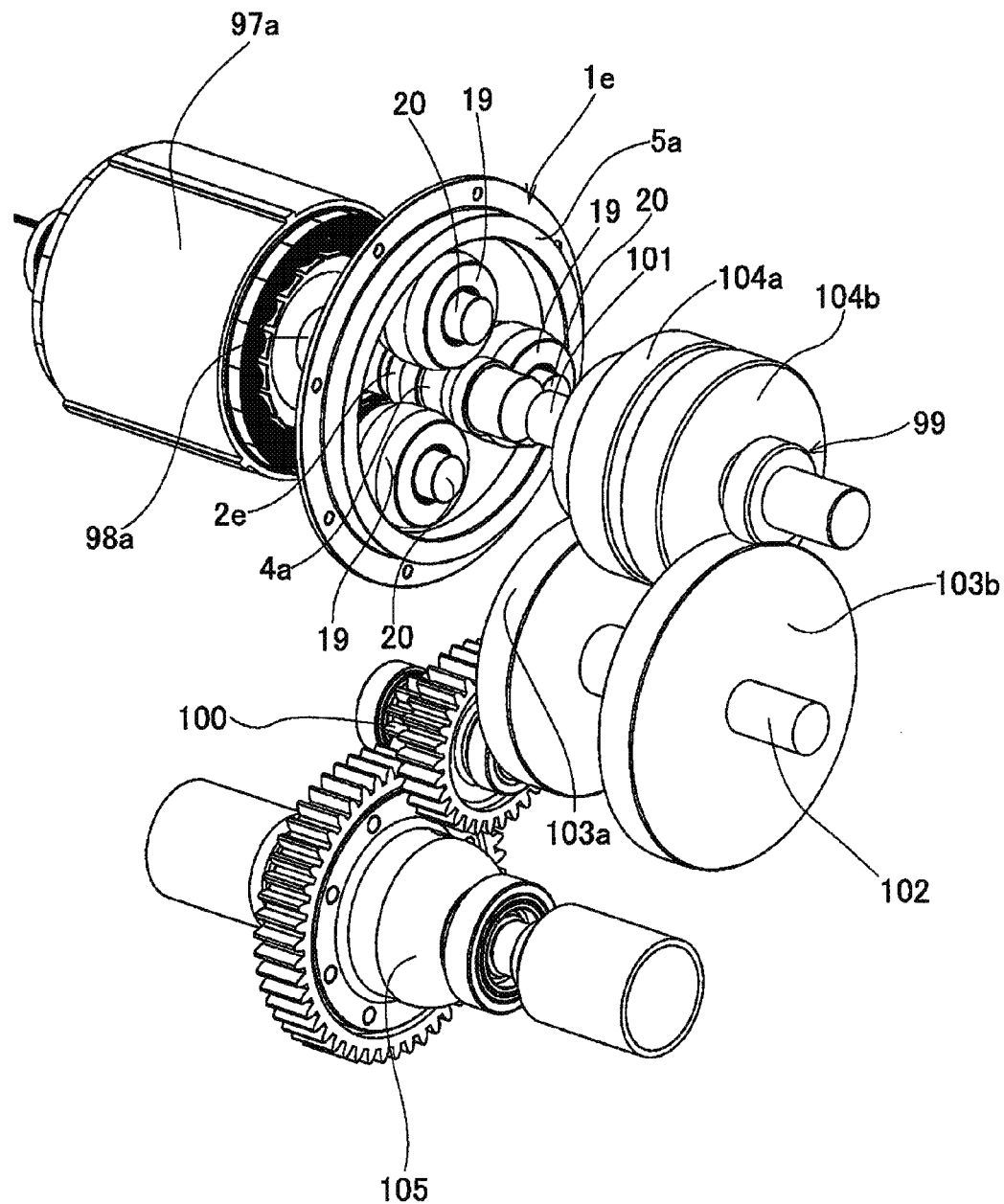
FIG. 49 is a perspective drawing illustrating a thirteenth example of an embodiment of the present invention, and illustrates a drive unit for an electric automobile in which a friction roller reducer is assembled.

FIG. 49 is a thirteenth example of an embodiment of the present invention, and illustrates a drive unit for an electric automobile in which the friction roller reducer is assembled. This drive unit for an electric automobile comprises a friction roller reducer 1e, a transmission apparatus 99, and a rotation transmission apparatus 100. In regards to this friction roller reducer 1e, the same construction as in any of the other examples of the embodiment is used, and the input shaft 2e of this friction roller reducer 1e and the output shaft 98a of the electric motor 97a are arranged so as to be concentric with each other, and are connected so that torque can be transmitted. The output shaft (omitted in the figure) of the friction roller reducer 1e and the input-side transmission shaft 101 of the transmission apparatus 99 are arranged so as to be concentric with each other, and are connected so that torque can be transmitted.

In this example, the transmission apparatus 99 is provided with a pair of gear transmission mechanisms 103a, 103b having different reduction ratios between the input-side transmission shaft 101 and the output-side transmission shaft 102. By switching between the pair clutch mechanisms 104a, 104b, only one gear transmission mechanism 103a (103b) is in a state capable of transmitting power, and the reduction ratio between the input-side transmission shaft 101 and the output-side transmission shaft 102 can be converted between two stages, high and low. Furthermore, the rotation transmission apparatus 100 is a typical gear transmission mechanism that is a combination of a plurality of gears, and is such that the rotation from the output-side transmission shaft 102 is transmitted to the input section of a differential gear 105, and then rotates and drives a pair of left and right driven wheels.

With the construction of the drive unit for an electric automobile of this example described above, electric energy is efficiently used, so even when a compact, high-speed (for example a maximum rotational speed of 30,000 $min^{-1}$) motor is used as the electric motor 97a, it is possible to suppress vibration and noise during operation. In other words, a friction roller reducer 1e is used as a first stage reducer, so the occurrence of vibration in the high speed rotating portion is suppressed. The rotational speed of the transmission apparatus 99 and the rotation transmission apparatus 100, which are both gear transmission mechanisms, is kept at about the same level (maximum of several thousand $min^{-1}$) as the operation speed of the portion of the transmission apparatus of an automobile in which a typical gasoline engine is mounted, so unpleasant vibration and noise do not occur in any portion.

Furthermore, in this example, by providing a transmission apparatus 99, the relationship between the traveling speed and acceleration of the vehicle is smooth and is close to that of an automobile in which a gasoline engine is mounted. In other words, when a power transmission apparatus having a large reduction ratio is provided between the output shaft (omitted in FIG. 49) of the electric motor 97a, which is the driving source of the electric automobile, and the input shaft of the differential gear 105 that is connected to the driven wheels, the relationship between the acceleration (G) and the traveling speed (km/h) of the automobile becomes as the left half section of the solid line "a" in FIG. 50 that is made to be continuous with the chain line "b". In other words, the acceleration performance at low speed are excellent, however high-speed travel is not possible. However, when a power transmission apparatus having a small reduction ratio is provided between the output shaft and the input shaft, the relationship becomes as the chain line "c" that is made to be continuous with the right half section of the solid line "a". In other words, high-speed travel is possible, however acceleration performance at low speed is impaired. In contrast to this, when a transmission apparatus 99 is provided as in this example, and the reduction ratio of this transmission apparatus 99 is changed according to the vehicle speed, it is possible to obtain the characteristic such as that of the left half section that is made to be continuous with the right half section of the solid line "a" illustrated in FIG. 50. This characteristic is nearly the same as that of a gasoline engine having equivalent output as indicated by the dashed line "d" in FIG. 50, and in regards to the acceleration performance and high-speed performance, it can be seen that performance equivalent to that of a gasoline engine is obtained.

INDUSTRIAL APPLICABILITY

The friction roller reducer of the present invention, as a reducer that is capable of high-speed operation, and in which large vibration does not occur during operation, is not limited to a drive system of an electric automobile, and can be assembled in a rotation transmission mechanism of all kinds of machinery. Moreover, the present invention can also be applied to a planetary roller type of friction roller reducer with the condition that the operation speed does not become very fast.

Figure 50:
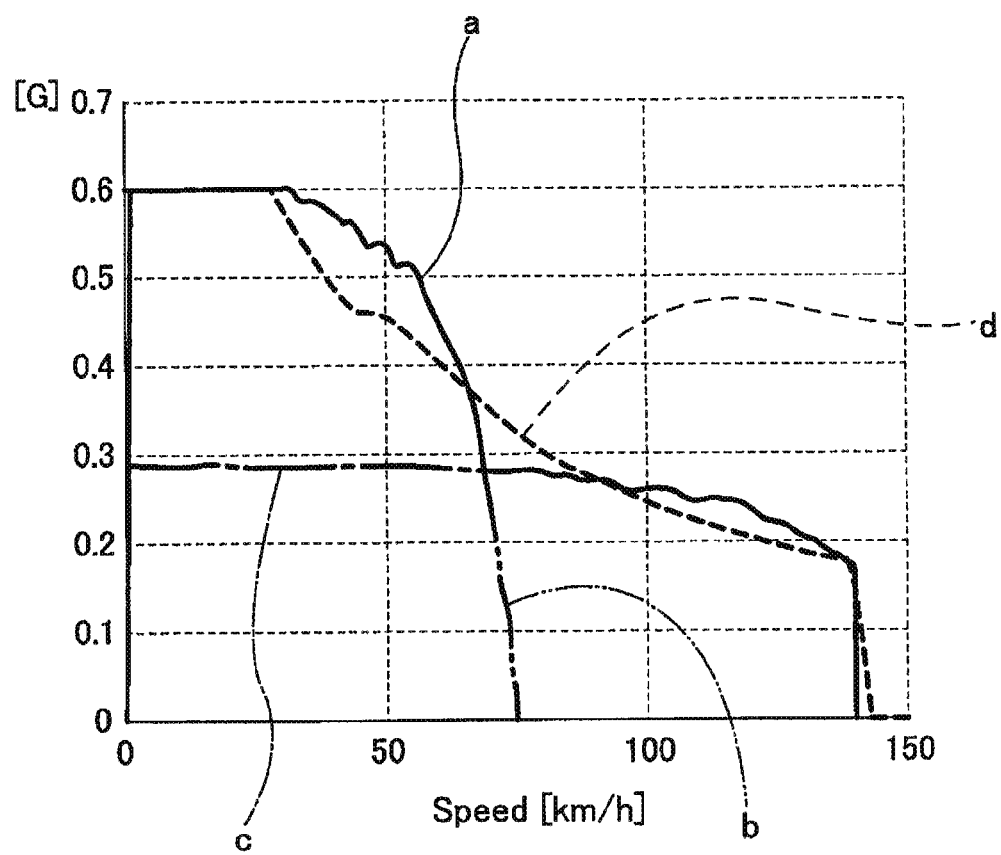
FIG. 50 is a graph for explaining the acceleration characteristics obtained by the drive unit illustrated in FIG. 49.

Furthermore, in the drive unit for an electric automobile of the present invention, the type of transmission apparatus that is assembled between the friction roller reducer and the rotation transmission apparatus does not really matter, and in addition to the construction illustrated in the figure, it is also possible to employ a planet gear type of transmission apparatus. By using a continuously variable transmission apparatus, it is possible to obtain a relationship between the traveling speed and acceleration of vehicle that is smoother and even more ideal, as illustrated in FIG. 50.

What is claimed is:

1. A friction roller reducer, comprising:
    a sun roller that comprises a pair of sun roller elements that are separated in an axial direction and located around an input shaft, so that when there is a space between tip end surfaces of each, each is concentric and is capable of relative rotating with respect to the input shaft, and each has an outer circumferential surface that has an inclined surface that is inclined in a direction such that an outer diameter thereof becomes smaller going toward the respective tip end surface;
    a ring-shaped roller that is located around an outside of the sun roller so as to be concentric with the sun roller, and has an inner circumferential surface;
    a plurality of intermediate rollers that are supported at a plurality of locations in a circumferential direction of a ring-shaped space between the outer circumferential surface of the sun roller and the inner circumferential surface of the ring-shaped roller so as to be able to rotate freely around rotation shafts that are arranged parallel with the input shaft, and each intermediate roller has an outer circumferential surface that comes in rolling contact with the outer circumferential surface of the sun roller and the inner circumferential surface of the ring-shaped roller;

a loading cam apparatus that is provided between at least one movable sun roller element of the sun roller elements and the input shaft, and comprises: driven-side cam surfaces that are provided at a plurality of locations in the circumferential direction of a base end surface of the movable sun roller element, and each is shaped such that a depth in the axial direction thereof gradually changes in the circumferential direction and becomes more shallow going toward an end section thereof; driving-side cam surfaces that are provided at a plurality of locations in the circumferential direction of the surface on one side of a cam plate that faces the base end surface of the movable sun roller element, and each is shaped such that a depth in the axial direction thereof gradually changes in the circumferential direction and becomes more shallow going toward an end section thereof; and a plurality of rolling bodies that are held between the driven-side cam surfaces and the driving-side cam surfaces; and as the input shaft rotates, causes the movable sun roller element to rotate while pressing the movable sun roller element in the axial direction toward the other sun roller element; and an oscillating mechanism that causes each of the intermediate rollers to oscillate and move in a radial direction of the sun roller and the ring-shaped roller as a thickness in the axial direction of the sun roller changes due to displacement in the axial direction of the movable sun roller element; and either one of the ring-shaped roller or a member that supports the rotation shafts being fastened, and the other member being connected to an output shaft, such that the other member rotates and drives the output shaft, wherein the oscillating mechanism is constructed by: a plurality of pivot frames that supports the intermediate rollers so as to be able rotate freely around the respective rotation shafts, and a support frame that supports the pivot frames so as to be able to move in the radial direction of the sun roller and the ring-shaped roller, and the pivot frames are supported by the support frame so as to be able to pivotally move around each of a plurality of pivot shafts that are parallel with the rotation shafts and that are located on the support frame such that a phase of the pivot shafts with regard to an arrangement thereof in the direction of rotation of the sun roller is separated from the rotation shafts; and the pivot frames support the rotation shafts so as to be able to move in the radial direction of the sun roller and the ring-shaped roller.

2. The friction roller reducer according to claim 1, wherein each pivot frame comprises a base section having a pivot shaft, and a pair of support arms that extend in the same direction as each other and essentially parallel from both end sections in the axial direction of the base section and comprise tip end sections that support both end sections of the rotation shaft.

3. The friction roller reducer according to claim 2, wherein the rotation shafts are constructed by bolts each comprising: a circular column section in a middle section in the axial direction, a male screw section on the tip end section having a diameter that is smaller than the circular column section, and a head section on the base end section having a diameter that is larger than the circular column section; a through hole having a smaller diameter than the head section is formed in one of the tip end sections of each pair of support arms of the pivot frames, and a screw hole in which the male screw section can be screwed is formed in the other tip end section so as to be concentric with the through hole; and by inserting the circular column section through the through hole and screwing the male screw section in the screw hole, the rotation shaft is supported and fastened between the pair of support arms, and the space between the pair of support arms is prevented from expanding.

4. The friction roller reducer according to claim 2, wherein a counterweight section is provided on the opposite side from the tip end section of the base section, and as the intermediate roller revolves, a force outward in the radial direction of the support frame that is applied to the planet roller due to a centrifugal force is reduced or cancelled out by the centrifugal force that is applied to the counterweight section.

5. The friction roller reducer according to claim 1, wherein each of the pivot frames is formed by connecting and fastening together by way of connecting sections both ends in a lengthwise direction of a pair of support plate sections that are separated in the axial direction, and supports both end sections of the rotation shaft between the middle sections in the lengthwise direction of the support plate sections.

6. A friction roller reducer, comprising:

a sun roller that comprises a pair of sun roller elements that are separated in an axial direction and located around an input shaft, so that when there is a space between tip end surfaces of each, each is concentric and is capable of relative rotating with respect to the input shaft, and each has an outer circumferential surface that has an inclined surface that is inclined in a direction such that an outer diameter thereof becomes smaller going toward the respective tip end surface;

a ring-shaped roller that is located around an outside of the sun roller so as to be concentric with the sun roller, and has an inner circumferential surface;

a plurality of intermediate rollers that are supported at a plurality of locations in a circumferential direction of a ring-shaped space between the outer circumferential surface of the sun roller and the inner circumferential surface of the ring-shaped roller so as to be able to rotate freely around rotation shafts that are arranged parallel with the input shaft, and each intermediate roller has an outer circumferential surface that comes in rolling contact with the outer circumferential surface of the sun roller and the inner circumferential surface of the ring-shaped roller;

a loading cam apparatus that is provided between at least one movable sun roller element of the sun roller elements and the input shaft, and comprises: driven-side cam surfaces that are provided at a plurality of locations in the circumferential direction of a base end surface of the movable sun roller element, and each is shaped such that a depth in the axial direction thereof gradually changes in the circumferential direction and becomes more shallow going toward an end section thereof; driving-side cam surfaces that are provided at a plurality of locations in the circumferential direction of the surface on one side of a cam plate that faces the base end surface of the movable sun roller element, and each is shaped such that a depth in the axial direction thereof gradually changes in the circumferential direction and becomes more shallow going toward an end section; and a plurality of rolling bodies that are held between the driven-side cam surfaces and the driving-side cam surfaces; and as the input shaft rotates, causes the movable sun roller element to rotate while pressing the movable sun roller element in the axial direction toward the other sun roller element;

an oscillating mechanism that causes each of the intermediate rollers to oscillate and move in a radial direction of the sun roller and the ring-shaped roller as a thickness in the axial direction of the sun roller changes due to displacement in the axial direction of the movable sun roller element; and either one of the ring-shaped roller or a member that supports the rotation shafts being fastened, and the other member being connected to an output shaft, such that the other member rotates and drives the output shaft;

wherein the oscillating mechanism is constructed by: a plurality of pivot frames that supports the intermediate rollers so as to be able rotate freely around the respective rotation shafts, and a support frame that supports the pivot frames so as to be able to move in the radial direction of the sun roller and the ring-shaped roller, the support frame comprises concave support sections at a plurality of locations in the circumferential direction of the surface on one side in the axial direction; and each pivot frame is formed by connecting and fastening together by way of connecting section both ends in a lengthwise direction of a pair of support plate sections that are separated in the axial direction, and both end sections of the rotation shaft are supported between middle sections in the lengthwise direction of the support plate sections, and the pivot frame is supported inside each of the concave support concave sections so as to be able to pivotally displace around the area of contact between the outside surface of one end section in the lengthwise direction and an inside surface of each of the concave support.

* * * * *